US006637576B1

(12) United States Patent
Jones et al.

(10) Patent No.: US 6,637,576 B1
(45) Date of Patent: Oct. 28, 2003

(54) CURRENCY PROCESSING MACHINE WITH MULTIPLE INTERNAL COIN RECEPTACLES

(75) Inventors: John E. Jones, Winnetka, IL (US); William J. Jones, Barrington, IL (US); Mark C. Munro, Park Ridge, IL (US); Cherrie L. Brown, Lombard, IL (US); George T. Seelenbinder, Elk Grove Village, IL (US); Eric R. Carver, Palatine, IL (US); John C. Peklo, Elmhurst, IL (US)

(73) Assignee: Cummins-Allison Corp., Mount Prospect, IL (US)

( * ) Notice: Subject to any disclaimer, the term of this patent is extended or adjusted under 35 U.S.C. 154(b) by 211 days.

(21) Appl. No.: 09/688,539

(22) Filed: Oct. 16, 2000

Related U.S. Application Data

(63) Continuation-in-part of application No. 09/562,231, filed on Apr. 28, 2000, now Pat. No. 6,318,537.

(60) Provisional application No. 60/131,635, filed on Apr. 28, 1999.

(51) Int. Cl.[7] .................................................. G06F 9/00

(52) U.S. Cl. ........................................................ 194/216

(58) Field of Search ................................ 194/216, 206, 194/215, 217, 229, 230, 350; 453/3, 36

(56) References Cited

U.S. PATENT DOCUMENTS 2,669,998 A 2/1954 Buchholz ....................... 133/8

(List continued on next page.)

FOREIGN PATENT DOCUMENTS

| | | | |
|---|---|---|---|
| DE | 660354 | 5/1938 | |
| DE | 2528735 | 8/1976 | ........... B60K/17/10 |
| DE | 3021327 A1 | 12/1981 | ............ G07D/3/06 |
| EP | A0077464 | 4/1983 | |
| EP | 010115 A1 | 1/1984 | |

(List continued on next page.)

OTHER PUBLICATIONS

Complaint, Cummins–Allison Corp. v. Glory Ltd., Glory Shoji Co. Ltd., and Glory (U.S.A.) Inc., Civil Action No. 02C–7008, United States District Court, Northern District of Illinois, Eastern Division.

Billcon Corporation, Brochure for CCS–60/CCS–80 Series Coin Counter–Sorter, 2 pages (Oct. 1999).

(List continued on next page.)

*Primary Examiner*—Donald P. Walsh
*Assistant Examiner*—Mark J Beauchaine
(74) *Attorney, Agent, or Firm*—Jenkens & Gilchrist

(57) ABSTRACT

A currency processing machine for processing currency including coins of mixed denominations that are input by a user comprises a coin counter for determining the aggregate value of the coins of mixed denominations, a coin bin for holding the counted coins discharged from the coin counter, and a coin sorter for storing coins discharged from the coin bin.

91 Claims, 33 Drawing Sheets

U.S. PATENT DOCUMENTS 2,750,949 A 6/1956 Kulo et al. .................... 133/8
2,835,260 A 5/1958 Buchholz ....................... 133/8
2,865,561 A 12/1958 Rosapepe ...................... 232/7
3,132,654 A 5/1964 Adams .......................... 133/1
3,173,742 A 3/1965 Simjian ....................... 346/22
3,246,295 A 4/1966 Claris et al. .................. 382/56
3,280,974 A 10/1966 Riddle et al. ............ 209/111.8
3,480,785 A 11/1969 Aufderheide ............... 250/219
3,496,370 A 2/1970 Havill et al. .................. 356/71
3,509,535 A 4/1970 Berube ....................... 340/149
3,612,835 A 10/1971 Andrews et al. ...... 235/61.11 D
3,618,765 A 11/1971 Syosset et al. .............. 209/122
3,679,314 A 7/1972 Mustert ...................... 250/556
3,715,031 A 2/1973 Okkonen ..................... 209/75
3,764,899 A 10/1973 Peterson et al. .......... 324/61 R
3,778,628 A 12/1973 Novak et al. ............... 250/556
3,800,078 A 3/1974 Cochran et al. ............. 178/7.1
3,806,710 A 4/1974 Shigemori et al. ............ 235/92
3,815,021 A 6/1974 Kerr ......................... 324/61 R
3,842,281 A 10/1974 Goodrich .................... 250/461
3,870,629 A 3/1975 Carter et al. ............. 209/111.8
3,906,449 A 9/1975 Marchak ................. 340/149 R
3,976,198 A 8/1976 Carnes et al. ........... 209/11.7 T
4,041,456 A 8/1977 Ott et al.
4,059,122 A 11/1977 Kinoshita ...................... 133/3
4,096,991 A 6/1978 Iguchi ........................ 235/419
4,114,804 A 9/1978 Jones et al. ................. 235/476
4,147,430 A 4/1979 Gorgone et al. .............. 356/51
4,150,740 A 4/1979 Douno .......................... 194/4
4,172,462 A 10/1979 Uchida et al. ................. 133/3
4,179,685 A 12/1979 O'Maley ............. 340/146.3 H
4,205,780 A 6/1980 Burns et al. ................ 235/454
4,249,552 A 2/1981 Margolin et al. .............. 133/1
4,250,806 A 2/1981 Boyson et al. ................. 101/2
4,255,651 A 3/1981 Phillips ....................... 235/92
4,264,808 A 4/1981 Owens et al. ............... 235/379
4,266,121 A 5/1981 Hirose ........................ 235/381
4,277,774 A 7/1981 Fujii et al. ............... 340/146.3
4,283,708 A 8/1981 Lee ..................... 340/146.3 Z
4,288,781 A 9/1981 Sellner et al. ....... 340/146.3 Q
4,302,781 A 11/1981 Ikeda et al. ................. 358/486
4,310,885 A 1/1982 Azcua et al. ............... 364/405
4,311,914 A 1/1982 Huber ........................ 250/556
4,313,598 A 2/1982 DiBlasio ..................... 271/124
4,321,672 A 3/1982 Braun et al. .................. 364/40
4,334,619 A 6/1982 Horino et al. .............. 209/551
4,337,864 A 7/1982 McLean ..................... 209/534
4,348,656 A 9/1982 Gorgone et al. ...... 340/146.3 R
4,349,111 A 9/1982 Shah et al. ................. 209/534
4,352,988 A 10/1982 Ishida ........................ 250/559
4,355,300 A 10/1982 Weber ................ 340/146.3 C
4,355,369 A 10/1982 Garvin ....................... 364/900
4,356,473 A 10/1982 Freudenthal
4,360,034 A 11/1982 Davila et al. .................. 133/3
4,380,316 A 4/1983 Glinka et al. ................. 232/16
4,381,447 A 4/1983 Horvath et al. ............. 250/223
4,386,432 A 5/1983 Nakamura et al. ............. 382/7
4,396,902 A 8/1983 Warthan et al. ............... 382/64
4,416,299 A 11/1983 Bergman .................... 133/1 R
4,434,359 A 2/1984 Watanabe ................... 235/379
4,442,541 A 4/1984 Finkel et al. .................. 382/7
4,461,028 A 7/1984 Okubo ........................ 382/15
4,464,786 A 8/1984 Nishito et al. ................. 382/7
4,464,787 A 8/1984 Fish et al. ..................... 382/7
4,480,177 A 10/1984 Allen ......................... 235/379
4,487,306 A 12/1984 Nao et al. ...................... 194/4
4,490,846 A 12/1984 Ishida et al. ................... 382/7
4,513,439 A 4/1985 Gorgone et al. ............... 382/7
4,530,067 A 7/1985 Dorr .......................... 364/900
4,538,719 A 9/1985 Gray et al. ............. 194/100 A
4,539,702 A 9/1985 Oka .............................. 382/7
4,542,829 A 9/1985 Emery et al. ............... 209/534
4,543,969 A 10/1985 Rasmussen .................... 133/3
4,544,266 A 10/1985 Antes .......................... 356/71
4,547,896 A 10/1985 Ohtombe et al. .............. 382/7
4,553,222 A 11/1985 Kurland et al. ............. 364/900
4,553,846 A 11/1985 Hilton et al. ............... 356/429
4,556,140 A 12/1985 Okada ........................... 194/4
4,558,224 A 12/1985 Gober ..................... 250/460.1
4,558,711 A 12/1985 Ikuta Yoshiaki et al. ... 133/3 F
4,559,451 A 12/1985 Curl ........................... 250/560
4,563,771 A 1/1986 Gorgone et al. ............... 382/7
4,567,370 A 1/1986 Falls ....................... 250/461.1
4,569,421 A 2/1986 Sandstedt .................... 186/39
4,582,172 A 4/1986 Takeuchi et al. .............. 186/38
4,587,412 A 5/1986 Apisdorf ..................... 235/449
4,587,434 A 5/1986 Roes et al. ................. 250/556
4,592,090 A 5/1986 Curl et al. ..................... 382/7
4,593,184 A 6/1986 Bryce ......................... 235/449
4,594,664 A 6/1986 Hashimoto .................. 364/405
D285,095 S 8/1986 Lundgren et al. .............. D18/3
4,611,205 A 9/1986 Eglise ........................ 340/825
4,611,345 A 9/1986 Ohnishi et al. ................ 382/7
4,617,458 A 10/1986 Bryce ......................... 235/449
4,620,559 A * 11/1986 Childers et al. ............... 453/6
4,622,456 A 11/1986 Naruto et al. ............... 235/379
4,628,194 A 12/1986 Dobbins et al. ............ 235/379
4,645,936 A 2/1987 Gorgone ..................... 220/556
4,653,647 A 3/1987 Hashimoto .................. 209/534
4,658,289 A 4/1987 Nagano et al. ............... 358/75
4,676,343 A 6/1987 Humble et al. ............... 186/61
4,677,682 A 6/1987 Miyagawa et al. ............ 382/7
4,678,072 A 7/1987 Kobayashi et al. ......... 194/206
4,697,071 A 9/1987 Hiraoka et al. ............ 235/379
4,700,368 A 10/1987 Munn et al. ................... 377/8
4,706,577 A 11/1987 Jones .......................... 109/59
4,716,456 A 12/1987 Hosaka ........................ 358/75
4,733,308 A 3/1988 Nakamura et al. .......... 358/496
4,733,765 A 3/1988 Watanabe ................... 194/206
4,735,289 A 4/1988 Kenyon ....................... 186/37
4,743,974 A 5/1988 Lockwood .................. 358/285
4,748,679 A 5/1988 Gold et al. ................... 382/61
4,753,625 A 6/1988 Okada ......................... 453/32
4,764,976 A 8/1988 Kallin et al. .................. 382/65
4,782,328 A 11/1988 Denlinger ................... 340/365
4,804,830 A 2/1989 Miyagisima et al. ....... 235/379
4,806,709 A 2/1989 Evans ......................... 178/19
4,811,004 A 3/1989 Person et al. ............... 340/712
4,821,332 A 4/1989 Durham ......................... 382/7
4,823,393 A 4/1989 Kawakami ..................... 382/7
4,825,246 A 4/1989 Fukuchi et al. ................ 355/4
4,827,531 A 5/1989 Milford ......................... 382/7
4,837,842 A 6/1989 Holt ............................ 382/26
4,841,358 A 6/1989 Kammoto et al. ............ 358/75
4,851,616 A 7/1989 Wales et al. .................. 178/18
4,877,230 A 10/1989 Winkler et al. ................ 271/3
4,880,096 A 11/1989 Kobayashi et al. ......... 194/206
4,881,268 A 11/1989 Uchida et al. ................. 382/7
4,883,158 A 11/1989 Kobayashi et al. ......... 194/217
4,883,181 A 11/1989 Yoshikawa .................. 209/534
4,888,812 A 12/1989 Dinan et al. ................... 382/7
4,903,953 A 2/1990 Winkler et al. ................ 271/4
4,905,840 A 3/1990 Yuge et al.
4,908,516 A 3/1990 West .......................... 250/556
4,921,463 A 5/1990 Primdahl et al. .............. 453/3
4,922,109 A 5/1990 Bercovitz et al. ........... 194/207
4,928,094 A 5/1990 Smith ......................... 340/712
4,931,782 A 6/1990 Jackson ...................... 340/706
4,953,086 A 8/1990 Fukatsu ...................... 364/408
4,954,697 A 9/1990 Kokubun et al. ........... 235/381
4,970,655 A 11/1990 Winn et al. ................. 364/479

4,973,851 A 11/1990 Lee ............................ 250/556
4,980,543 A 12/1990 Hara et al. .................. 209/534
4,992,860 A 2/1991 Hamaguchi et al. .......... 358/75
4,996,604 A 2/1991 Ogawa et al. .............. 358/486
5,023,782 A 6/1991 Lutz et al. .................. 364/405
5,027,415 A 6/1991 Hara et al. ...................... 382/7
5,039,848 A 8/1991 Stoken ....................... 235/381
5,047,871 A 9/1991 Meyer et al. ............... 358/486
5,054,621 A 10/1991 Murphy et al. ............. 209/534
5,055,834 A 10/1991 Chiba ......................... 340/825
5,063,599 A 11/1991 Concannon et al. ........... 382/7
5,068,519 A 11/1991 Bryce
5,091,961 A 2/1992 Baus, Jr. ......................... 382/7
5,105,601 A 4/1992 Horiguchi et al. ............ 53/465
5,114,381 A 5/1992 Ueda et al. ................... 453/57
5,122,754 A 6/1992 Gotaas ....................... 324/676
5,134,663 A 7/1992 Kozlowski ..................... 382/7
5,135,115 A 8/1992 Miller et al. ................ 209/564
5,146,512 A 9/1992 Weideman et al. ........... 382/30
5,151,607 A 9/1992 Crane ......................... 250/556
5,159,548 A 10/1992 Caslavka .................... 364/408
5,163,672 A 11/1992 Mennie ...................... 271/187
5,163,868 A 11/1992 Adams et al. ................ 453/11
5,167,313 A 12/1992 Dobbins et al. ............ 194/317
5,183,142 A 2/1993 Latchinian et al. ......... 194/206
5,184,115 A 2/1993 Black et al. ................ 340/708
5,184,709 A 2/1993 Nishiumi et al. ........... 194/318
5,186,334 A 2/1993 Fukudome et al. ......... 209/534
5,187,750 A 2/1993 Behera .......................... 382/7
5,193,121 A 3/1993 Elischer et al. ................ 382/7
5,198,976 A 3/1993 Form et al. ................. 364/410
5,199,543 A 4/1993 Kamagami et al. ......... 194/207
5,201,395 A 4/1993 Takizawa et al. ........... 194/206
5,207,788 A 5/1993 Geib et al. .................. 271/122
5,231,381 A 7/1993 Duwaer ...................... 340/712
5,237,158 A 8/1993 Kern et al. ................. 235/379
5,239,593 A 8/1993 Wittner et al. ................ 382/14
5,261,518 A 11/1993 Bryce ......................... 194/206
5,286,954 A 2/1994 Sato et al. .................. 235/379
5,295,196 A 3/1994 Raterman et al. ........... 382/135
5,297,030 A 3/1994 Vassigh et al. ............. 364/405
5,299,977 A 4/1994 Mazur et al. ................. 453/10
5,304,813 A 4/1994 DeMan ....................... 250/556
5,309,515 A 5/1994 Troung et al. ................. 382/7
5,317,140 A 5/1994 Dunthorn .................... 250/221
5,321,238 A 6/1994 Kamata et al. ............. 235/379
5,335,292 A 8/1994 Lovelady et al. ............. 382/17
5,341,408 A 8/1994 Melcher et al. ................ 377/8
5,342,165 A 8/1994 Graef et al. ............. 414/788.9
5,346,047 A * 9/1994 Ishida et al. ................ 194/200
5,363,949 A 11/1994 Matsubayashi ............. 194/206
5,367,577 A 11/1994 Gotaas .......................... 382/7
5,371,345 A 12/1994 LeStrange et al. .......... 235/380
5,371,798 A 12/1994 McWhortor ................. 380/51
5,379,344 A 1/1995 Larsson et al. ............... 380/23
5,381,019 A 1/1995 Sato .......................... 250/556
5,390,776 A 2/1995 Thompson .................. 194/346
5,430,664 A 7/1995 Cargill et al. ............... 364/550
5,437,357 A 8/1995 Ota et al. ................... 194/206
5,438,184 A 8/1995 Roberts et al. ............. 235/380
5,444,793 A 8/1995 Kelland ...................... 382/138
5,459,304 A 10/1995 Eisenmann ................. 235/380
5,465,301 A 11/1995 Jotcham et al. ............... 380/54
5,465,821 A 11/1995 Akioka ....................... 194/207
5,467,405 A 11/1995 Raterman et al. ........... 382/135
5,467,406 A 11/1995 Graves et al. .............. 382/135
5,507,379 A 4/1996 Mazur et al. ............... 194/318
5,530,772 A 6/1996 Storey ........................ 382/135
5,537,486 A 7/1996 Stratigos et al. ............ 382/137
5,544,043 A 8/1996 Miki et al. .................. 364/406
5,564,546 A 10/1996 Molbak et al. ............. 194/216
5,592,377 A 1/1997 Lipkin ........................ 395/242
5,600,732 A 2/1997 Ott et al. .................... 382/112
5,602,933 A 2/1997 Blackwell et al. .......... 382/116
5,602,936 A 2/1997 Green et al. ................ 382/140
5,607,040 A 3/1997 Mathurin, Sr. ............. 194/207
5,620,079 A * 4/1997 Molbak ...................... 194/217
5,633,949 A 5/1997 Graves et al. .............. 382/135
5,640,463 A 6/1997 Csulits ....................... 382/135
5,652,802 A 7/1997 Graves et al. .............. 382/135
5,746,299 A 5/1998 Molbak et al. ............. 194/200
5,799,767 A 9/1998 Molbak ...................... 194/217
5,842,916 A 12/1998 Gerrity et al. ................ 453/57
5,905,810 A 5/1999 Jones et al. ................. 382/135
5,909,793 A 6/1999 Beach et al. ................ 194/210
5,909,794 A 6/1999 Molbak et al. ............. 194/216
5,957,262 A 9/1999 Molbak et al. ............. 194/200
5,982,918 A 11/1999 Mennie et al. .............. 382/135
5,988,348 A 11/1999 Martin et al. ............... 194/317
6,017,270 A 1/2000 Ristvedt et al. ................ 453/5
6,021,883 A 2/2000 Casanova et al. ........... 194/217
D422,016 S 3/2000 Forslund ....................... D18/3
6,047,807 A 4/2000 Molbak ...................... 194/217
6,047,808 A 4/2000 Neubarth et al. ........... 194/317
6,056,104 A 5/2000 Neubarth et al. ........... 194/317
6,080,056 A 6/2000 Karlsson ........................ 453/3
6,082,519 A 7/2000 Martin et al. ............... 194/350
6,086,471 A 7/2000 Zimmermann ................. 453/3
6,095,313 A 8/2000 Molbak et al. ............. 194/344
6,116,402 A 9/2000 Beach et al. ................ 194/216
6,128,402 A 10/2000 Jones et al. ................. 382/135
6,264,545 B1 7/2001 Magee et al. .................. 453/3

FOREIGN PATENT DOCUMENTS

EP 101115 2/1984
EP 0109743 5/1984
EP 0185200 A2 6/1986
EP 0 253 935 A2 1/1988
EP 0325364 7/1989
EP 0351217 A2 7/1989 ............. G07F/9/04
EP A0338123 10/1989
EP A0342642 11/1989
EP 0 583 526 A1 8/1992
EP 0 583 723 A1 8/1993
EP 0667973 B1 11/1993 ............ G07D/3/14
EP 0578875 1/1994
EP 0633553 A1 1/1995
EP 0926634 A2 12/1998 ............ G07D/3/14
FR 70.11438 1/1971 ........... G07B/11/00
GB 2175427 A 11/1986 ........... G07F/17/42
GB 2190996 A 12/1987
GB 2198274 A 6/1988 ............ G07D/3/00
GB 2204166 A 11/1988
GB 2223872 A 4/1990 ............. G07F/9/08
GB 2272762 A 5/1994
JP 1-307891 12/1989 ............ G07D/9/00
JP 3-63795 3/1991 ............ G07D/3/00
JP 3-92994 4/1991 ............ G07D/9/00
SE 44244 9/1988
WO WO85/00909 2/1985
WO WO90/07165 6/1990
WO WO91/11778 8/1991
WO WO92/17394 10/1992
WO WO93/23824 11/1993
WO WO94/16412 7/1994
WO WO94/19773 9/1994
WO WO95/24691 3/1995
WO WO96/10800 9/1995
WO WO98/24041 A1 6/1998
WO WO98/48383 A2 10/1998
WO WO98/48384 A2 10/1998
WO WO98/48385 A2 10/1998

WO WO98/51082 A1 11/1998
WO WO 99/00776 1/1999
WO WO 99/33030 7/1999 ............ G07D/3/00

OTHER PUBLICATIONS

Billcon Corporation, Photos for CCS–60/80, 1 page (Japanese language) (Oct. 12, 2000).
De La Rue Cash Systems, Inc., Brochure for ACD Automatic Coin Dispenser, 2 pages (no date).
De La Rue Cash Systems, Brochure for MACH 12 Coin Sorter/Counter, 2 pages (1999).
De La Rue Cash Systems, Brochure for MACH 12HD Coin Sorter/Counter, 2 pages (no date).
Glory, Brochure for GSA–500 Sortmaster, 2 pages (no date).
Magner, Brochure for COINSTREAM™ CPS 502 Self–Service Coin Processing System, 2 pages (no date).
Magner, Brochure for MAG II 100 Series Coin Sorters, 2 pages (no date).
Magner, Brochure for MAG II Model 915 Coin Counter/Packager, 2 pages (no date).
Magner, Brochure for Pelican 305 Coin Sorter, 2 pages (no date).
Magner, Brochure for 900 Series Coin Counters and Packagers, 2 pages (no date).
Cash Depositer System CDS 5700 Product Brochure; (2 pages); undated.
Translation–Cash Depositer System CDS 5700 Product Brochure (5 pages).
ISH I2005/500 SB Coin Counter Product Brochure; (2 pages); undated.
Translation– ISH I2005/500 SB Coin Counter Product Brochure; (2 pages); undated.
CRS–8000 Cash Redemption System GLORY® Cash Handling Systems ad (1 page); undated.
Cash Depositer System CDS 5800 Product Brochure (2 pages); undated.
Translation–Cash Depositer System CDS 5800 Product Brochure (5 pages); undated.
ISH I2005/501 Self–Service Unit Product Brochure (2 pages); undated.
Translation– ISH I2005/501 Self–Service Unit Product Brochure (2 pages); undated.
Article: "No More Lines . . . Self–Serve Cash Out" by Cassius Elston—*Dropstream Developments*, p. 3 (1 page) (dated prior to 1995).
Barton, Louis L., "Check Processing Operations," Chapter 8 and Appendix 2, 1994, pp. 119–140 and 225–231.
Currency System Int'l, Mr. W. Kranister in Conversation With Richard Haycock; pp. 1–5; dated; estimated 1994.
Mosler Inc. brochure "The Mosler/Toshiba CF–420", 1989.
AFB Currency Recognition System, 1982.
JetScan Currency Scanner/Counter, Model 4060, Operator's Manual by Cummins–Allison (8/91).
Sale of JetScan Currency Scanner/Counter, Model 4060 (8/91).
JetScan Currency Scanner/Counter, MOdel 4061, Operating Instructions by Cummins–Allison (Apr. 20, 1993).
Sale of JetScan Currency Scanner/Counter, Model 4061 (Apr. 20, 1993).
JetScan Currency Scanner/Counter, Model 4062, Operating Instructions by Cummins–Allison (Nov. 28, 1994).
Sale of JetScan Currency Scanner/Counter, Model 4062 (Nov. 28, 1994).
Brochure: Cash Deponier Systeme CDS 5700 und CDS 5800; date Jan. 3, 1995.
Brochure for NGZ 2100; date: prior to May 13, 1996.
Brochure for Contomat; date prior to May 13, 1996.
Brochure: PREMA 405 (RE) Self Service Coin Deposit Facility; date prior to May 13, 1996.
Brochure: Scan Coin CDS 600 Cash Deposit System; date Jun. 15, 1994.
Brochure: Scan Coin CDS 640 Cash Deposit System; date Jun. 15, 1994.
Brochure: Cash Receipt System CRS/6501/CRS6510; IREIS; date 2/95.
Cassius Elston, "No More Lines . . . Self Serve Cash–Out"; DropStream Developments; pps.3–4; date: prior to May 13, 1996.
Brochure for ISH I2005/500 SB–Münzähler; date prior to May 13, 1996 with translation.
Brochure for ISH I2005/501 SB–Münzähler; date prior to May 13, 1996 with translation.
Brochure: The New CRS–8000 Cash Redemption System; Glory Cash Handling Systems; date: prior to May 13, 1996.
Brochure (2 pages) for Mach 7 High–Speed Coin Sorter/Counter, Brandt; dated Apr. 1, 1993.
Brochure (2 pages) for Model 8904 Upfeed, High Speed 4–Denomination Currency Dispenser; Brandt; dated prior to May 1996.
Operating Instructions (11 pages) for JetSort® High Speed Sorter/Counter (Kits I & J); Cummins–Allison Corp., dated 1993.
"Toshiba Fitness Sorter CF–400 Series", estimated 1989 or earlier, 6 pages.
Brochure for NGZ, Technical Information, Haft MBH & Co. Vertriebs KG (2pp.) (date unknown).
Brochure: Cashflow Emerald, Ascomb Autelca AG (2 pp.) (3/95).
Toshiba–Mosler Operator's Manual for CF–420 Cash Settlement System; pp. 1 to C–3; copyr. 1989.
Description of Toshiba–Mosler CF–420 Device; estimated 1989.
Currency Systems International, Medium Speed Currency Sorting Family, CPS 600 and CPS 900; 4 pages; date: copyr. 1994.
Glory GSA–500 Sortmaster brochure; 2 pages; date: Jan. 14, 1994.
Glory UF–1D brochure; 2 pages; date: estimated before Aug. 9, 1994.
Glory GFB–200/210/220/230, Desk–Top Bank Note Counter; date: estimated before Aug. 9, 1994.
Revised Drawings of portions of Mosler CF–420 Cash Management System (FIGs. A–C) and description of the same (1989).
Vector Video Tape.
Brochure: Provide Self–Service Solutions for Your Business Customers; Commercial Kiosk; 4 pages.
Brochure: JetSort High Speed Coin Sorter/Counter 2000 Series; Cummins; 2 pages.
Brochure: SR–700 Cash Settlement System; Glory; 4 pages.
Brochure: State–Of–The–Art Coin Processing Comes of Age. JetSort Item No. 50–152; Cummins; 3 pages.
Brochure: 95 Series Coin Sorter/Counter; Brandt; 2 pages.
Brochure: JetSort High Speed Coin Sorters 3000 Series; Cummins; 2 pages.
CA–750 Jetsort Coin Processor; Item No. 50–152; Cummins; 1 page.

Model 920/925; Brandt; 2 pages.
Brochure: Model 958 Coin Sorter/Counter; Brandt; 5 pages.
Brochure: Model 960 High Speed Coin Sorter & Counter; Brandt; 2 pages.
Brochure: Model 966 Microsort Coin Sorter and Counter; Brandt; 4 pages.
Brochure: Model 970 Coin Sorter & Counter, Brandt; 2 pages.
Brochure: Model 954 Coin Sorter/Counter; Brandt; 2 pages.
Brochure: Model 957 Coin Sorter/Counter; Brandt; 2 pages.
Brochure: The Brandt 945 . . . a High Speed Sorting; 2 pages.
Brochure: Model 952 Coin Sorter/Counter; Brandt; 2 pages.
Brochure: Model 940–6 High Speed Sorter/Counter; Brandt; 2 pages.
Brochure: Model 1400 Coin Sorter/Counter; Brandt; 2 pages.
Advertisement: Solving Problems, Pleasing Customers, Building Deposits; Brandt System 930 Electric Counter/ Sorter and Brandt Model 755 Security Stand; 1 page.
Brochure: Model 1205 Coin Sorter/Counter; Brandt; 2 pages.
Brochur: AI–1500 “Pulsar”, Amiel Industries; 13 pages.
Brochure & Letter: Childers Magnum High Speed Coin Sorter; 3 pages.
Brochure: AMT Automated Merchant Teller; Glory; 4 pages.
Brochure: Hamilton’s Express Banking Center; 4 pages.
Brochure: NamSys Express; NamSys Inc.; 2 pages.
Advertisement: “The New Standard–Class Coin Deposit Systems” CRS 6520 and CRS 6525; Reis Eurosystems; 1 page.
Advertisement: CS 3510–Disc–Sorter High–Capacity, High–Speed Coin Sorter, Reis Eurosystems; 1 page.
Advertisement: CDS602 Cash Deposit System; CTcoin; 1 page.
Brochure: ProCash CRS; Siems Nixdorf; 4 pages.
“The Cash Room is History” ATS Money Systems; 4 pages.
“The new idea from ASCOM for self service zones: cash-flow Emerald” ASCOM in banking; 2 pages.
Brochure: Model 817 Automated Coin and Currency Ordering System; Brandt; 2 pages.
“Merchant MicroBranch Combines ATM, After Hour Depository, Rolled–Coin Dispensor,” Bank Technology News; 10/97 or 11/97; 1 page.
“Cash information & Settlement Systems,” Cummins–Allison Corp.; 4 pages.
“CDS Automated Receipt Giving Cash Deposit System,” Case–ICC Limited, 3 pages.
“Scan Coin Technical Referens Manual,” Scan Coin AB, 1989, 7 pages.
“Scan Coin Cash Deposit System,” Scan Coin GmbH, 03/90, 6 pages.
“Scan Coin News,” 05/91, 2 pages.
“Scan Coin Technical Referens Manual,” Scan Coin AB, 1989, pp. 3–93 odd pages only.
“Scan Coin World,” 02/88, 2 pages.
“Technical Manual, Cash Deposit System Model CDS 600 & CDS 640,” Scan Coin AB, 1991, 44 pages.
“Munzgeldeinzhlungen in Selbstbedienung: Cash Deponier System CDS 500,” 6 pages.
“Technical Specificatio ns GBS9401 SB,” Fa GBS–Geld-bearbeitungssysteme, 24 pages.
“Kundenselbstbedienung,” 12 pages.
“Scan Coin Money Processing Systems,” Scan Coin, 8 pages.
“Royal Bank Opens ‘Super Branch,’” Murry Oxby, The Gazette Montreal, Sep. 14, 1991, article, 1 page.
“High–Tech Bank Counts Coins,” Carolyn Leitch, Sep. 18, 1991, article, 1 page.
“Royal’s Burlington Drive–in Bank Provides Customers 24–Hour Tellers,” Jade Hemeon, Toronto Star, Aug. 21, 1991, article, 1 page.
“Bank Blends New Technology With Service,” Martin Cash, Sep. 4, 1992, article, 1 page.
“Scan Coin International Report,” Scan Coin, 4/87–92, 49 pages.
Royal Bank Brochure, 2 pages.
“Scan Coin, Technical Manual, CDS MK 1 Coin Deposit System,” Scan Coin AB, 1991, pp. 1–30.
“User’s Manual Scan Coin CDS 600,” Scan Coin, 23 pages.
“Scan Coin Service Information– Technical Manual SC 102 Value Counter,” Scan Coin AB, 29 pages.
“Scan Coin CDS 640 Cash Deposit System,” Scan Coin, Inc., 2 pages.

* cited by examiner

CURRENCY PROCESSING MACHINE WITH MULTIPLE INTERNAL COIN RECEPTACLES

CROSS-REFERENCE TO RELATED APPLICATION

This application is a continuation-in-part of U.S. patent application Ser. No. 09/562,231 entitled "Currency Processing Machine With Multiple Internal Coin Receptacles," which was filed on Apr. 28, 2000, now U.S. Pat. No 6,318,537, and the assignee of the present invention; which is a complete application of U.S. Provisional Patent Application No. 60/131,635, entitled "Currency Processing Machine With Multiple Internal Coin Receptacles," which was filed on Apr. 28, 1999. U.S. Pat. application No. 09/562,231 issued as U.S. Pat. Ser. No. 6,318,537 on Nov. 20, 2001.

FIELD OF THE INVENTION

The present invention relates generally to currency processing machines, and, in particular, to a currency redemption machine which accepts bulk coins and selectively distributes the coins into one of a plurality of coin receptacles.

BACKGROUND OF THE INVENTION

Currency processing machines generally have the ability to receive bulk coin and/or bank notes from a user of the machine. The currency processing machine may be a redemption type of machine wherein, after the deposited coins and/or bank notes are counted, funds are returned to the user in a pre-selected manner determined by the user, or to a card which stores electronic money, such as a smartcard. Alternatively, the machine may be a simple deposit type of machine where funds which have been deposited by the user are credited to his or her account.

In these currency processing machines, the bulk coins that are received from users are typically sorted into individual denominations and deposited into containers corresponding to each respective denomination as sorted. When these containers have reached their capacity, the operator of the currency processing machine must then physically remove the full container and replace it with an empty container so that the machine can be returned to its operational state. However, in many environments, the coins deposited by the user into the currency processing machine are removed from the currency processing machine and recirculated into other types of coin discharging machines.

For example, in casinos, gaming machines must be filled by a bag commonly referred to as a "hopper fill bag" which contains a known amount of tokens/coins so hat the gaming machine can discharge payouts to users who have won a jackpot. In some existing currency processing machines, the tokens/coins are held in a coin container and subsequently discharged from the machine through an exterior spout. When the machine is full of tokens/coins or when a gaming machine requires a fill of tokens/coins, a casino employee (e.g. the machine operator) manually places a hopper fill bag over the exterior spout and instructs the machine to fill it. The casino employee then transports the hopper fill bag to a gaming machine requiring additional tokens/coins.

One disadvantage associated with prior art currency processing machines is the large amount of time required for an operator (e.g. a casino employee) to unload the processed coins from the machine. Such a large amount is required because some machines utilize a single convey track to move coins from internal coin containers to an exterior spout to dispense the coins to the operator. An associated disadvantage, is that many of these prior art machines are unable to transact with a user while the operator is unloading the processed coins from the currency processing machines. Another associated disadvantage is that some prior art machines recirculate coins received from a user and then use those same coins when discharging coins to another user. These machine take a significant amount of times to obtain the appropriate coins from within the machine and then to dispense the coins to the user.

SUMMARY OF THE INVENTION

A currency processing machine for processing currency including coins of mixed denominations that are input by a user comprises a coin counter for determining the aggregate value of the coins of mixed denominations, a coin bin for holding the counted coins discharged from the coin counter, and a coin sorter for storing coins discharged from the coin bin.

The above summary of the present invention is not intended to represent each embodiment, or every aspect, of the present invention. Additional features and benefits of the present invention will become apparent from the detail description, figures, and claim set forth below.

BRIEF DESCRIPTION OF THE DRAWINGS

Other objects and advantages of the invention will become apparent upon reading the following detail description in conjunction with the drawing in which.

DETAILED DESCRIPTION OF THE DRAWINGS

Figure 1:
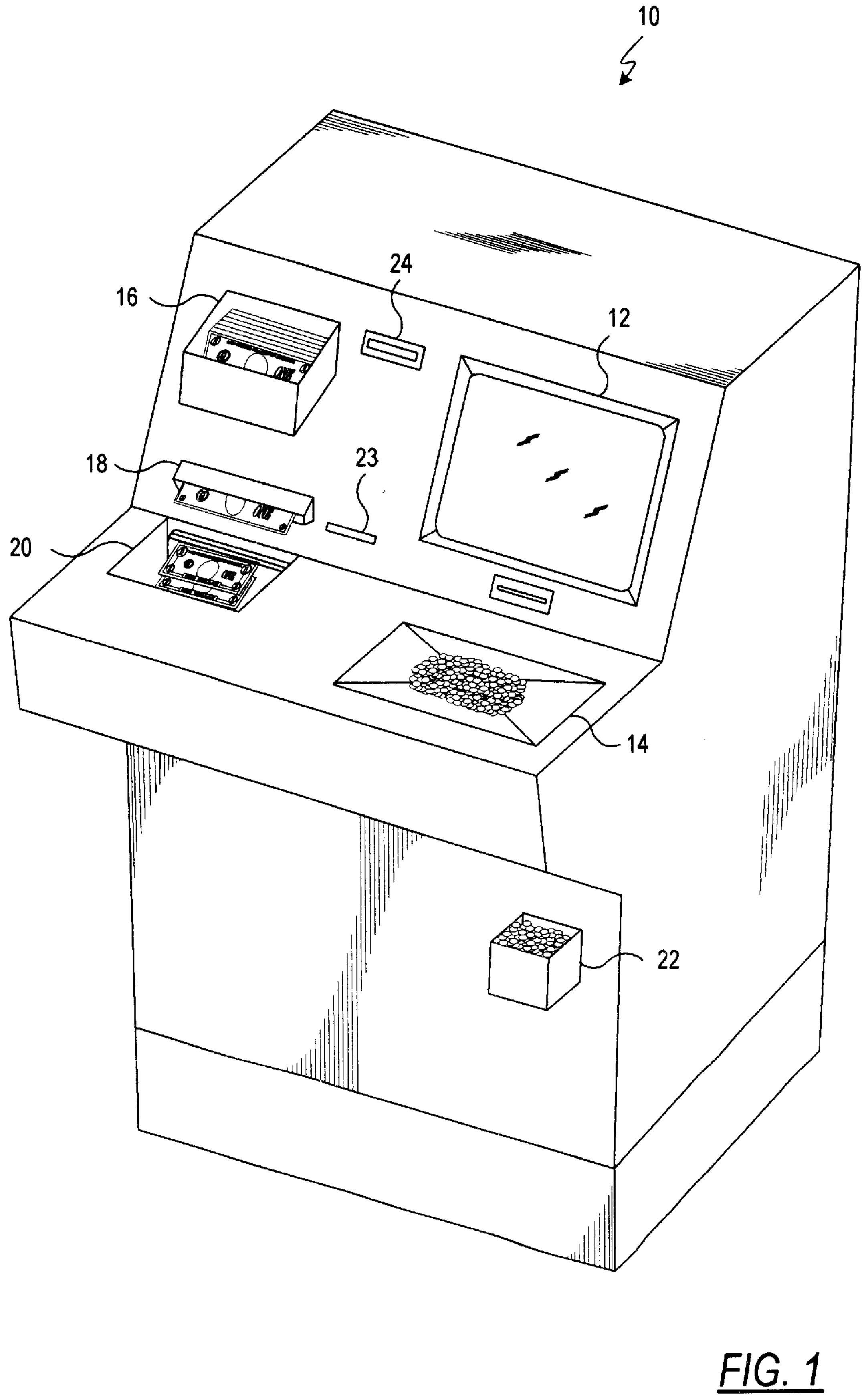
FIG. 1 is a perspective view of the currency processing machine of the present invention.

Referring now to FIG. 1, the currency processing machine 10 includes a touch screen 12 to provide inputs from a machine user and also to display outputs to be viewed by the user. While the touch screen 12 is the preferred mode to enter data from the user, the currency processing machine 10 may also include a mechanical keyboard to receive such inputs.

The currency processing machine 10 includes a coin receptacle 14 which receives coins of a single denomination or of a mixed denomination from a user. Additionally, a bank note receptacle 16 is included within the currency processing machine 10. The bank note receptacle 16 is illustrated in its open position in FIG. 1 and is retracted by the currency processing machine 10 once the bulk currency has been placed therein by the user. These input devices 14 and 16 allow the user of the currency processing machine 10 to input his or her funds which will ultimately be converted to some other sort of fund source that is available to the user. In addition to banknotes, the bank note receptacle 16 of the currency processing machine 10 can also accommodate casino scrip, paper tokens, or bar coded tickets.

The currency processing machine 10 includes a bank note dispenser 20 and a dispensed coin receptacle 22 for dispensing to the user the desired amount of funds in both bank notes and coins. A bank note return slot 18 may also be included within the currency processing machine to return notes to the user which cannot be authenticated. Coins which cannot be authenticated may be returned to the user via the dispensed coin receptacle 22. The currency processing machine 10 further includes a paper dispensing slot 23 for providing a user with a receipt of the transaction that he or she has performed.

In its simplest form, the currency processing machine 10 receives funds via the coin input receptacle 14 and the bank note receptacle 16, and after these deposited funds have been authenticated and counted, the currency processing machine 10 returns to the user an amount equal to the deposited funds but in a different variation of bank notes and coins. For example, the user of the currency processing machine 10 may input $102.99 in various small bank notes and pennies and in turn receive a $100 bank note, two $1 bank notes, three quarters, two dimes, and four pennies.

Alternatively, the currency processing machine 10 may simply return a receipt of the transaction through the paper dispensing slot 23 which the user can redeem for funds by an attendant of the currency processing machine 10. Alternatively, the currency processing machine 10 can credit a user's account.

The currency processing machine 10 may also include a media reader slot 24 into which the user inserts his or her identification card so that the currency processing machine 10 can identify the user. In other embodiments, the media reader 24 can accepts and read bar coded receipts. The touch screen 12 typically provides the user with a menu of options which prompts the user to carry out a series of actions for identifying the user by displaying certain commands and requesting that the user depress touch keys on the touch screen 12 (e.g. a user PIN). The currency processing machine 10 has a media reader device which is capable of reading from or writing to one or more types of media. This media may include various types of memory storage technology such as magnetic storage, solid state memory devices, and optical devices.

Figure 2:
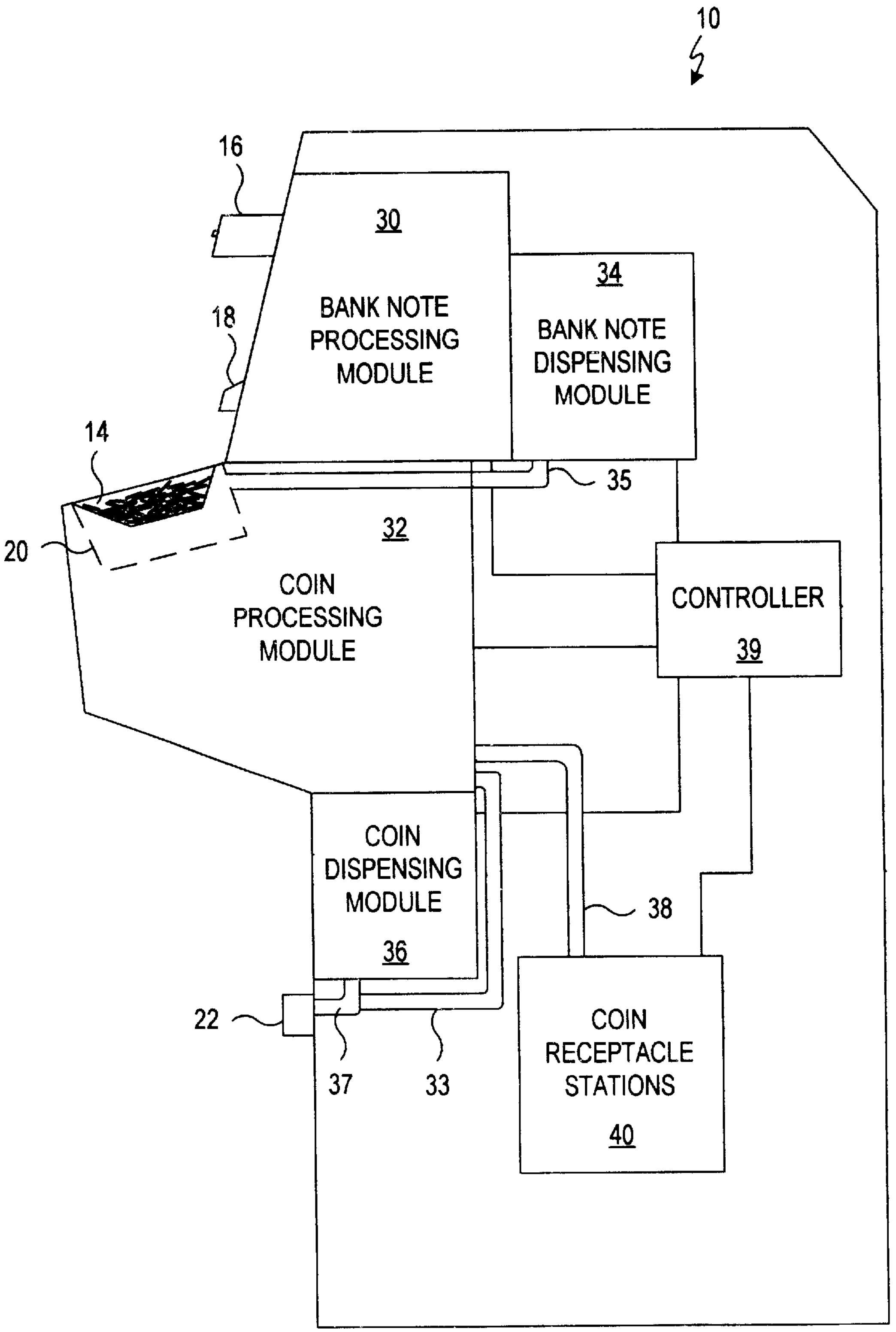
FIG. 2 is a side view of the currency processing machine of FIG. 1 which schematically illustrates the various modules present in the currency processing machine.

FIG. 2 illustrates the currency processing machine in a side view illustrating the various modules. The bank note processing module 30 receives bank notes from the bank note receptacle 16 for processing. The inward movement of the bank note receptacle 16 positions a stack of bills at the feed station of the bank note scanning and counting device which automatically feeds, counts, scans, authenticates, and sorts the bank notes, one at a time at a high rate of speed (e.g. at least 350 bills per minute). In place of or in addition to the bank note receptacle 16, the currency processing machine 10 may include a single bank note receptacle which receives and processes one bank note at a time. The bank notes that are recognized by the bank note processing module 30 are delivered to a currency canister of a type. When a bank note cannot be recognized by the bank note processing module 30, it is returned to the customer through the bank note return slot 18. Exemplary machines which scan, sort, count, and authenticate bills as required by the bank note processing module are described in U.S. Pat. Nos. 5,295,196, 5,870,487, 5,875,259 which are herein incorporated by reference in their entireties.

In place of or in addition to the bank note receptacle 16, the currency processing machine 10 may include a single bank note receptacle which receives and processes one bank note at a time. Such a single bank note receptacle would be placed at the front of the currency processing machine 10.

The currency processing machine 10 also includes a coin processing module 32. The coin processing module 32 sorts, counts and authenticates the mixed coins which are deposited in the coin input receptacle 14 which leads directly into the coin processing module 32. The coins are sorted in the coin processing module 32 in a variety of ways but the preferred method is a sorting based on the diameter of the coins. When a non-authenticated coin is determined by the coin processing module 32, it is directed through a coin reject tube 33 which leads to the dispensed coin receptacle 22. Thus, the user who has entered such a non-authenticated coin can retrieve the coin by accessing the dispensed coin receptacle 22. Coin sorting and authenticating devices which can perform the function of the coin processing module 32 are disclosed in U.S.

Pat. Nos. 5,299,977, 5,453,047, 5,507379, 5,542,880, 5,865,673, 5,997,395 which are herein incorporated by reference in their entireties. Alternatively, other coins sorters such as a rail sorted can be used to perform the function of the coin processing module 32.

The currency processing machine 10 further includes a bank note dispensing module 34 which is connected via transport mechanism 35 to the bank note dispenser 20 that is accessible by the user. The bank note dispensing module 34 typically dispenses loose bills in response to a request of the user for such bank notes. Also, the bank note dispensing module 34 may be configured to dispense strapped notes into the bank note dispenser 20 if that is desired. In one embodiment of the present invention, the user may select the denomination of the loose or strapped bills dispensed to the user.

The currency processing machine 10 also includes a coin dispensing module 36 which dispenses loose coins to the user via the dispensed coin receptacle 22. The coin dispensing module 36 is connected to the dispensed coin receptacle 22 via a coin tube 37. Thus, the user of the currency processing machine 10 has the ability to select the desired coin denominations that he or she will receive in response to a transaction.

The coins which have been sorted into their denomination by the coin processing module 32 are sent to coin tubes 38 which correspond to each specific denomination. The coin tubes 38 lead to a coin receptacle station 40 for each of the denominations that are to be sorted and authenticated by the coin processing module 32.

The currency processing machine 10 includes a controller 39 which is coupled to each module within the currency processing machine 10 and controls the interaction between each module. For example, the controller 39 may review the input totals from the funds processing modules 30 and 32 and direct an appropriate funds output via the funds dispensing modules 34 and 36. The controller 39 also directs the operation of the coin receptacle stations 40 as described below. While not shown, the controller 39 is also coupled to the media reader associated with the media reader slot 24 and also to the printer at the receipt dispenser 23, if these devices are present on the coin processing mechanism 10.

Figure 3:
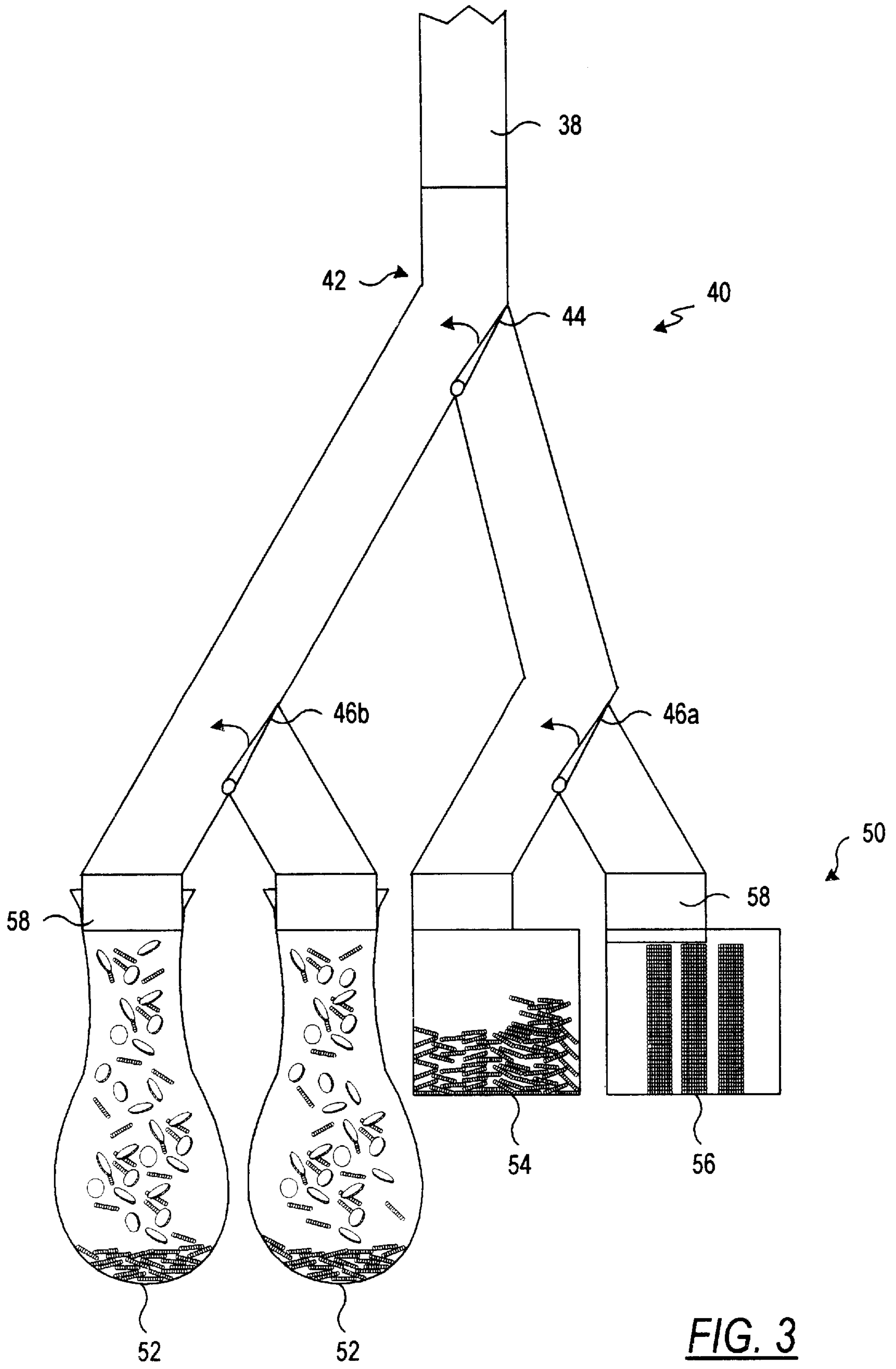
FIG. 3 illustrates a coin receptacle station of the currency processing machine which relies on a plurality of diverters to divert coins between specific coin receptacles.

FIG. 3 illustrates one type of coin receptacle station 40 which includes a coin distribution device 42 having a primary diverter 44 and two secondary diverters 46. Essentially, the coin distribution device 42 has a double-Y configuration such that coins which flow from coin tube 38 for a particular denomination can be placed into four different coin receptacles 50. The coin receptacles 50 can be of a variety of types of common coin receptacles such as a coin bag 52 (either cloth or plastic), a coin container 54 (which is usually rigid), or a rigid coin cartridge 56 which is useful for storing stacked coins. Each of these coin receptacles 50 are attached to the coin distribution device 42 through a receptacle mounting mechanism 58. These coin receptacle mounting mechanisms 58 can be of a variety of devices including a pivotal clamp, a sliding clamp, or a quick release fastener among others. The purpose of these receptacle mounting mechanism 58 is to physically attach the coin receptacles 50 to the coin distribution device 42 and hold the coin receptacles 50 in place while they are being filled with coins.

A controller (not shown) for the coin receptacle station 40 moves the diverters 44, **46*a* and 46*b* in response to receiving a communication from the controller 39 of the currency processing machine 10 indicating that a switch of the coin flow between the coin receptacles 50 is necessary. The controller for the coin receptacle station 40 actuates motors or solenoids which moves the primary diverter 44 and or the secondary diverters 46*a* and 46*b*. Accordingly, the motors or solenoids, in conjunction with the primary diverter 44 and secondary diverters 46*a* and 46*b*, can be used to selectively distribute the coins to the appropriate coin receptacles 50. While the coin receptacle station 40 may have its own controller as stated, the controller 39 of the currency processing machine 10** may directly operate the solenoids or motors.

When the currency processing machine 10 is used in a casino environment, the coin bag 52 which is chosen for an installation within the coin receptacle stations 40 is of the type which is commonly referred to as a “hopper fill bag.” The hopper fill bag contains a known amount of tokens which is used to replenish a slot machine or other gaming machine that dispenses some sort of jackpot payout. Accordingly, the currency processing machine 10 becomes the source for filled hopper fill bags that are available to be deposited in various gaming machines located throughout the casino.

It should also be noted that the number of coin receptacles 50 per coin station 40 can vary. While four are shown, the number of receptacles 50 can be less than or more than four. Further, there may be a need for simply one receptacle 50 at one or all of the stations 40. For example, the receptacle 50 may be the hopper fill bag described above such that the authorized casino employee simply exchanges the one hopper fill bag with an empty hopper fill bag. Also, in casino environments where the use of a particular token/coin denomination is more prevalent than other denominations (e.g. $1 tokens), the coin receptacle station 40 for such a denomination preferably has more coin receptacles 50 than the other denominations since these receptacles 50 may become filled at a higher frequency.

Furthermore, in an alternative embodiment, the coin processing module 32 only counts the coins and does not sort them. Or, it may tabulate the value of the coins that are processed without sorting them. In either of these situations, the coins are sent from the coin processing module 32 to the coin receptacle station 40 as mixed coins. Because the coins are not being sorted into denomination, the currency processing machine 10 only requires one receptacle station 40 which collects all of the mixed coins. Thus, the flow of the mixed coins into a plurality of receptacles 50 at the one coin receptacle station 40 can be controlled by the currency processing machine 10 and, as discussed below, by an external host system.

Figure 4:
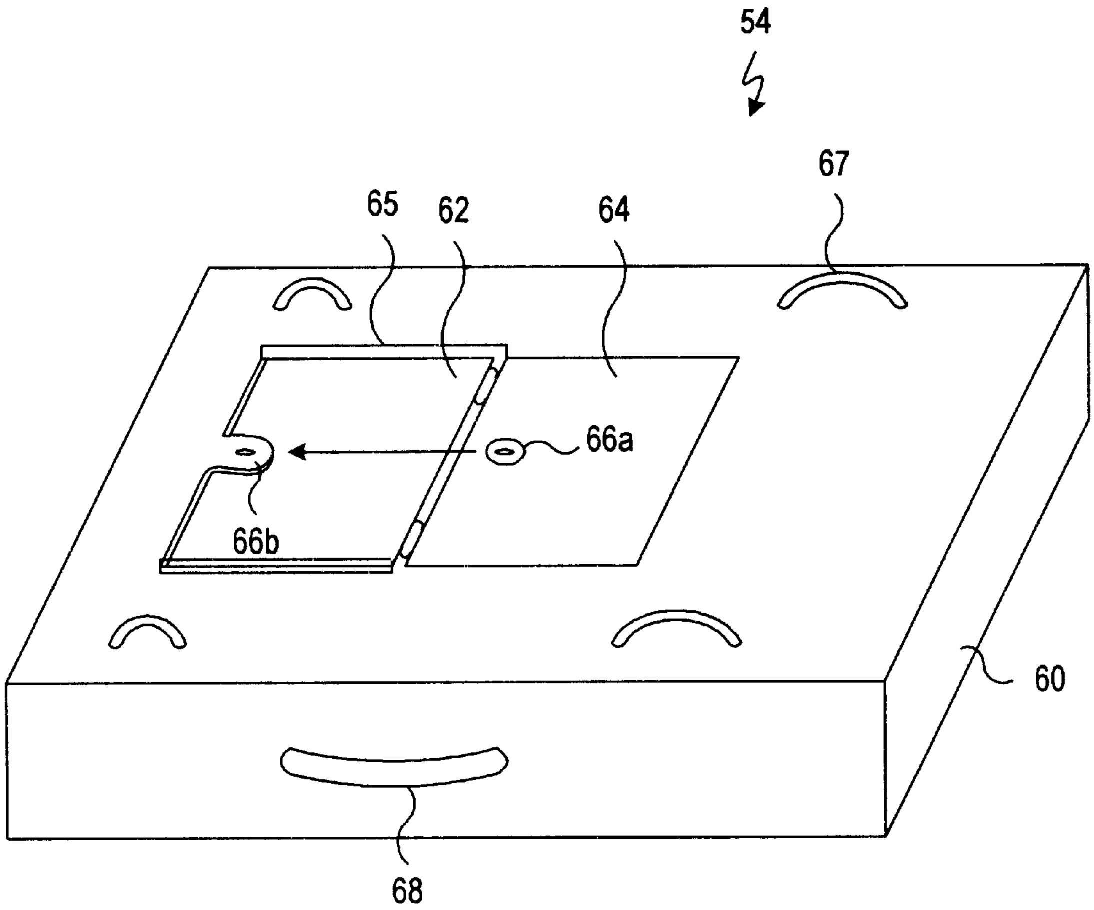
FIG. 4 illustrates a coin container that is useful in the currency processing machine.

FIG. 4 illustrates in more detail the type of coin receptacle 50 which has been referred to as the rigid container 54. The rigid container 54 includes a housing 60 made typically of a hard polymeric material or a metal. The housing 60 includes an opening 62 which is aligned with one of the output apertures of the coin distribution device 42 shown in FIG. 3. The opening 62 can be closed via a sliding door 64 which moves along a pair of guide structures 65 on the sides of the opening 62. The door 64 includes a locking structure 66*a* which mates with a corresponding locking structure on 66*b* on the housing 60 to provide security to the rigid coin container 54.

Additionally, the rigid coin container 54 includes a structure which allows it to be mounted to one of the receptacle mounting mechanisms 58. As shown, the rigid container 54 includes a plurality of hook mounts 67 which would mate with projecting fingers present on the receptacle mounting mechanism 58 to hold the rigid container 54 in place. However, several other mounting mechanisms are available and can be used on the rigid container 54. The rigid container 54 preferably includes a handle 68 such that the operator of the currency processing machine can easily grasp the rigid container 54 when manually transporting it.

Figure 5:
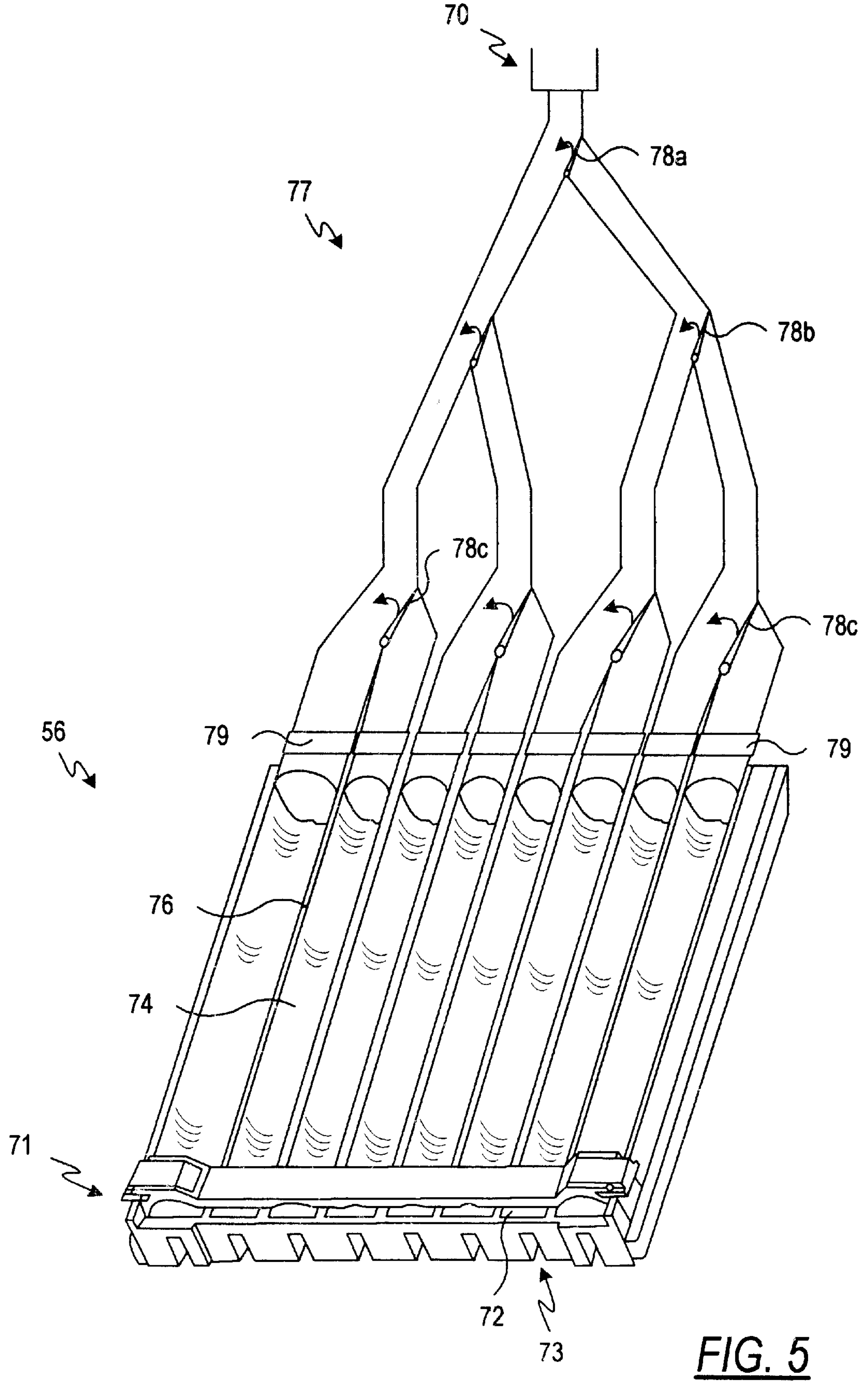
FIG. 5 illustrates one type of coin cartridge which is useful as a coin receptacle for the currency processing machine.

FIG. 5 illustrates one type of coin cartridge 56 which is useful for storing stacks of coins of a particular denomination. The coin cartridge 56 includes an entry end 70 and a discharge end 71. The entry end 70 receives coins from the distribution device 42 (FIG. 3) after they have been sent from the coin processing module 32 through the coin tube 38. The discharge end 71 is useful when the coin cartridge 56 is removed from the currency processing machine 10 and placed in a different machine where the discharge of coins is required. For example, after being filled by the currency processing machine 10, the coin cartridge 56 can then be placed into a common change machine where a bank note is deposited and coins of a particular denomination are discharged in response to the receipt of the bank note. The discharge end 71 includes a discharge slot 72 through which coins are dispensed from the cartridge 56 by moving a plunger type device through access region 73.

Preferably, the coin cartridge 56 includes a plurality of semi-cylindrical coin recesses 74 which are spaced from each other by a separating structure 76. This allows for several stacks of coins of a particular denomination to be held within one coin cartridge 56. The coin cartridge 56 may include a cover not shown which is placed adjacent to but spaced from the main body shown in FIG. 5 such that when the cartridge 56 is full, it can be entirely closed by the cover for transportation. Alternatively, the separating structures 76 may be positioned around more than 180° of the coin stacks so that the coins are retained therein and only the edges of the coins in the stacks are visible.

The coin cartridge 56 receives coins from a coin distributor 77 near the entry end 70. The coin distributor 77 includes a plurality of diverters 78 including a primary diverter 78*a*, two secondary diverters 78*b*, and four tertiary diverters 78*c*. The coin distributor 77 may also include a stacking mechanism 79 which can be a coin stacking shutter/platform as used in a coin wrapping machine to hold coins in a stack before wrapping. This ensures that the coins lie within a stack that will fit into the cylindrical coin recess 74. Alternatively, the stacking mechanism 79 may simply include a funnel device which assists in the coins lying flat as they enter the cylindrical coin recesses 74.

In a preferred embodiment, the coin cartridge 56 that is filled by the coin receptacle stations 40 for each denomination is the same type of coin cartridge that is used by the coin dispensing module 36 (FIG. 2). When the controller 39 of the currency processing machine 10 detects that the coin dispensing module 36 is low in coins of a particular denomination, the cartridge 56 from the coin receptacle station 40 within that currency processing machine 10 can be used to replenish the coin cartridge within the coin dispensing module 36. Thus, by providing a coin cartridge 56 that is compatible with both the coin dispensing module 36 and the coin receptacle station 40, the currency processing machine 10 can recycle coins which are deposited by users.

Further, if the design of the coin cartridge 56 is chosen to be compatible with the standard coin cartridges present in various coin-dispensing machines throughout a casino, the coin cartridges 56 that are filled within each coin receptacle station 40 can be used for replenishing an empty coin cartridge in those machines (e.g. a slot machine or a change machine). In other words, the currency processing machine 10 would be the source for filled coin cartridges to be placed in various machines throughout the casino that dispense coins via coin cartridges.

Alternatively, the coin receptacle station 40 may have a coin conveyor that is positioned in place of one of the coin receptacles 50 that are filled at a coin receptacle station 40. The coin conveyor would receive coins from the coin processing module 32 and directly transport coins of a particular denomination from a coin receptacle station 40 to the coin dispensing modules 36 so that coins can be continuously recirculated between the coin receptacle station 40 and the coin dispensing modules 36.

Furthermore, each of the coin receptacle stations 40 may include, instead of one of the coin receptacles 50, a conveyor system which securely transports coins from the back of the currency processing machine 10 to, for example, a casino money room or bank vault. Thus, coins may be directly removed from the currency processing machine 10 as opposed to being received in the coin receptacles 50. If the currency processing machine 10 is used in a casino environment, the conveyor which is coupled to the coin receptacle stations 40 may lead directly to an adjacent gaming machine such that the currency processing machine 10 is used for recycling coins or tokens to that adjacent gaming machine.

Figure 6:
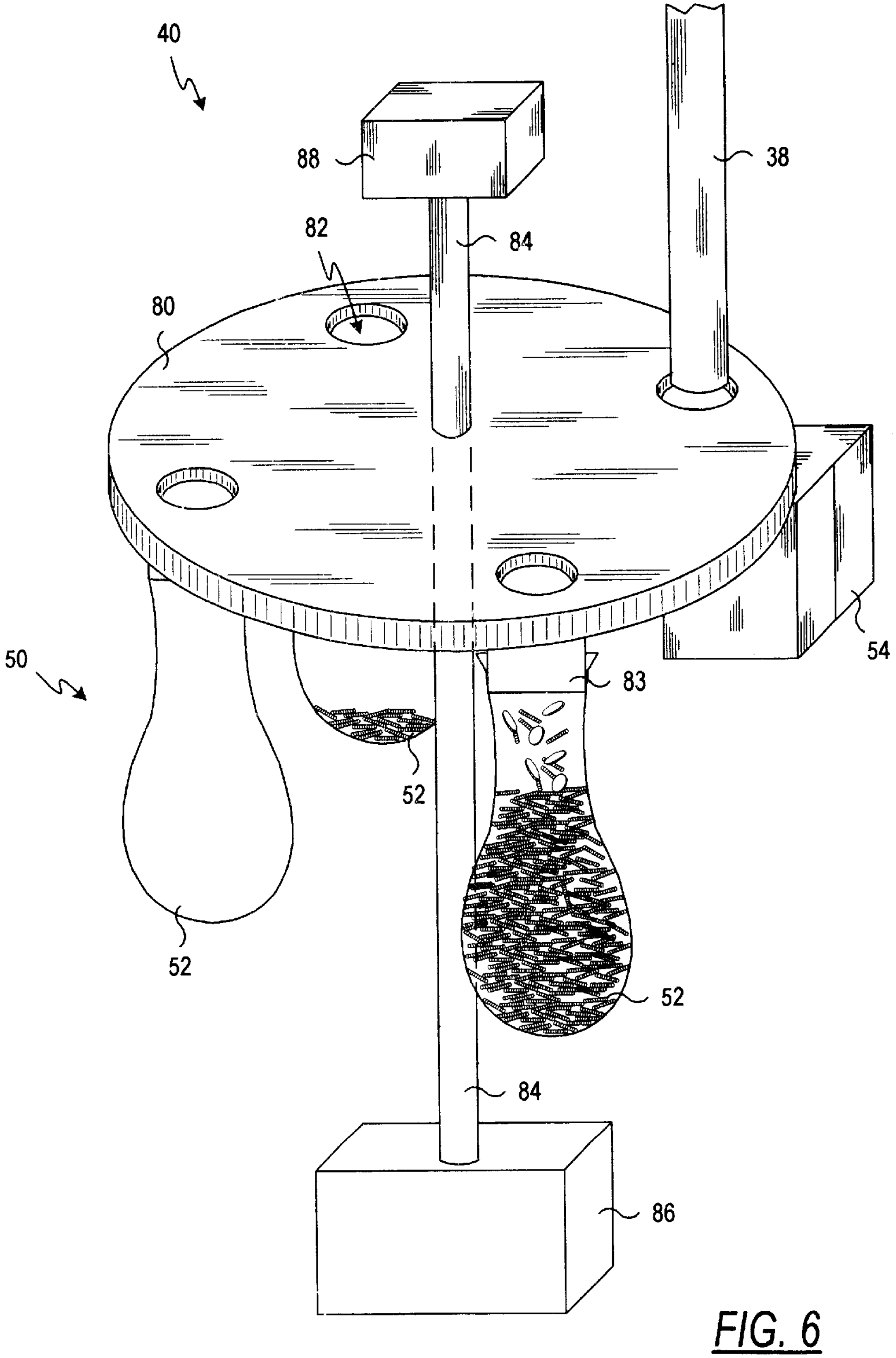
FIG. 6 illustrates an alternative coin distribution mechanism for a coin receptacle station which employs a moving carousel to move the coin receptacles below a coin distribution.

FIG. 6 illustrates an alternative coin receptacle station 40 which includes a carousel 80 having a plurality of apertures 82. Below each aperture 82 is a coin receptacle mounting mechanism 83 for mounting a coin receptacle 50. As shown, the number of apertures 82 is four for feeding coins into four different coin receptacles 50. In the embodiment shown in FIG. 6, the four coin receptacles being used are three coin bags 52 and one rigid coin container 54.

The carousel 80 is mounted to a shaft 84 which is driven by a motor 86. A bearing support 88 opposes the motor 86 and supports the shaft 84. The center point of the carousel 80, where the shaft 84 intersects the carousel 80, is at a fixed position relative to the coin tube 38 which is discharging coins of one coin denomination from the coin processing module 32. The apertures 82 are positioned on a radius from the central point of the carousel 80 that is equal to the distance separating the coin tube 38 from the center point of the carousel 80. Thus, as the carousel 80 rotates via the motor 86, each of the apertures 82 can be moved directly under the coin tube 38.

The motor 86 is controlled by the controller of the coin receptacle station 40. In response to the controller for the coin receptacle station 40 receiving a signal from the controller 39 for the currency processing machine 10 indicating that the coins should be deposited into a different coin receptacle 50, the motor 86 is actuated and rotates the carousel 80 so that the desired aperture 82 (and coin receptacle) is placed under the coin tube 38. The controller 39 for the currency processing machine 10 sends this instruction in response to a preselected number of coins entering a certain coin receptacle 50, as counted by the coin processing module 32, or in response to a demand to fill a specific type of coin receptacle 50 (e.g. a need for coin hopper fill bags, in a casino). Alternatively, the motor 86 can be directly controlled by the controller 39 for the coin processing machine 10.

Figure 7:
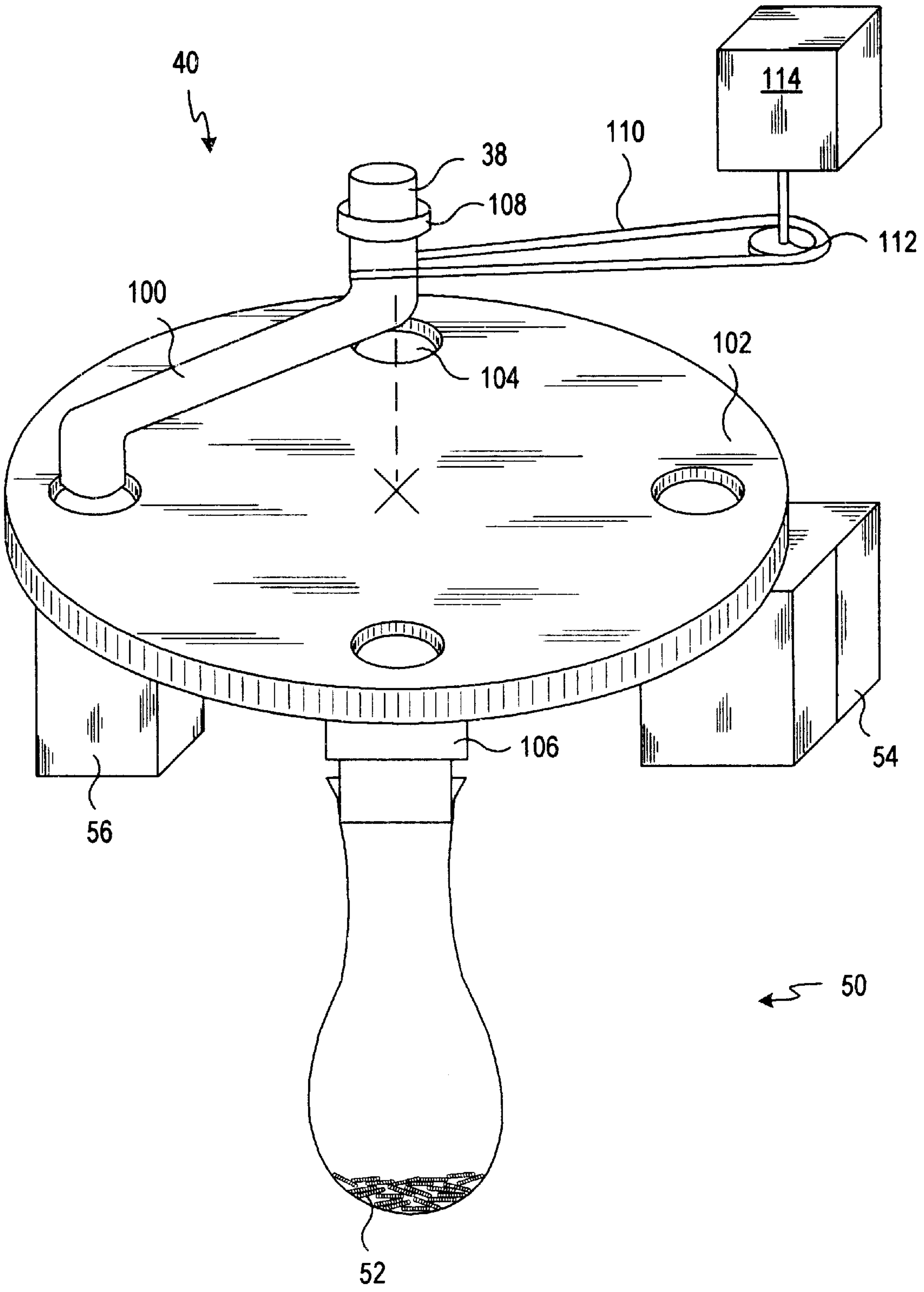
FIG. 7 illustrates an alternative coin distribution mechanism which employs a movable coin distribution tube to direct coins to coin receptacles.

Referring now to FIG. 7, another alternative coin receptacle station 40 is illustrated which includes a rotatable distribution tube 100 which is attached to the coin tube 38 that is coupled to the coin processing module 32. A platform 102 has a plurality of apertures 104 through which the coins pass after leaving the rotatable distribution tube 100. Below each of the apertures 104 is a receptacle mounting structure 106 allowing for the attachment of the coin receptacles 50, which as shown in FIG. 7, are a coin bag 52, a rigid coin container 54, and a coin cartridge 56.

To allow the rotatable distribution tube 100 to rotate around the coin tube 38, a bearing element 108 is present at the interface of these two tubes. A belt 110 which is coupled to a rotational driver 112 is also attached to the rotatable distribution tube 100. The driver 112 is coupled to a motor 114 which is controlled by the controller for the coin receptacle station 40. Alternatively, the motor 114 can be directly controlled by the controller 39 of the currency processing machine 10.

The coin tube 38 is generally centered over the central point of the platform 102. The rotatable distribution tube 100 has a radius defined between its entrance portion adjacent to the coin tube 38 and its exit portion through which the coins are discharged. This radius corresponds substantially to the radius at which each of the apertures 104 is placed relative to the central point of the platform 102. Thus, rotation of the rotatable distribution tube 100 causes its exit portion to be moved between apertures 104 in response to the controller 39 of the currency processing machine directing the coin receptacle station 40 to change the flow of coins to a particular coin receptacle 50.

While the invention has been described thus far with three alternative coin distribution mechanisms within the coin receptacle station 40, other possible configurations exist as well. For example, the coins may be distributed from a coin tube to one receptacle 50 which, after being filled or in response to a demand for a different receptacle that must be filled, is physically moved away from the coin tube and automatically replaced by the alternate receptacle. Such a configuration can be accomplished, for example, by moving the receptacles 50 on a chain and gear arrangement. Further, the receptacles 50, once filled, can be transported to a secondary transport system which moves the filled receptacles to a desired location within the currency processing machine 10 or removes the filled receptacles from the currency processing machine 10. Such a secondary transport mechanism may be, for example, a conveyer system.

Figure 8:
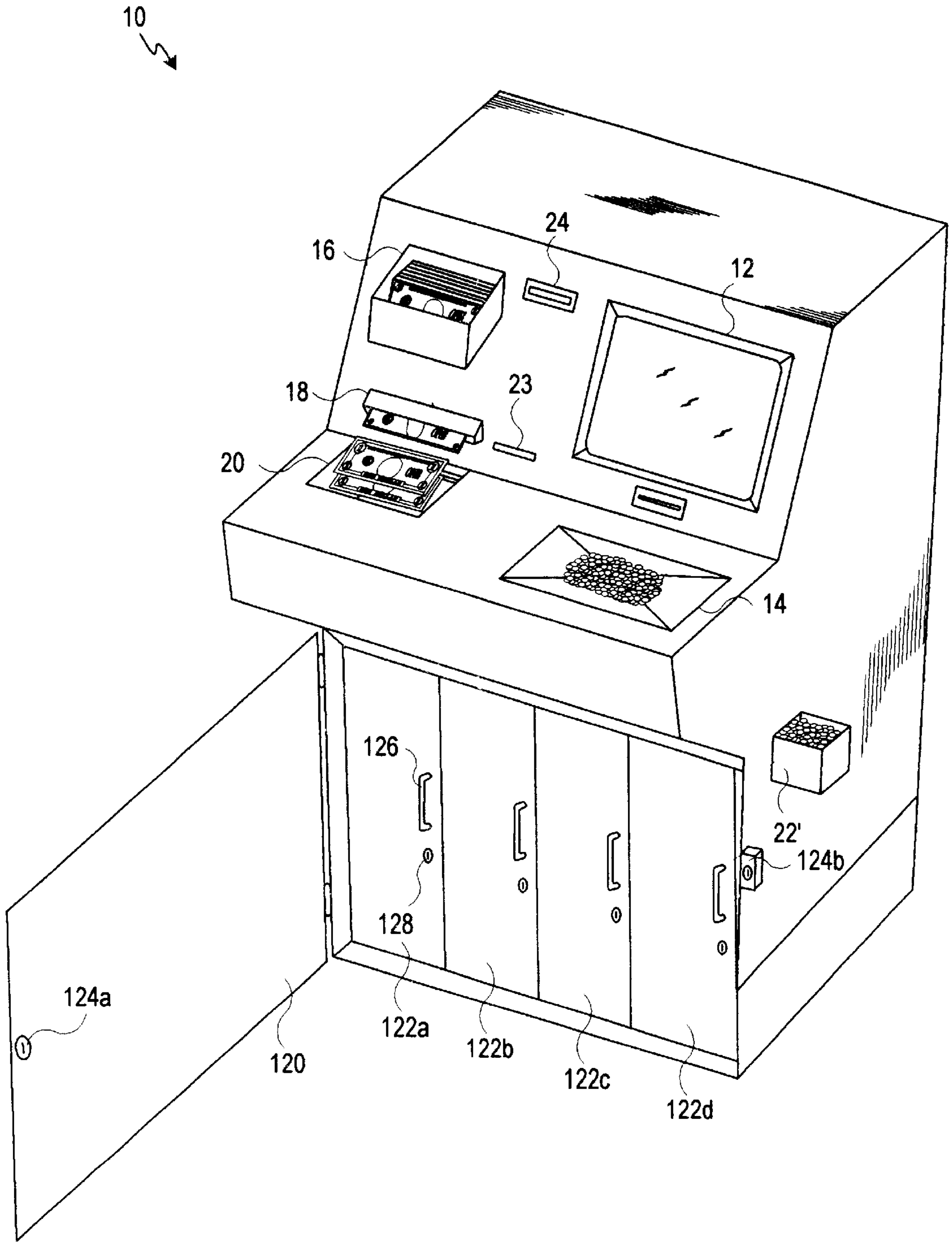
FIG. 8 is a perspective view of the currency processing machine in FIG. 1 which includes security doors for each denomination.

Referring now to FIG. 8, the currency processing machine 10 shown is similar to the currency processing machine in FIG. 1 but includes a primary security door 120 leading to a plurality of denominational specific doors 122*a–d*. The primary security door 120 includes the primary lock 124*a* and 124*b* located on the door and the housing, respectively, of the currency processing machine 10. Each of the denominational specific security doors 122 also includes a handle 126 and also a lock 128. The dispensed coin receptacle 22 which is shown in FIG. 1 as being located in the front of the coin processing machine 10 has been moved to the side of the machine as coin receptacle 22' in FIG. 8. Alternatively, this dispensed coin receptacle 22 could be placed on the front of the coin processing machine 10 as a recess which is adjacent to the coin input receptacle 14 or the bank note dispenser 20.

The denomination specific security doors 122 allow for access to a single coin denomination having coin receptacles 50 which must be exchanged or otherwise accessed. Thus, authorized personnel will not have access to the coin receptacles 50 of the other denominations while performing functions relative to the coin denomination requiring attention.

This security process can be further enhanced by utilization of the media reader slot 24 on the currency processing machine 10. Here, the authorized personnel would first insert a card to the media reader slot 24 which identifies him or her as a particular authorized person. The locks 128 for each denominational specific security door are electronically connected to the controller 39 of the currency processing machine 10. Thus, after the authorized person has entered his or her card into the media reader slot 24 and opens a particular denominational specific security door 122, this action is logged into the memory of the currency processing machine 10. Accordingly, the currency processing machine 10 keeps track of which of the authorized personnel had access to which denominational specific security door 122. In a further alternative to this security system, each of the coin receptacle mounting structures (e.g. mounting structure

106 in FIG. 7) can be electronically connected to the controller 39 for the currency processing machine 10 such that the activities with respect to each specific coin receptacle 50 within each coin receptacle stations 40 are monitored.

Figure 9A:
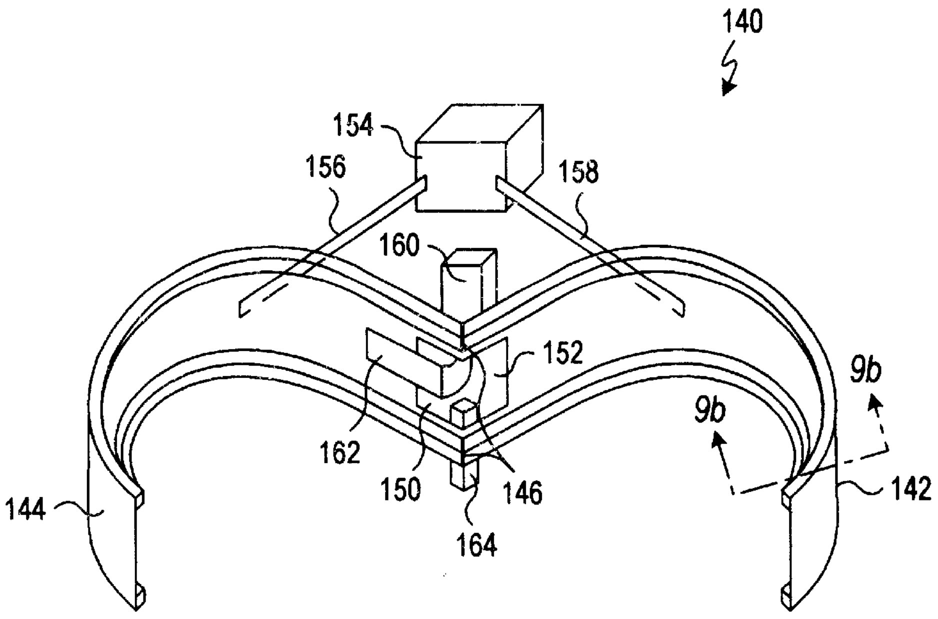
FIGS. 9*a*–9*c* illustrate one type of bag sealing device which is useful in the currency processing machine.
Figure 9B:
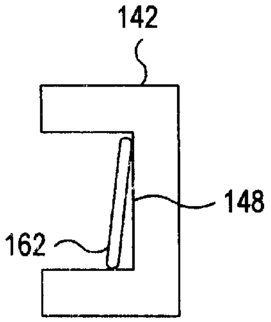
Figure 9C:
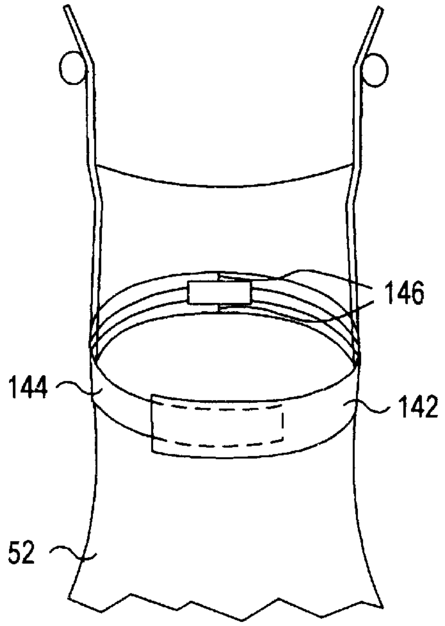

Referring now to FIGS. 9*a*–9*c*, a bag sealing device 140 is illustrated which includes a right crimp arm 142 and a left crimp arm 144. The arms 142 and 144 are connected at their ends by a hinge 146. As shown best in FIG. 9*b*, each of the crimp arms 142 and 144 includes a seal guide surface 148 which is recessed from the innermost surface of the respective arms 142 and 144.

Near the hinge 146, the right crimp arm 142 and left crimp arm 144 include apertures 150 and 152, respectively. The aperture 150 provides an entrance for the sealing media 162 (e.g. a wire, a tape which includes an internal metal structure, or tape with adhesive) into the crimp arms 142 and 144 after the crimp arms 142 and 144 have been clamped around the coin bag 52 as shown in FIG. 9*c*. In their clamping position, the end of the left crimp arm 144 fits within the guide surface 148 of the right crimp arm 142. The sealing media 162 moves along the sealing guide surface 148 of the two arms before eventually returning to the aperture 152 where it exits from the arms 142 and 144.

The bag sealing device 140 includes a feed mechanism 160 for moving the seal media 162 through the apertures 152 when the crimp arms 142 and 144 are in their crimping position as shown in FIG. 9*c*. After the leading end of the seal media 162 has been wrapped around the circumference of the bag 52, the leading and trailing ends of the seal media 162 are attached by clamping mechanism 164 located adjacent to the apertures 150 and 152.

To move the crimp arms 142 and 144 to their closed position, at least one motor 154 is provided which has linkages 156 and 158 attached to the left crimp arm 144 and right crimp arm 142, respectively. Thus, when the coin receptacle is a coin bag 52 and a preselected number of coins has been deposited to the coin bag 52, the coin receptacle station 40 has the ability to provide a tamper-proof seal around the mouth of the bag 52. Such a bag sealing device 140 would be mounted adjacent to the receptacle mounting structure which holds the bag 52.

Alternatively, the sealing device 140 may simply employ a metallic band which can be placed around the bag near its mouth and crimped to close the mouth. The sealing device 140 would then require a component that places the band around the bag 52 and moves the free ends of band toward each other to clamp the bag 52 shut.

Figure 10:
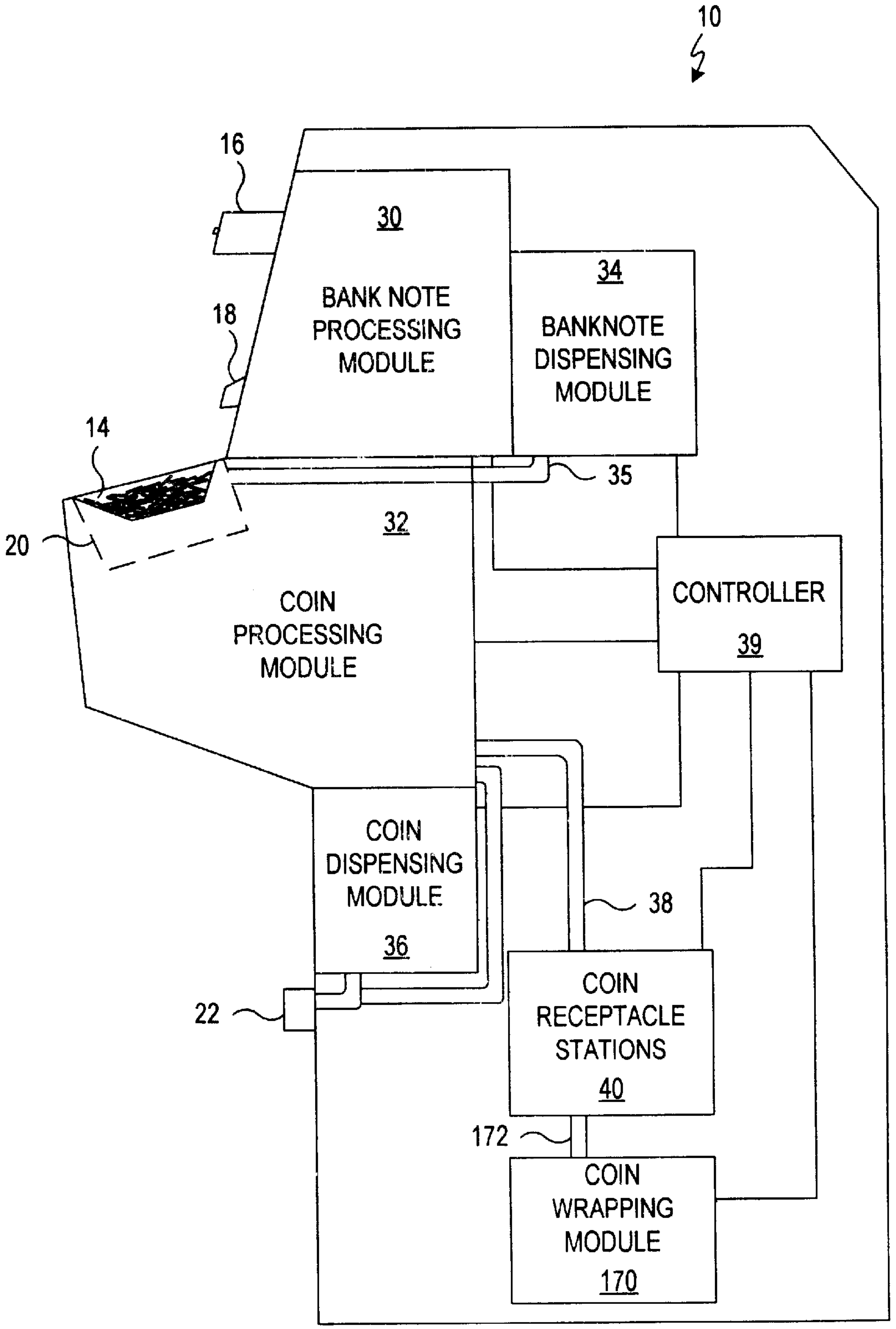
FIG. 10 illustrates an alternative embodiment to the currency processing machine which schematically illustrates the use of a coin wrapping module in connection with the coin receptacle stations.

Referring now to FIG. 10, the currency processing machine 10 disclosed is similar to that shown in FIG. 2, but includes an additional module. A coin wrapping module 170 is located below each of the coin receptacle stations 40 and is coupled thereto by a coin tube 172. To provide for the coin tube 172 in the alternative embodiments of the coin receptacle station 40 shown in FIGS. 3, 6 and 7, one of the coin receptacles 50 may be simply replaced by the coin tube 172 leading to the coin wrapping module 170. Thus, in addition to the currency processing machine 10 being able to select the desired type of coin receptacle 50 into which the flow of coins can be directed, the currency processing machine 10 includes the option of allowing coins to flow directly into a coin wrapping module 170 so that coins can be packaged by a standard wrapping machine. The coin wrapping module 170 can be one of many coin wrapping machines known in the art which includes a hopper into which coins are fed, a stacking station at which coins are stacked, and a wrapping station at which coins are wrapped. One such coin wrapper is claimed in U.S. Pat. No. 5,573,457 which is herein incorporated by reference in its entirety.

Figure 11:
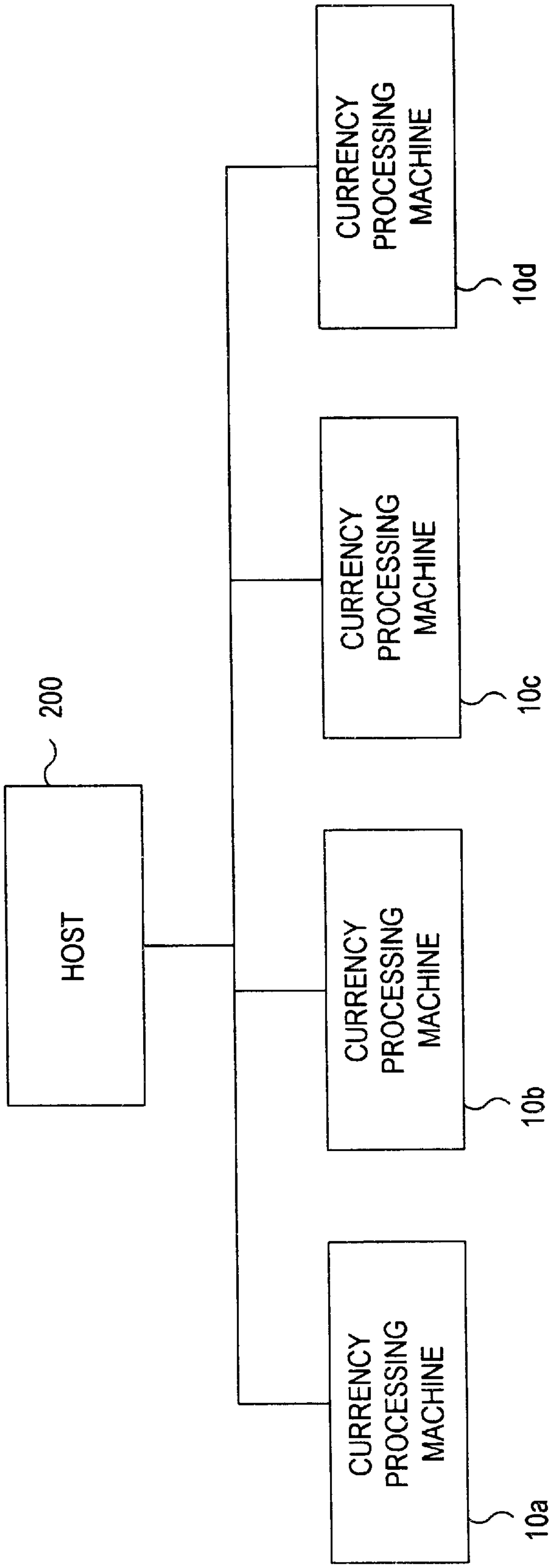
FIG. 11 schematically illustrates a network of currency processing machines connected to a host system.

Referring now to FIG. 11, a host system 200 is coupled to a plurality of currency processing machines 10*a*–10*d*. The host system 200 communicates with each currency processing machine 10*a*–10*d* to efficiently package the coins of each denomination in particular receptacles for further use. For example, in response to a need for filled coin cartridges 56 for a particular denomination, the host system 200 sends a signal to each of the currency processing machines 1*a*–10*d* to instruct them to begin filling coin cartridges 56 instead of filling coin bags 52 or rigid containers 54. Alternatively, if a demand for hopper fill bags used for filling gaming machines within a casino is experienced, the host system 200 may instruct currency processing machines 10*a*–10*d* to fill up their hopper fill bags for a particular denomination. Also, the coin processing machines 10*a*–10*d* send signals to the host system 200 when coin receptacles 50 are full or when a fault condition is encountered.

In effect, the host system 200 provides for a coin management system that externally controls the filling of the coin receptacles 50 (and possibly the wrapping of coins, see FIG. 10). In other words, while the currency processing machine 10 may rely on an internal signal to switch receptacles (i.e. when a filled bag is detected), the host system 200 controls the filling of coins receptacles 50 in response to conditions external to the currency processing machine 10.

Moreover, the host system 200 may link several currency processing machines 10 and provide for the efficient filling and distribution of coin receptacles 50. This is beneficial when, for example, after identifying the demand for one casino hopper fill bag, the host system 200 determines that two currency processing machines 10 are near a half bag level and instructs each currency processing machine 10 to fill each bag to only the half-bag level so that the two bags can be combined to fill the gaming machine with effectively one hopper fill bag. Thus, the filling of receptacles (or wrapping of coins, or flow of coins to a coin conveyer) may be a function of temporal limitations, demand for a particular type filled coin receptacle, or demand for a particular number of coins in one receptacle that is less than the typical coin fill level.

Moreover, the host system 200 may be connected to an accounting system which allows the user of the currency processing machine 10 to credit his or her account after making a deposit.

Figure 12:
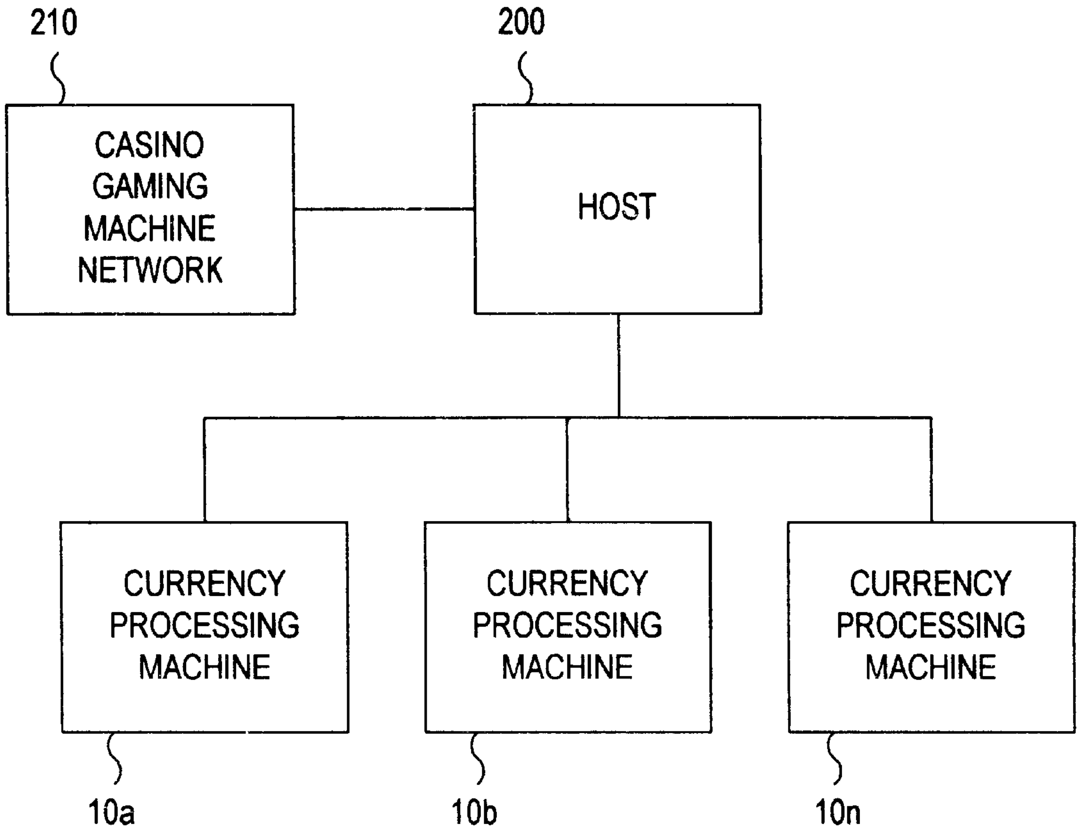
FIG. 12 schematically illustrates a network of currency processing machines in communication with a casino gaming machine network.

Referring now to FIG. 12, the host system 200 in communication with a plurality of currency processing machines 10*a*, 10*b*, . . . 10*n*, can be further coupled to a casino gaming machine network 210 to provide the host system 200 with real time demands for particular types of coin receptacles 50. The casino gaming machine network 210 is linked to various types of gaming machines throughout a casino and receives signals from each machine indicating whether the gaming machines are in need of coins of a particular denomination to provide, for example, a jackpot payout. When the casino gaming machine network 210 determines that a specific gaming machine is in need of a refill of coins, it sends a signal to the host system 200. Accordingly, knowing the position of a gaming machine in need of coins, the host system 200 directs the currency processing machine 10 which is nearest to that gaming machine to begin to fill its hopper fill bags to provide the replenishment of coins or tokens for that specific gaming machine.

Alternatively, the host system 200 may determine which of the currency processing machines 10*a*–10*n* have such a coin bag 52 available for use to replenish the machine and instruct the casino gaming machine network 210 which currency processing machines 10*a*–10*n* should be accessed for replenishing the gaming machine in need of coins. To that end, because of the high number of gaming machines present in the casino and the constant need to be filling gaming machines which are low in coins, the host system 200 can continuously instruct the casino gaming machine network 210 as to availability of coin bags within the currency processing machines 10*a*–10*n* located throughout the casino.

Furthermore, it is possible to incorporate a printer within each currency processing machine 10 at each coin receptacle stations 40 to provide explicit instructions to the authorized personnel concerning the deployment of the filled receptacle. The host system 200, after receiving instructions from the casino gaming machine network 210 as to which of the gaming machines are in need of a refill of coins, then instructs a specific currency processing machine 10*a*–10*n* to develop a printed tag indicating the identification number for the gaming machine that will be replenished by the specific hopper fill bag. Such a printed sticker can then be placed along the side of the hopper fill bag such that the authorized person who is accessing the machine reads the sticker for instructions on which gaming machine to deposit the coin bag. In sum, knowing the relative positions between the currency processing machines 10*a*–10*n* and the gaming machines within the casino gaming machine network 210, the host system 200 employs basic algorithms to determine which of the currency processing machines 10*a*–10*n* nearest the gaming machine in need of a refill has available hopper fill bags and prints a sticker to be placed on the hopper fill bag 52 instructing the authorized personnel to transport the filled hopper fill bag to that gaming machine in need of a refill.

The printing of such a label can also be incorporated directly on to a tamper-proof security seal which was described generally with reference to FIG. 9. Thus, the coin bag 52 has a security seal which also identifies the specific gaming machine into which it should be placed.

Figure 13A:
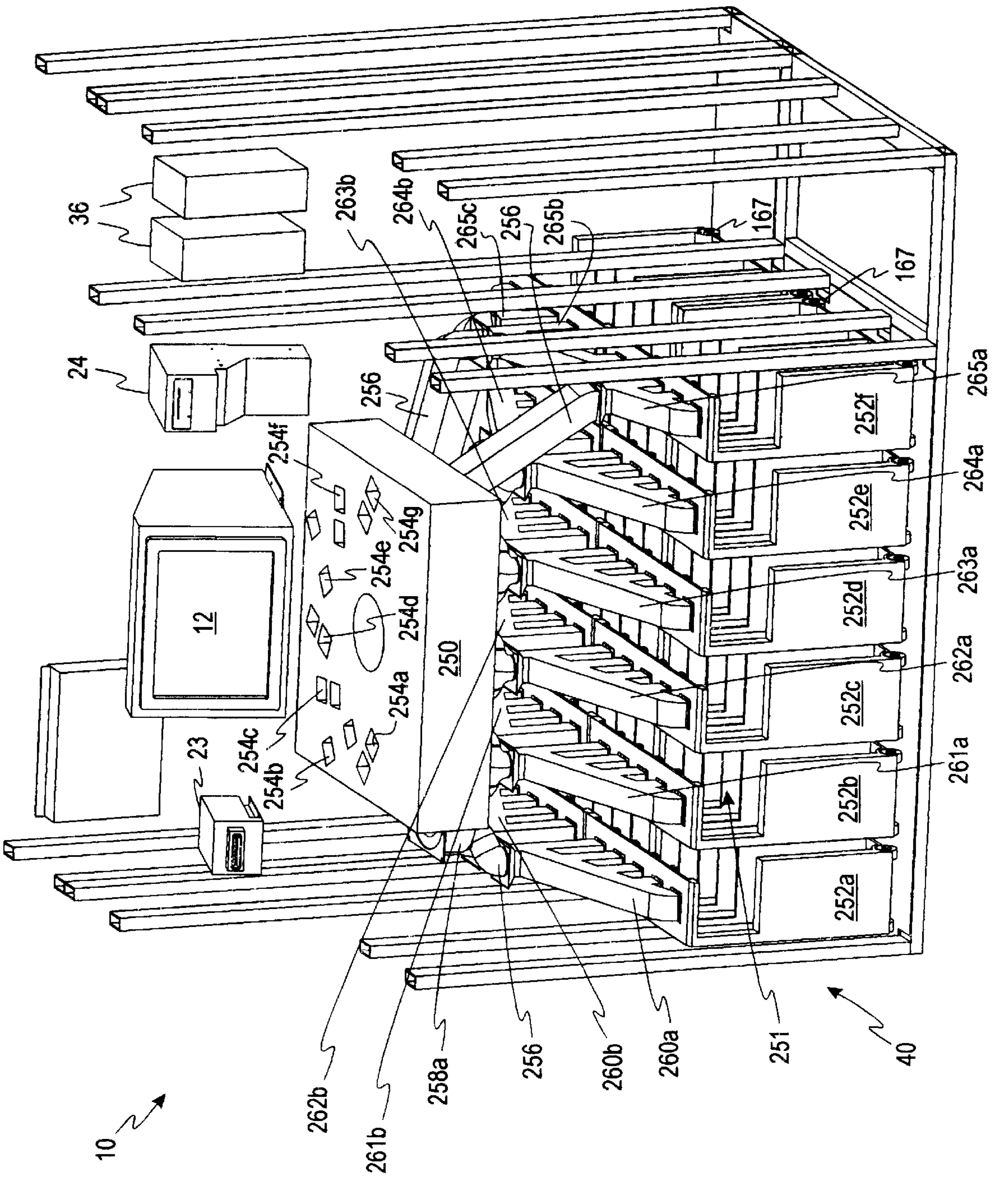
FIG. 13*a* is a front perspective view of a currency processing machine according to an embodiment of the present invention.
Figure 13B:
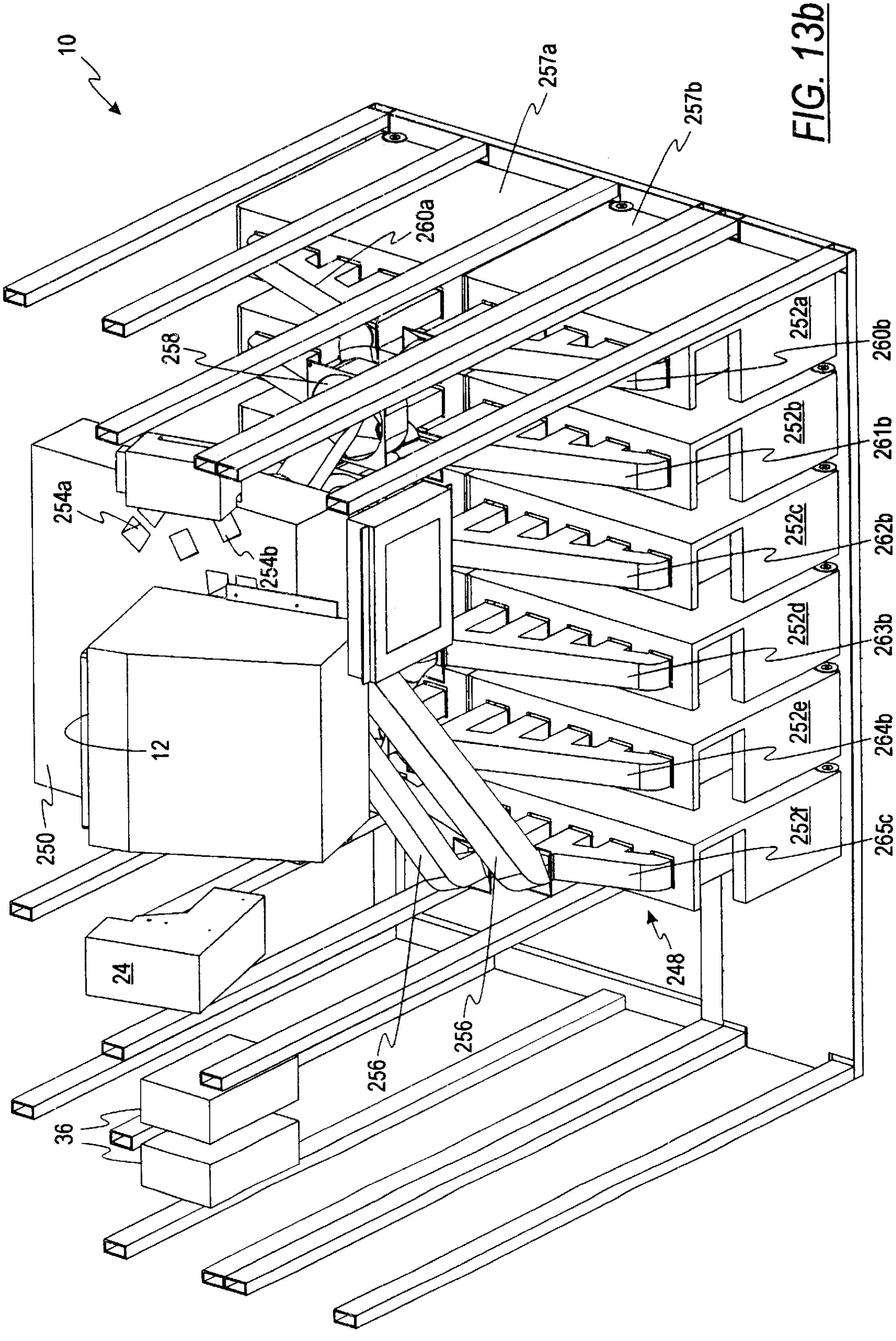
FIG. 13*b* is a rear perspective view of a currency processing machine according to an embodiment of the present invention.
Figure 13C:
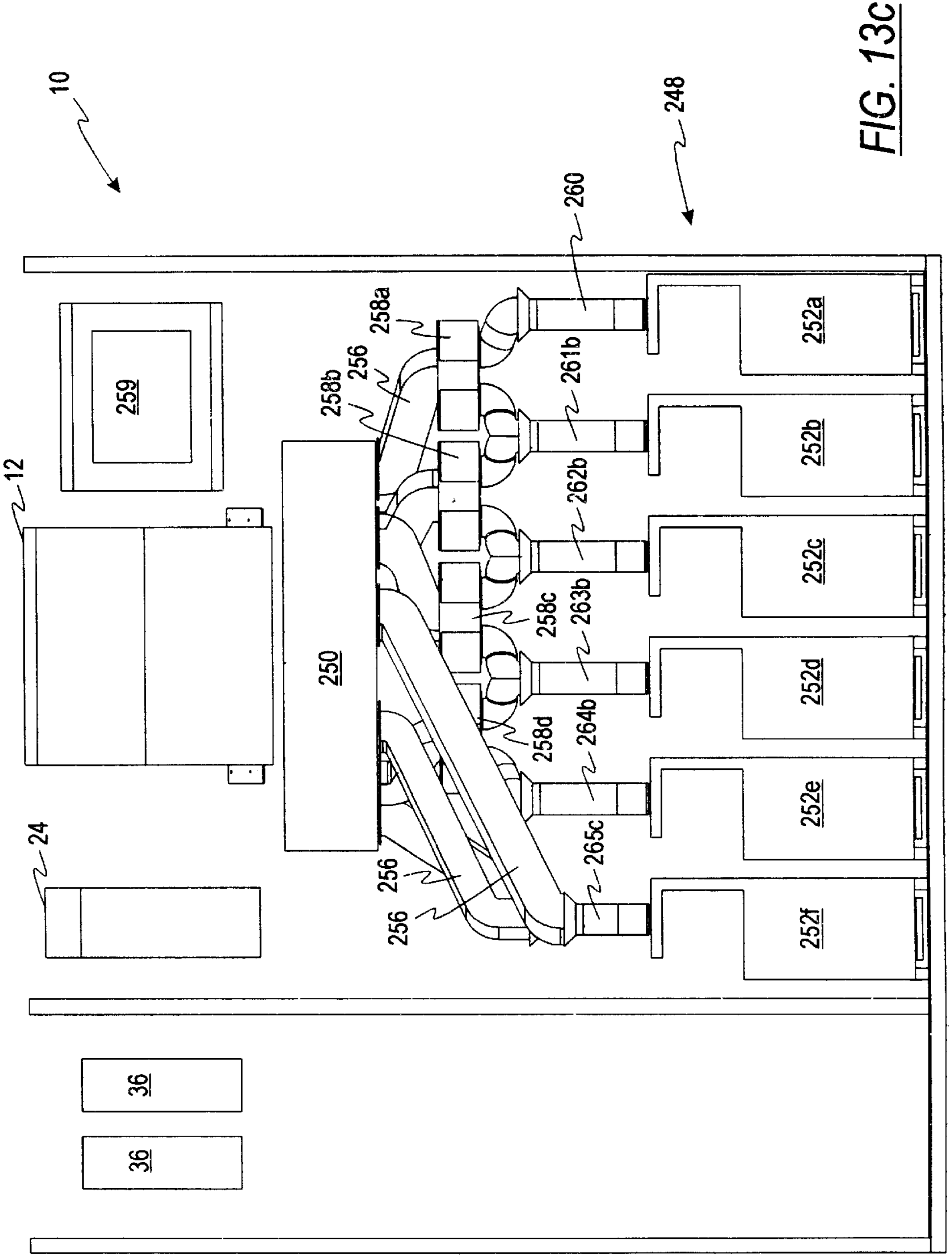
FIG. 13*c* is a back-side view of a currency processing machine according to an embodiment of the present invention.

FIGS. 13*a*, 13*b*, and 13*c* illustrate an embodiment of a coin distribution network 248 for the currency processing machine 10. The coin distribution network 248 is an alternative embodiment of the coin processing module 32 and the coin receptacle station 40 illustrated in FIG. 2. Coins are sorted with a coin processing module 250 and distributed into an array of coin receptacles 251 disposed below the coin processing module 250. The coin receptacles 251 are arranged into six columns 252*a–f*, each column containing 10 rows of coin receptacles 251. The illustrated coin processing module 250 contains seven coin exit channels 254*a–g* sorting up to seven denominations of coins/tokens. In the illustrated embodiment, coins sorted into six of the exit channels 254*b–g* are routed into the coin receptacles 251 while the seventh exit channel 254*a* is used to off-sort odd-sized or unwanted coins ("undesirables"). The currency processing machine 10 illustrated in FIG. 13*a* is designed to sort the following coin denominations: U.S. nickels, quarters, half-dollars and the one, two, and five dollar casino tokens. The undesirable coins can be routed to a back to a user via the dispensed coin receptacle 22 (FIG. 1) or into a coin receptacle such as one of the coin receptacles 251 illustrated in FIG. 13*a*.

The coin distribution network 248 routes coins from the exit channels 254*a–f* of the coin processing module 250 exit channels 254*a–f* to the array of coin receptacles 251 via a network of cooperating tubes 256, rotating coin distribution manifolds 258, and linear coin distribution manifolds 260–265. The linear coin distribution manifolds 260–265 channel coins into the individual coin receptacles 251 under the force of gravity. Each column of coin receptacles 252*a*–252*f* has at least two linear coin distribution manifolds disposed there above. For example, in the first column of coin receptacles 252*a*, a first linear distribution manifold 260*a* is disposed above the first five rows of coin receptacles 251 and a second linear distribution manifold 260b is disposed above the last five rows of coin receptacles 251. Likewise, linear coin distribution manifolds 261*a,b* correspond to column 252*b*, linear coin distribution manifolds 262*a*,b correspond to column 252*c*, linear coin distribution manifolds 263*a,b* correspond to column 252*d*, linear coin distribution manifolds 264*a*,b correspond to column 252*e*, and linear coin distribution manifolds 265*a,b,c* correspond to column 252*f*.

Each rotating distribution manifold 258*a–d*, which are best seen in FIG. 13*c*, distributes coins among two different columns of coin receptacles 252*a–f* Each linear distribution manifold 260–265 distributes coins among the individual coin receptacles 251 in a single column 252*a–f*

The coins exiting exit channels 254*b–g* are routed to the coin receptacles 251. Some coin denominations are routed directly from a coin exit channel 254 directly to a linear coin distribution manifold 260–265 while other coin denominations are first routed through one of the rotating coin distribution manifolds 258 and then to a linear coin distribution manifold 260–265. In the former instance, for example, coins sorted via coin exit channel 254*d* are routed directly to the linear coin distribution manifold 265*c*. In the later instance, for example, coins sorted via coin exit channel 254*b* are first directed into the rotating coin manifold 258*a*. The rotating coin manifold 258*a* can then distribute the coins into the coin receptacles 251 located in columns 252*a* or 252*b*. In an alternative embodiment, an exit channel (such as exit channel 254*a*, for example) can be routed directly to an individual coin receptacle 251. In such an embodiment, a tube 256 would extend directly from the exit channel 254 to the coin receptacle 251. Table 1 delineates the various routes coins exiting from the coin channels 254*a–g* may travel to the coin receptacles 251 in the illustrated embodiment of the currency processing machine 10.

TABLE 1

| Exit Channel | Coin Denomination | Rotating Manifold | Column | Linear Manifold |
|---|---|---|---|---|
| 254a | Undesirables | None | None | None |
| 254b | U.S. Nickel | 258a | 252a, 252b | 260a, 260b, 261a, 261b |
| 254c | U.S. Quarter | 258b, 258c | 252b, 252c, 252d | 261a, 261 b, 262a, 262b, 263a, 263b |
| 254d | U.S. Half-Dollar | None | 252f | 265c |
| 256e | $2 casino token | None | 252f | 265b |
| 256f | $1 casino token | 258d | 252d, 252e | 263a, 263b, 264a, 264b |
| 256g | $5 casino token | None | 252f | 265a |

As can be seen from Table 1, the currency processing machine 10 handles coins of the following denominations: U.S. nickels, U.S. quarters, U.S. half-dollars, $2 casino tokens, $1 casino tokens, and $5 casino tokens. In alternative embodiments of the present invention, the coin processing module 250 is designed to handle other denominations of coins. Further, the coin exit channels 254*a–g*, the rotating coin manifolds 258*a–d*, the coin tubes 256, and the linear distribution manifolds 260–265 can be arranged to route denominations of coins into as few as one coin receptacle 251 or as many columns 252 of coin receptacles 251 as desired. The particular arrangement is a function of the nature of the operator's business and the variety of coin denominations that the operator encounters on a daily basis. The inventors have found that the illustrated embodiment is suited for large casino-type operations. In other alternative embodiments, the currency handling machine 10 can accommodate other coin denominations including coins from most international currencies such as, for example the Euro as well as other casino tokens and transit tokens.

The desired mode of operation of the coin distribution network 248 can be dictated by the operator via an operator interface 259. Essentially, the operator instructs the machine 10 which coin receptacles 251 are to be dedicated to which coin denominations or combination of coin denominations. For example, U.S. quarters are sorted out of exit channels 254*c* and into the second and the third rotating manifolds 258*b*, 258*c*. The second and third rotating manifolds 258*b*, 258*c* are capable of distributing coins among the third, forth, and fifth columns 252*b*, 252*c*, 252*d* which include thirty coin receptacles 251. However, the first rotating coin distribution manifold 258*a* is cable of distributing nickels in the second column 252*b* and the forth rotating coin distribution manifold 252*d* is capable of distributing $1 casino tokens in the fourth columns 252*d*. Accordingly, a decision is made as to which of the coin receptacles 251 within the second column 252 are to be dedicated to nickels or quarters and which of the coin receptacles 251 within the forth column 252*d* are to be dedicated to $1 casino tokens or quarters. The operator can make this decision and instruct the currency processing machine 10 via the operator interface 259 appropriately. Alternatively, an operator can select, via the operator interface 259, one of several preprogrammed modes of operation which predesignate which coin receptacles 251 are dedicated to which coin denominations. Further, the operator can designate (or choose a predetermined designation) the number of coins directed into each individual coin receptacles 251. The number of coins directed into each coin receptacle 251 can correspond to a number which is useful to the operator such as a "hopper fill bag" number. Alternatively, the operator may wish to process as many coins as possible between unloadings and instruct the machine to direct the maximum number of coins into a coin receptacle 251 which the receptacle 251 can physically hold.

The columns 252*a–f* have rollers 167 attached thereto allowing each individual column to easily slide out of the rear of the currency processing machine 10 allowing an operator to empty the coin receptacles 251. In other alternative embodiments, the each individual column slides out of the front of the currency processing machine 10. In the illustrated embodiment of the columns 252*a–f*, each of the individual coin receptacles 251 are designed to allow rectangular coin bins (not shown) to fit within the individual coin receptacles 251. Accordingly, once a column 252 has been pulled out from the machine 10 by an operator, the bins can be individually removed from the coin receptacle 251 to dump the coins therein into a larger coin receptacle. Alternatively, each of the coin receptacles 251 can be designed to hold coins. Because of the weight associated with bulk coins, each of the columns are separable into two sections each having five coin receptacles 251, thus giving an operator a more manageable weight with which to deal. For example, in FIG. 13*b* the column 252*a*comprises two sections 257*a* and 257*b*. Each of the sections 257*a,b* can be moved allowing an operator to dump the coins within the coin receptacles 251 into a larger coin receptacle. Alternatively, the operator can remove an entire column having coin receptacles 251 filled with coins and insert columns having empty coin receptacles 251.

Figure 14B:
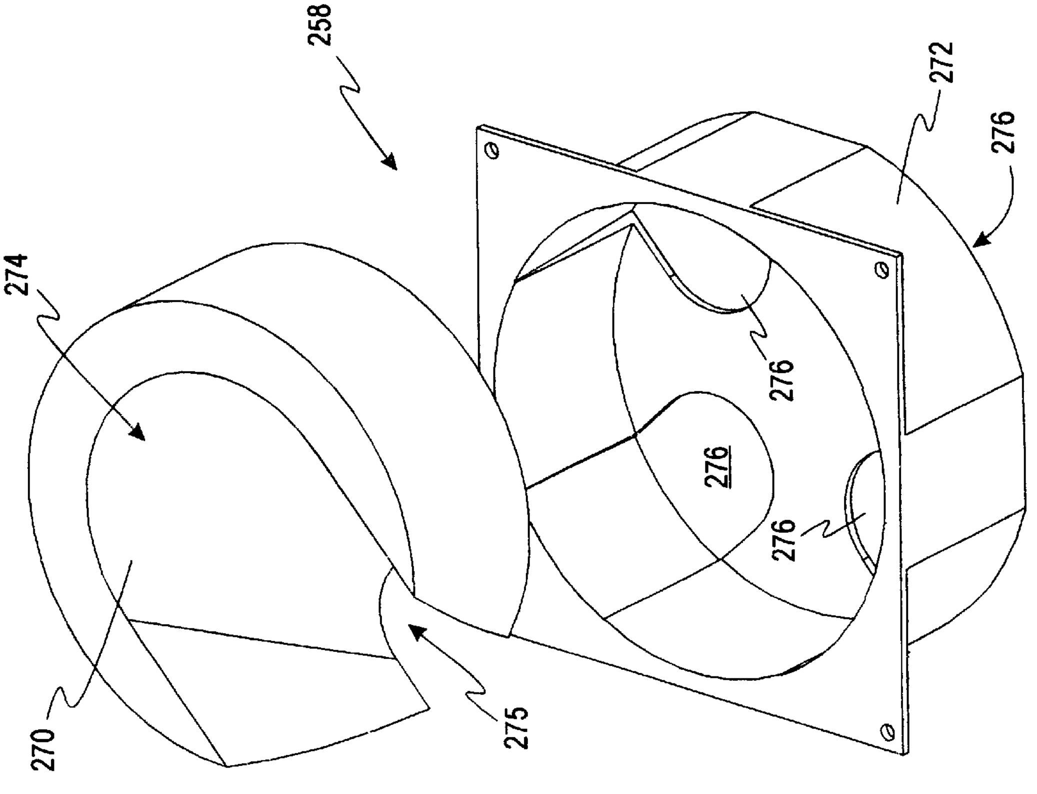
FIG. 14*b* is an exploded view of a rotating coin distribution manifold for a currency processing machine according to an embodiment of the present invention.
Figure 14A:
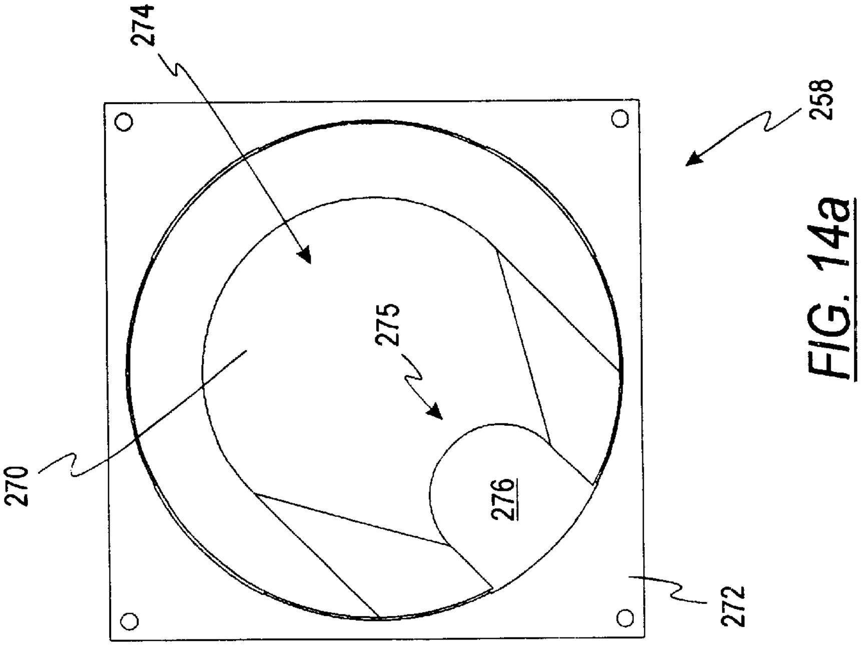
FIG. 14*a* is a top view of a rotating coin distribution manifold for a currency processing machine according to an embodiment of the present invention.

FIGS. 14*a* and 14*b* describe the rotating distribution manifolds 258*a–d* in greater detail. Each rotating distribution manifold 258 contains a coin chute 270 which pivots within a stationary housing 272. The chute 270 is essentially a large cylinder with a groove disposed therein. The chute 270 has an inlet area 274 for receiving coins from an exit channel 254 via one or more coin tubes 256. The chute 270 has an outlet 275 which directs coins flowing down the chute 270, under the force of gravity, to one of four apertures 276 in the stationary housing 272. Each aperture 275 is coupled to a linear distribution manifold 260–265 via a tube 256. Rotation of the chute 270 among the four apertures 276 routes the coins to the different linear distribution manifolds 260–265. A suitable controller (not shown) is electrically coupled to the coin chute 270 for rotating the coin chute 270 among the four apertures 276.

Figure 15:
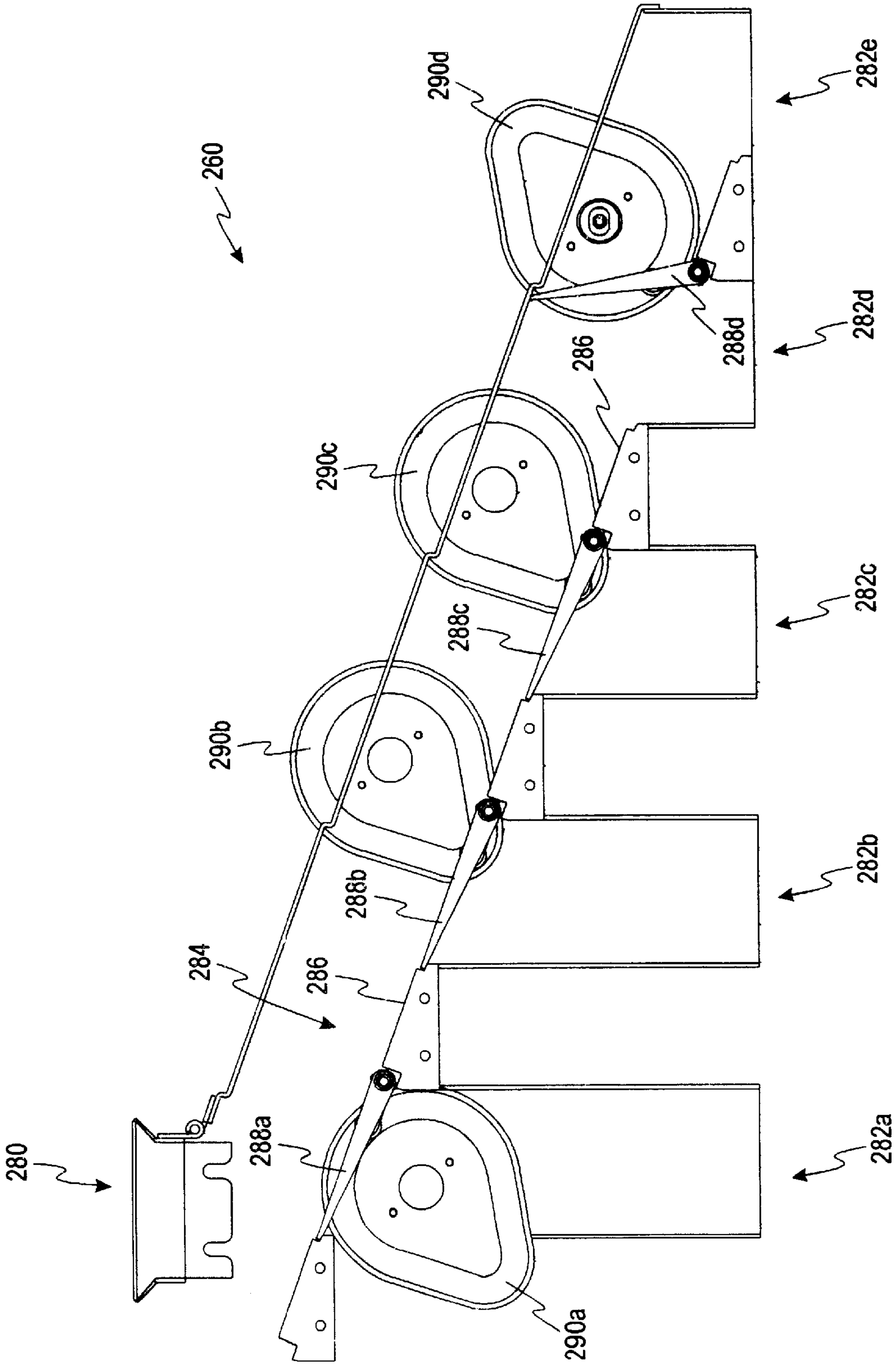
FIG. 15 is a side view of a linear coin distribution manifold for a currency processing machine according to an embodiment of the present invention.

Referring to FIG. 15, the linear distribution manifold 260 will be described in greater detail. Each of the linear distribution manifolds 260–265 contains an inlet 280 and a plurality of outlets 282. In the illustrated embodiment, the linear distribution manifold 260 has five outlets 282*a–e*. The linear distribution manifold 260 has a downwardly slopping main coin passage 284 having a floor 286 with a plurality of gates 288 disposed therein. The number of gates 288 in any of the linear coin distribution manifolds 260–265 is one less than the total number of outlets 282. For example, the illustrated linear coin distribution manifold 260 has five outlets 282*a–e* and therefore, has four gates 288*a–d* disposed therein. Each gate 288 is hingedly coupled to the floor 286. A cam 290 is coupled to each of the gates 288 for moving each of the gates 288 between the open and the closed position. In alternative embodiments of the present invention, individual motors are used to actuate each of the gates 288*a–d*. Viewing FIG. 15 from left to right, the first three gates 288*a–c* are illustrated in the closed position while the forth gate 288*d* is illustrated in the open position. Such an arrangement would cause coins flowing into the linear distribution manifold 260 through inlet 280 to flow through outlet 282*d* and into the corresponding coin receptacle 251 disposed below. A suitable controller (not shown) is coupled to the linear distribution manifold 260265 for individually moving each of the gates 288 between the open and the closed positions.

Figure 16:
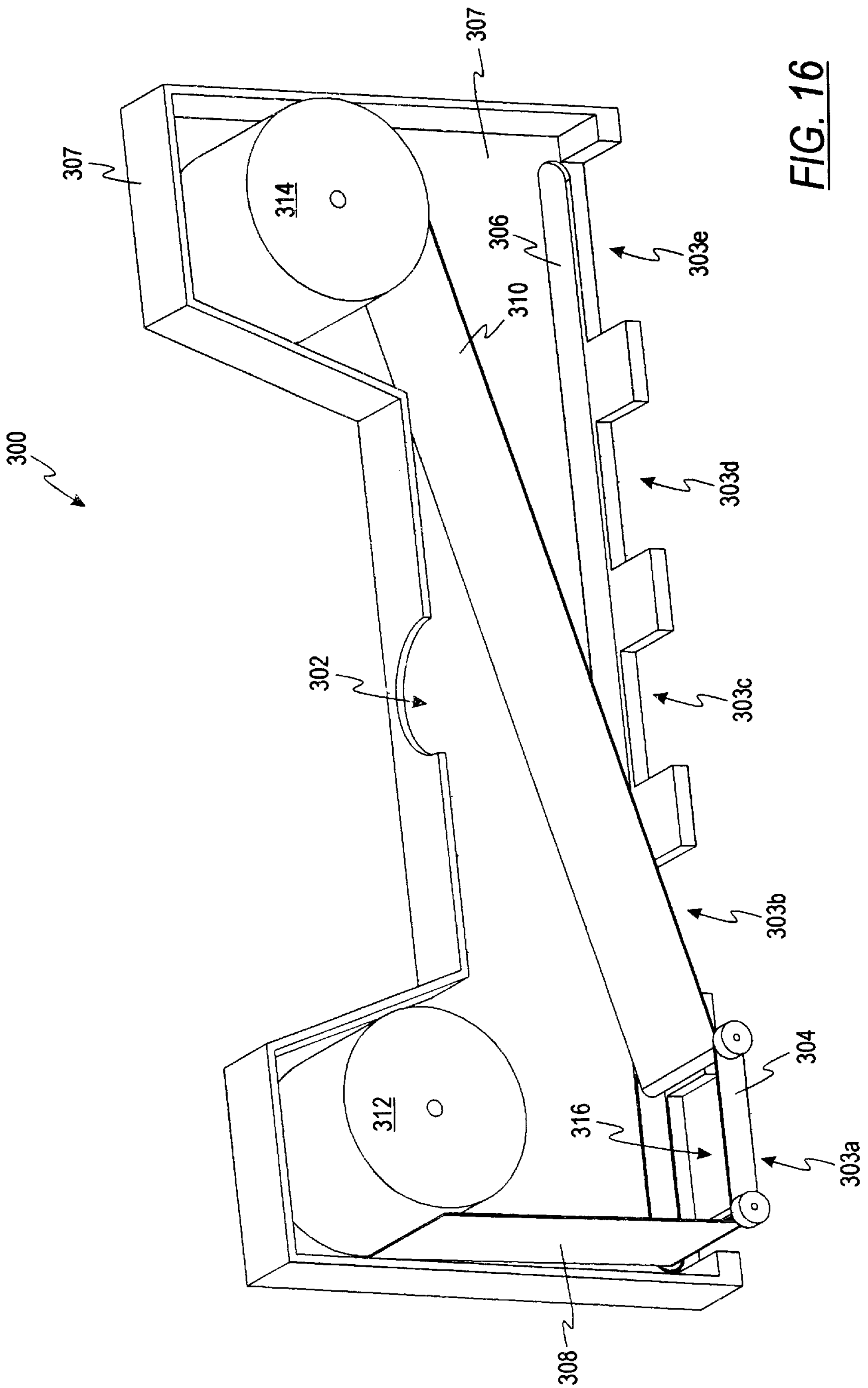
FIG. 16 is a perspective view of an alternative embodiment of a linear coin distribution manifold for a currency processing machine according to an embodiment of the present invention.
Figure 17:
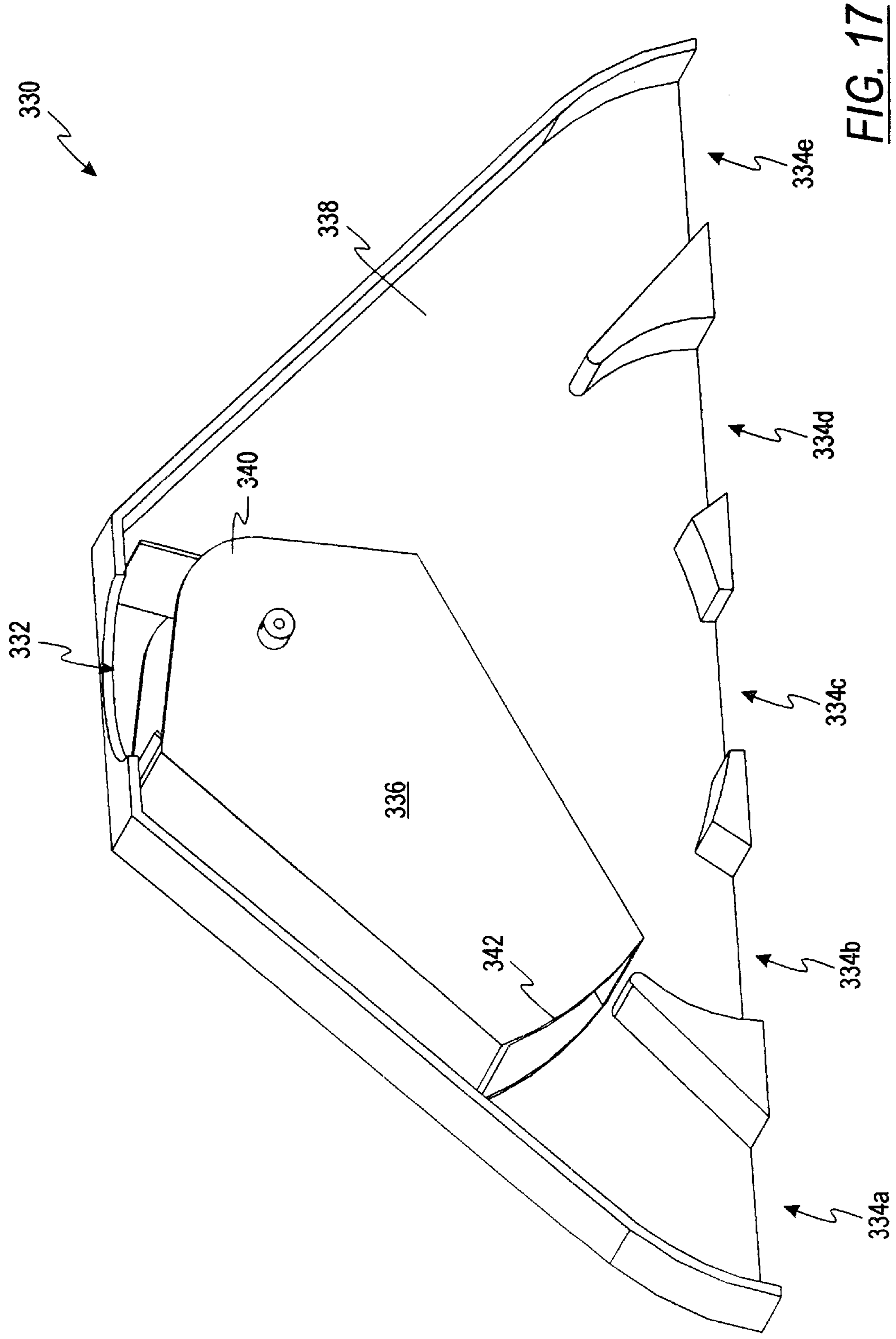
FIG. 17 is a perspective view of another alternative embodiment of a linear coin distribution manifold for a currency processing machine according to an embodiment of the present invention.
Figure 18:
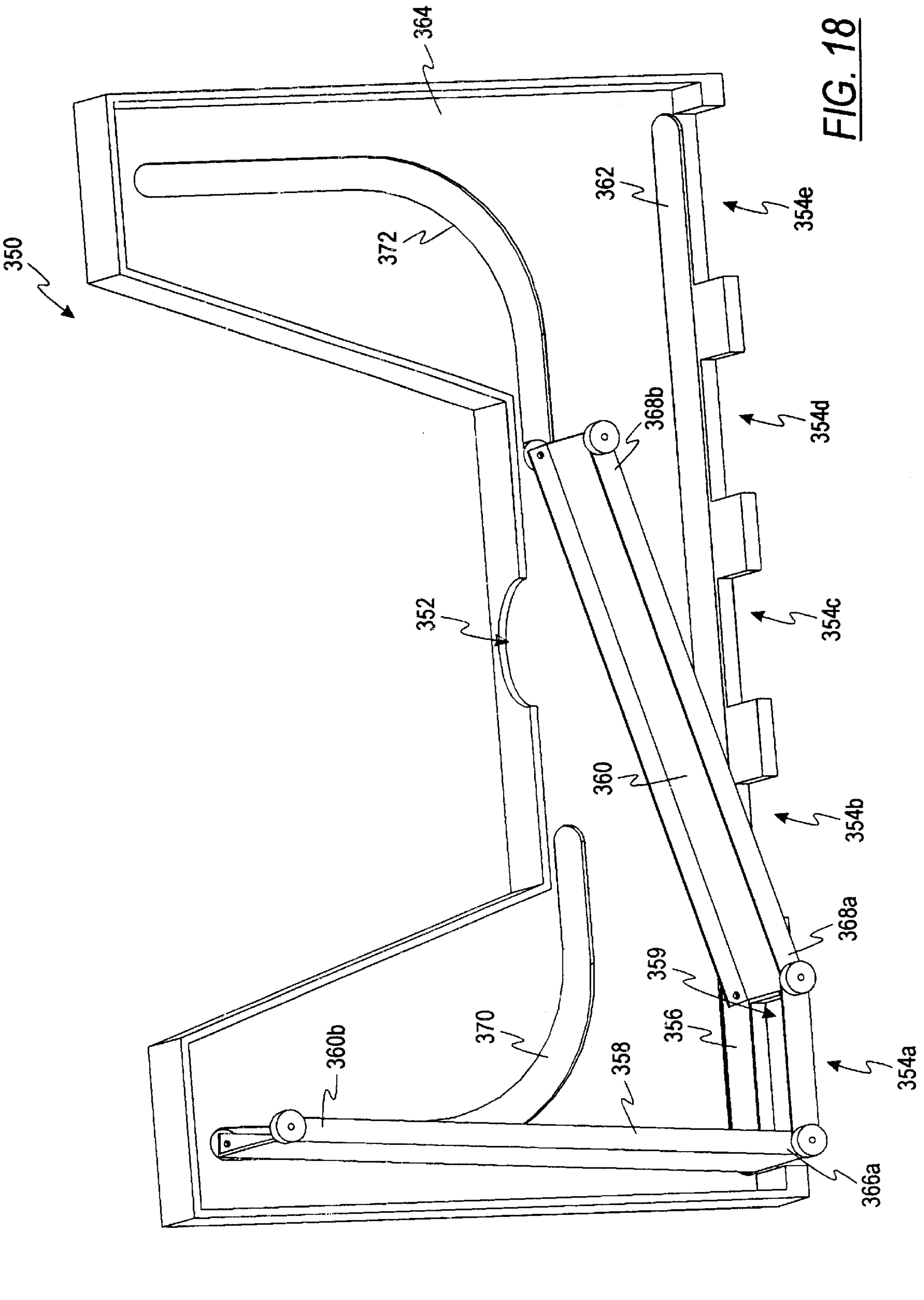
FIG. 18 is a perspective view of another alternative embodiment of a linear coin distribution manifold for a currency processing machine according to an embodiment of the present invention.

FIGS. 16, 17, and 18 illustrate alternative embodiments of the linear distribution manifold 260. Referring now to FIG. 16, a linear distribution manifold 300 contains an inlet 302 and a plurality of outlets 303*a–e* which are each disposed above corresponding coin receptacles 251. A cart 304 slides along a track 306 disposed in the housing 307 of the linear distribution manifold 300. Movement is provided to the cart 304 by two belts 308,310 the first ends of which are coupled to the cart 304. The second end of each of the belts is coupled to rollers 312,314. Rotation of the rollers 312,314 causes the cart 304 to be pulled along the track 306. The cart 304 contains an aperture 316 to allow coins to pass through the cart 304.

In operation, the rollers 312, 314 are rotated to position the aperture 316 of the cart 304 over one of the outlets 303. Coins are directed to the inlet 302 by a tube 256. Coins pass through the inlet 302 onto one of the belts 308, 310 disposed below the opening. The downward slope of the belts 308, 310 causes coins to travel toward the cart 304 and through the aperture 316 into the corresponding coin receptacles 251 disposed below the linear distribution mechanism 300. Specifically, when the cart 304 is positioned over the left-most outlets 303*a,b*, the right-most belt 310 directs coins to the outlets 303*a,b*. And when the cart 304 is positioned over the right-most outlets 303*d,e*, the left-most belt 308 directs coins to the outlets 303*d,e*.

Referring now to FIG. 17, another alternative embodiment of a linear distribution manifold 330 is illustrated. The linear distribution manifold 330 has an inlet 332 and a plurality of outlets 334*a–e* which are disposed above corresponding coin receptacles 251 (FIG. 13*a*). The manifold 300 contains a chute 336 pivotally attached to a housing 338 of the manifold 300 at a first end 340 disposed near the inlet 332. A second end 342 of the chute is disposed adjacent the outlets 334*a–e*. The chute pivots so that coins entering the chute at the first end 340 from the inlet 332 can be directed to any one of the outlets 334*a–e*.

Referring now to FIG. 18, another alternative embodiment of a linear distribution manifold 350 is illustrated. The linear distribution manifold 350 has an inlet 352 and five outlets 354*a–e* which are disposed above the coin receptacles 251 (FIG. 13*a*). The manifold 350 contains a cart 356 disposed between two movable ramps 358,360 which channel coins flowing through the inlet 352 to one of the outlets 354*a–e*. The cart 356, which has an aperture 359 disposed therein, essentially acts as a gate which only provides access to one of the outlets 354*a–e* at any given time. The cart 356 is slidably engaged to a track 362 which is disposed in a housing 364 of the manifold 350 allowing the cart to be movable in the horizontal direction within the manifold 350. Each of the ramps 358,360 have a first end 366*a*, 368*a* which is coupled to the cart 356 and a second end 366*b*, 368*b* which is slideably engaged to tracks 370, 372, respectively, disposed within housing 364. The ramps 358,360 are designed to move along with the cart 356. The cart 356 has an aperture 359 disposed therein permitting coins flowing down the ramp 358, 360 to pass through the cart 356 and into one of the coin receptacles 251.

In the operation of the linear coin manifold 350 illustrated in FIG. 18, coins are directed to the inlet 352 via a coin tube 256. Coins flowing through the inlet 352 contact ramp 360 and are directed downward towards the cart 356 disposed over outlet 354*a*. Once the coin receptacle 251 disposed below outlet 354*a* is filled, the cart 356 is moved and positioned over the adjacent outlet 354*b*, for example. Movement of the cart 356 causes the ramps 358,360 to shift thus directing coins flowing through the inlet 352 to the outlet 354*b* over which the cart 256 is positioned. Specifically, when the cart 356 is positioned over the left-most outlets 354*a,b*, the right-most ramp 360 directs coins to the outlets 354*a,b*. And when the cart 356 is positioned over the left-most outlets 354*d*,e, the right-most ramp 358 directs coins to the outlets 354*d,e*.

Figure 19:
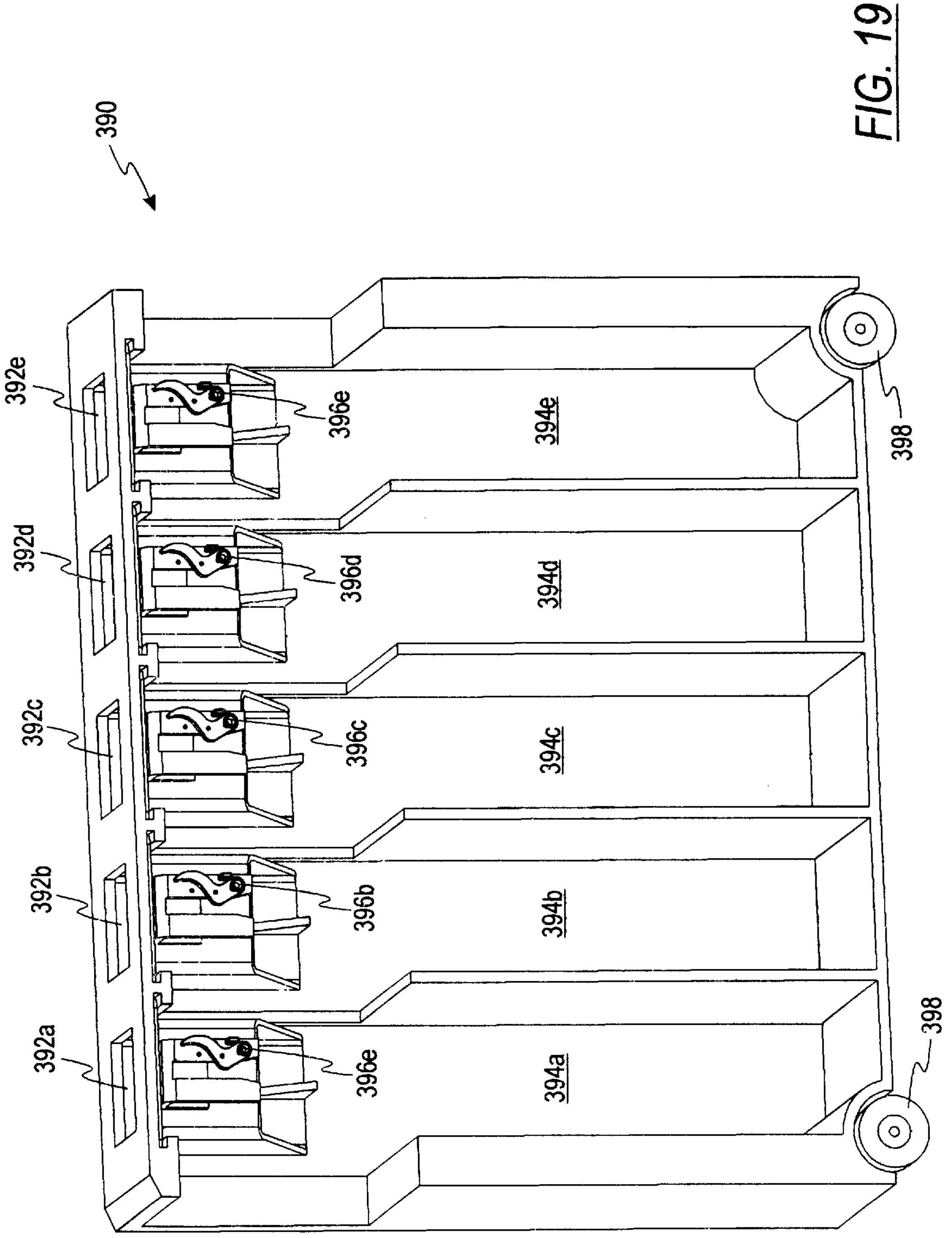
FIG. 19 is perspective view of a section of an alternative embodiment of a column of coin receptacles for a currency processing machine according to an embodiment of the present invention.

Referring now to FIG. 19, an alternative embodiment of a five receptacle section 390 of a coin receptacle column 252 is illustrated. The section 390 contains five inlets 392*a–e* corresponding to the five coin collection areas 394*a–e*. Each coin collection area 394 contains a bag clip 396 for holding a coin bags (not shown) in the coin collection area 394. The section 390 is equipped with rollers 398 allowing the unit to easily slide into and out of the currency handing machine 10.

One disadvantage of prior art currency processing machines is the large amount of downtime associated with the physical removal of coins from the machine during which the machine is essentially out of service. When the coin receptacles of a currency processing machine become full, an operator must physically remove the coins from the currency processing machine. In typical currency processing machines, the machine is unable to transact with a user while the operator is unloading the machine because the coin receptacles may not be properly positioned within the machine or the addition of new coins compromises the integrity of the count (aggregate value, number of coins, etc.) of the batch of coins being unloaded. The problem is further exasperated by some prior art machines which implement a single coin convey track to deliver coins both to the user and the operator of the machine. It may be necessary to route coins to a user in certain instances such as when the user is changing paper currency or is due change from a particular transaction. When the coin convey track is busy delivering coins to an operator, the machine in unable to transact with a user. The alternative embodiments of the coin distribution network for use in conjunction with the currency processing machine 10 (FIG. 1) which are illustrated in FIGS. 20–22 are directed at eliminating the aforementioned downtime associated with some prior art currency processing machines.

Figure 20:
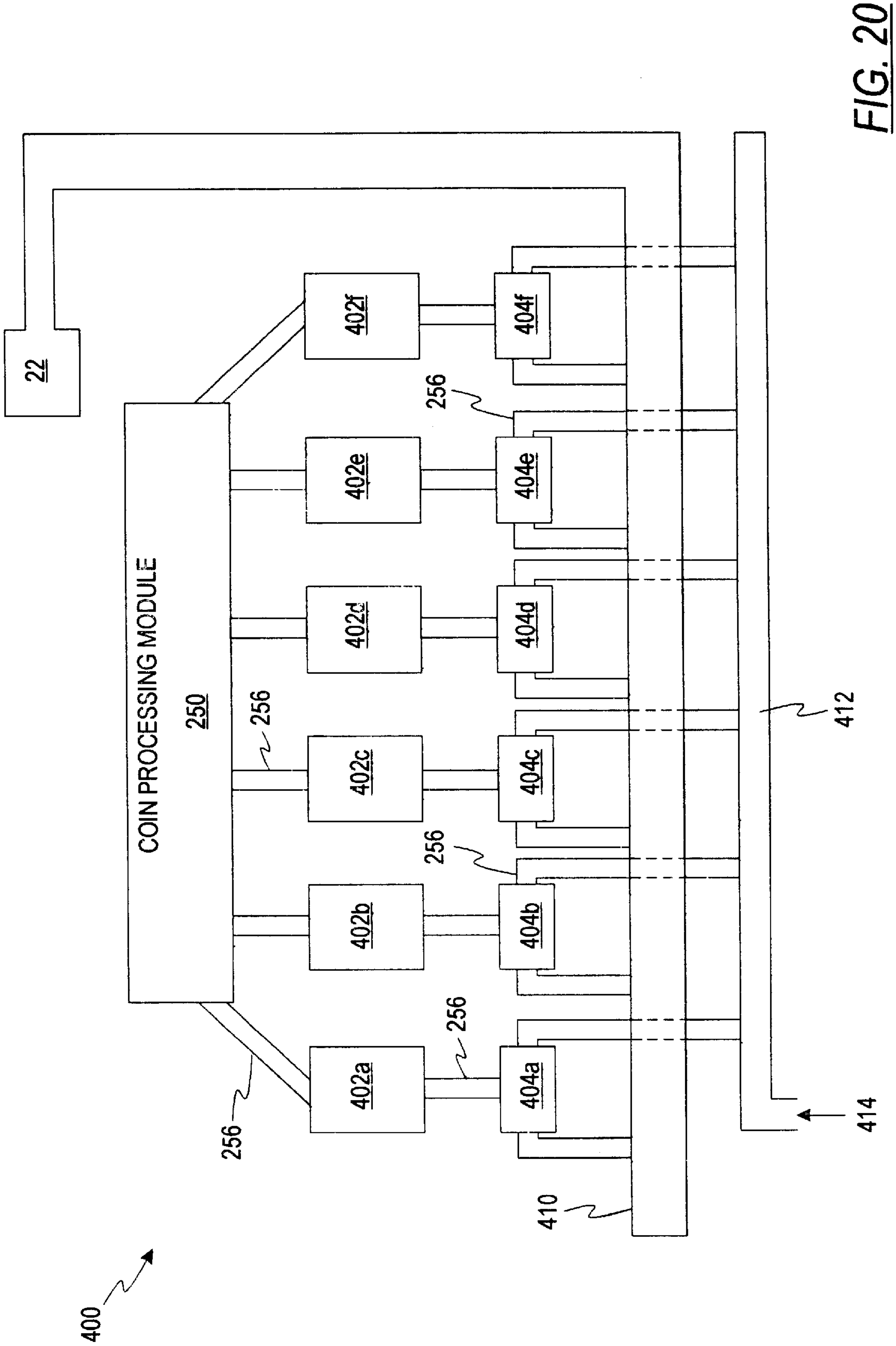
FIG. 20 is a schematic drawing of an alternative embodiment of a coin distribution network for a currency processing machine according to an embodiment of the present invention.
Figure 21:
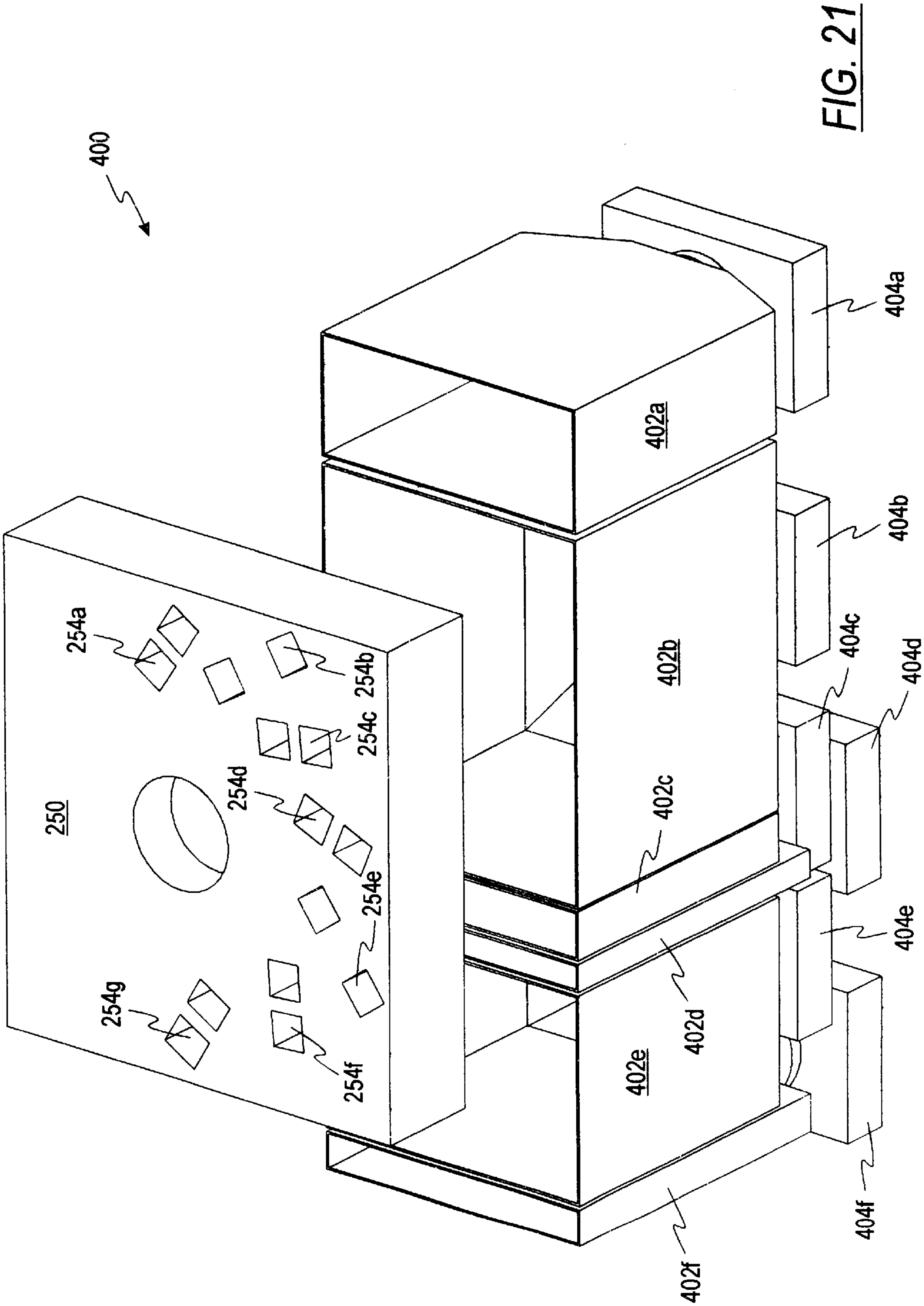
FIG. 21 is rear perspective view of an alternative embodiment of a coin distribution network for a currency processing machine according to an embodiment of the present invention.

FIG. 20 illustrates a schematic of an alternative embodiment of a coin distribution network 400 having a plurality of intermediate coin bins 402*a–f* which can be used in conjunction in the currency processing machine 10 illustrated in FIG. 1. The plurality of intermediate coin bins 402*a–f* are disposed below the coin processing module 250. Coins counted and sorted into individual denominations are routed via tubes 256 (such as those illustrated in FIG. 13*a*) from the exit channels of the coin processing module 250 into one of the plurality of intermediate coin bins 402*a–f* The coin processing module 250 initially counts the coins to determine the aggregate value of the coins deposited by an individual user for purposes of that particular transaction. Further, the coin processing module 250 can keep track of the coin totals (value, number of coins, etc.) over a given time interval for quality control purposes. Each intermediate coin bin 402 receives and holds a single coin denomination. A coin counter 404 is associated with each intermediate coin bin 402. Each coin counter 404 is disposed below each respective intermediate coin bin 402 for counting each coin dispensed from the intermediate coin bin 402. The coin distribution network 400 has two convey paths, a user convey path 410 and a operator convey path 412, which transport coins from the counters 404 to the user and the operator, respectively.

The coin distribution network 400 eliminates the aforementioned downtime associated with unloading coins from the currency processing machine 10. The downtime is eliminated because the intermediate coin bins 402 are able to receive coins while dispensing coins to the convey paths 410,412. The counters 404 only count those coins which are dispensed to the convey paths 410,412. Accordingly, new coins directed into the intermediate coins bins 402 will not affect the batch values for the coins being dispensed to the convey paths 410, 412. For example, while coins are being transported to an operator via the operator convey path 412, the counters 404 are separately counting the coins dispensed to the operator convey path 410 and to the user convey path 412. Appropriate value totals are maintained for the coins transported to the operator. Additionally, the coin distribution network 400 is able to dispense coins back to a user via the user convey path 410 while coins are also being transported to an operator via operator convey path 412.

In the illustrated embodiment of the coin distribution network 400, the user convey path 410 transports coins to a user via the dispensed coin receptacle 22 (also shown in FIGS. 1 and 2). Alternatively, the user covey path 410 transports coins directly to the coin dispensing module 36 (FIG. 2) to maintain the inventory of coins within the coin dispensing module. The operator convey path 412 transports coins to the operator via an outlet 414 such as a coin spout. The operator may collect coins flowing through the spout 114 with anyone of a number of coin receptacles such as rigid coin bins or coin bags. In various alternative embodiments, the number of coins transported to the operator can be varied. For example, in one embodiment, the second convey path delivers the entire contents of an intermediate coin bin 402 to the outlet. In another alternative embodiment, delivery of coins to the outlet 414 by the operator convey path 412 is suspended after a predetermined number of coins (e.g. corresponding to a "hopper fill bag") are delivered to the outlet 414. The operator convey path 412 resumes operation after a momentary pause allowing the operator to switch coin receptacles or their switch of coin receptacles is automated. Alternatively, operation is resumed after the machine 10 receives input from the operator. In other alternative embodiments, the coin counters simultaneously route coins to both the user and the operator convey paths 410,412 allowing the currency handing machine 10 to deliver coins to a user via the user convey path 410 and to an operator via the operator convey path 412. The counters 404 separately count those coins which are distributed to the user convey path 410 and the operator convey path 412. In still another alternative embodiment of the currency processing machine 10, a plurality of tubes 256 coupled to each of the counters 404 channel coins directly to a plurality of coin spouts. Each of the plurality of coin spouts corresponding to an individual coin denomination.

Referring now to FIG. 21, a physical embodiment of the coin distribution network 400 (illustrated in FIG. 20) which may be implemented in the currency processing machine 10 is illustrated. The sorted coins are routed from the exit channels 254*b*–*g* via tubes 256 (not shown) to the intermediate coin bins 402. The aforementioned undesirable coins are off-sorted via exit channel 254*a* to an off-sort area (not shown). In one embodiment of the coin distribution network, the user convey path 410 and the operator convey path 412 transport coins to a user and an operator, respectively. In an alternative embodiment of the coin distribution network 400, a network of coin tubes 256, rotating coin distribution manifolds 258*a*–*d*, linear coin distribution manifolds 260–265, and coin receptacles 251, such as illustrated in FIG. 13*a*, are used in conjunction with the coin distribution network 400 illustrated in FIG. 20. Such an embodiment would allow the currency machine to continuously operate with no downtime associated with removing coins from the currency processing machine 10 because only those coins dispensed from the intermediate coins bins 402 and directed into the coin receptacles 251 would be counted by the counters 404 and included in the batch totals for those coins unloaded from the currency processing machine 10. The intermediate coin bins 402 are able to receive coins while dispensing coins.

Figure 22A:
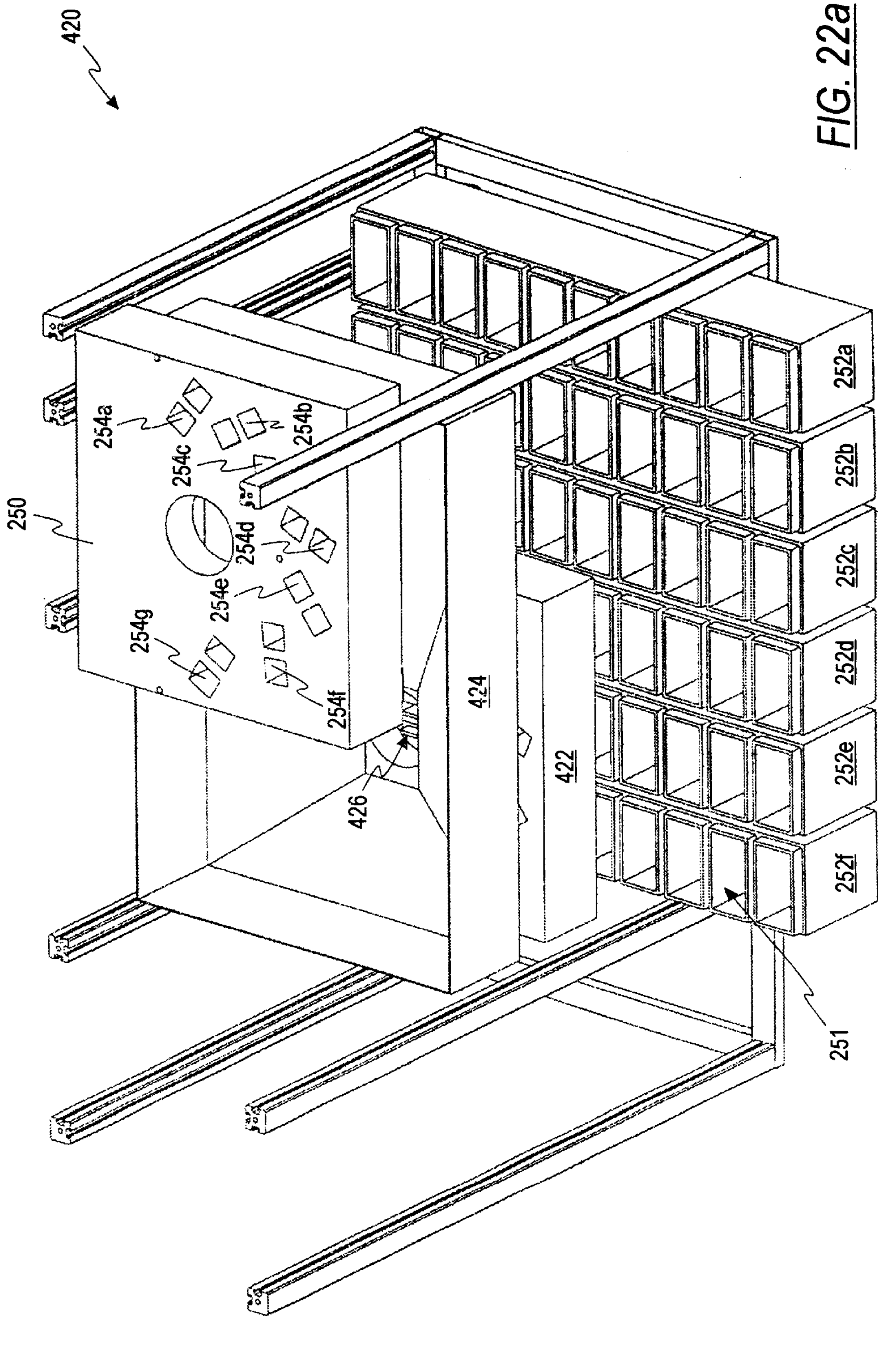
FIG. 22*a* is rear perspective view of another alternative embodiment of a coin distribution network for a currency processing machine according to an embodiment of the present invention.
Figure 22B:
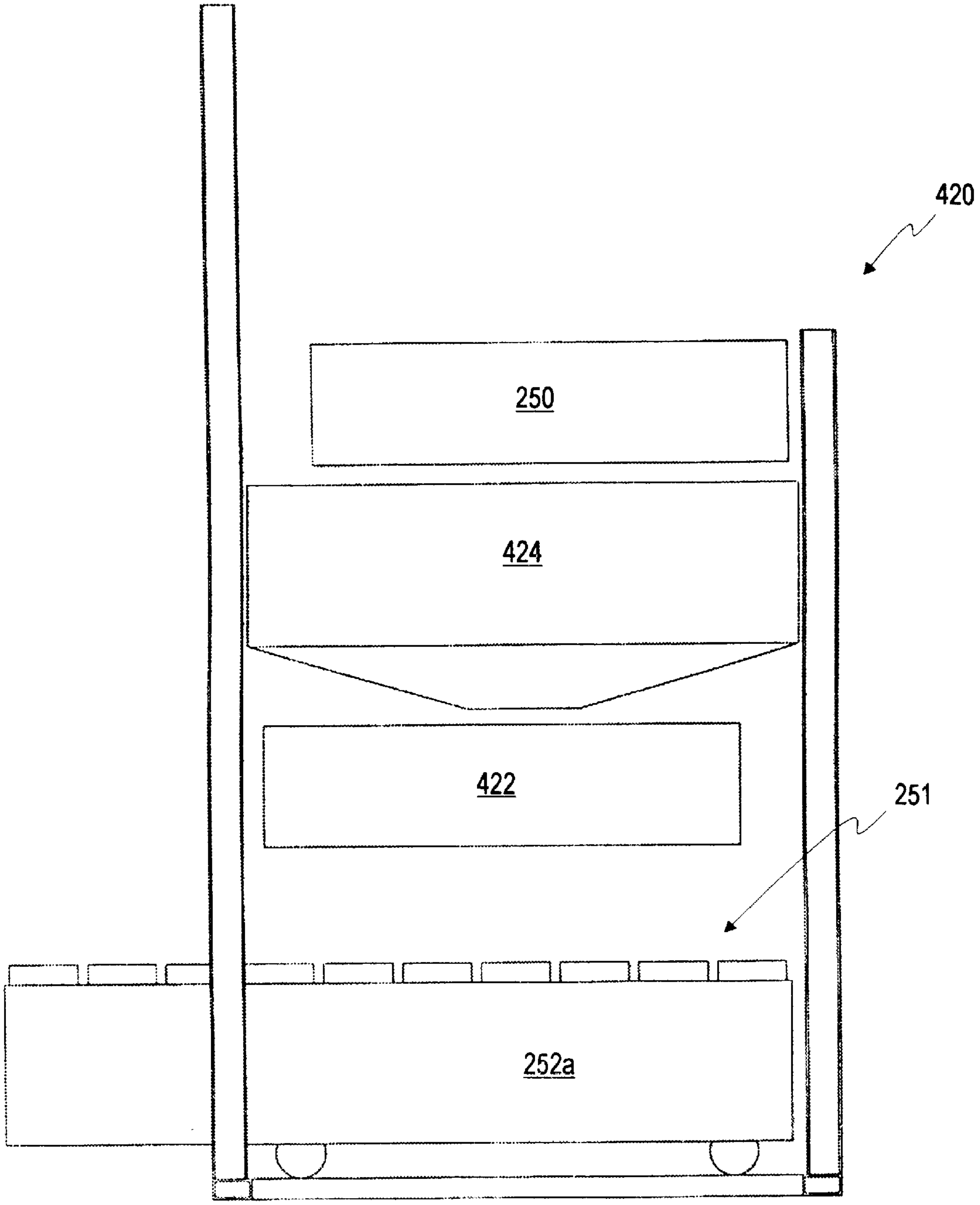
FIG. 22*b* is side view of another alternative embodiment of a coin distribution network for a currency processing machine according to an embodiment of the present invention.
Figure 23:
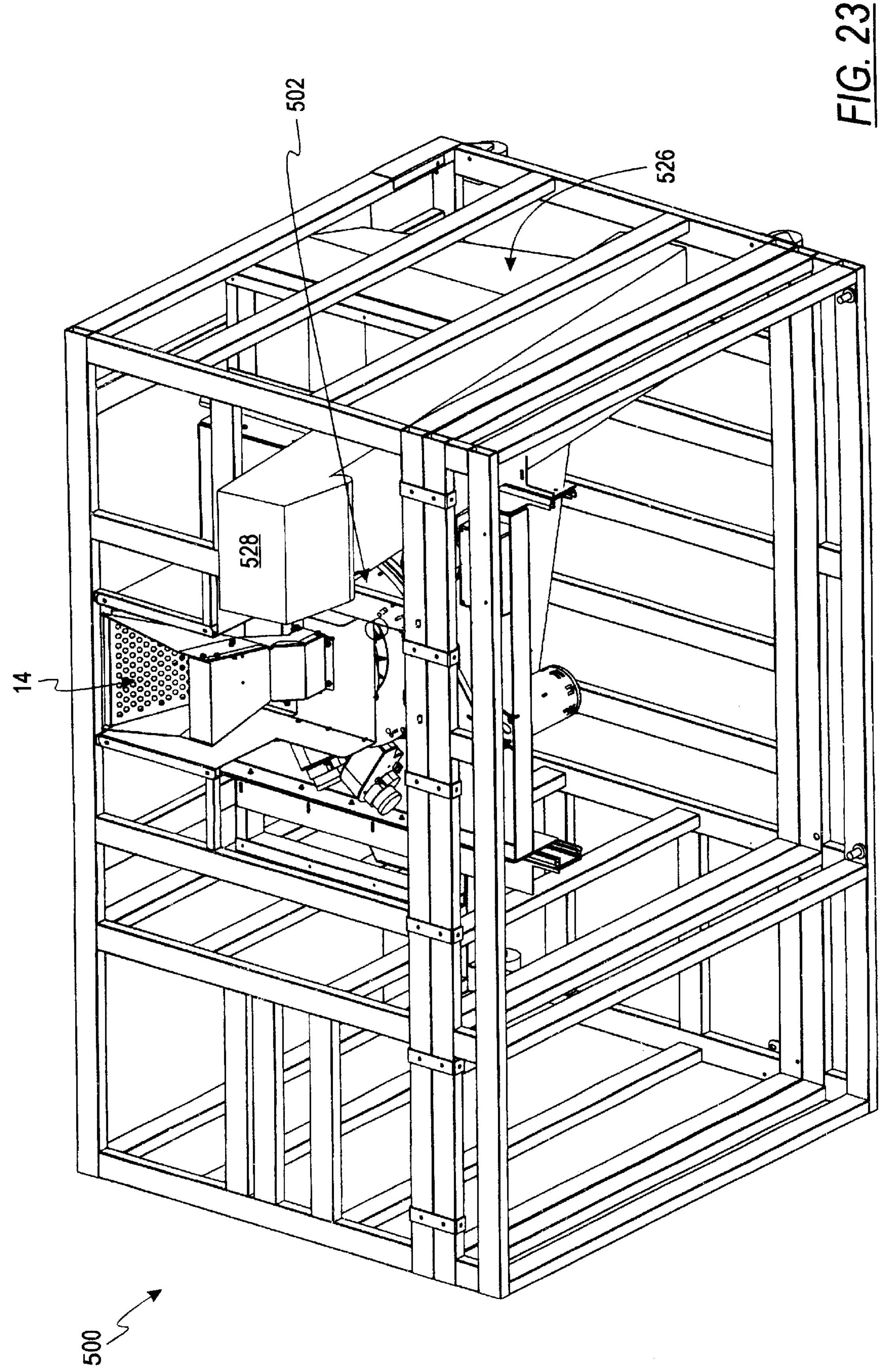
FIG. 23 is a rear perspective view of the first coin processing unit disposed within the frame of a currency processing machine according to one embodiment of the present invention.
Figure 24:
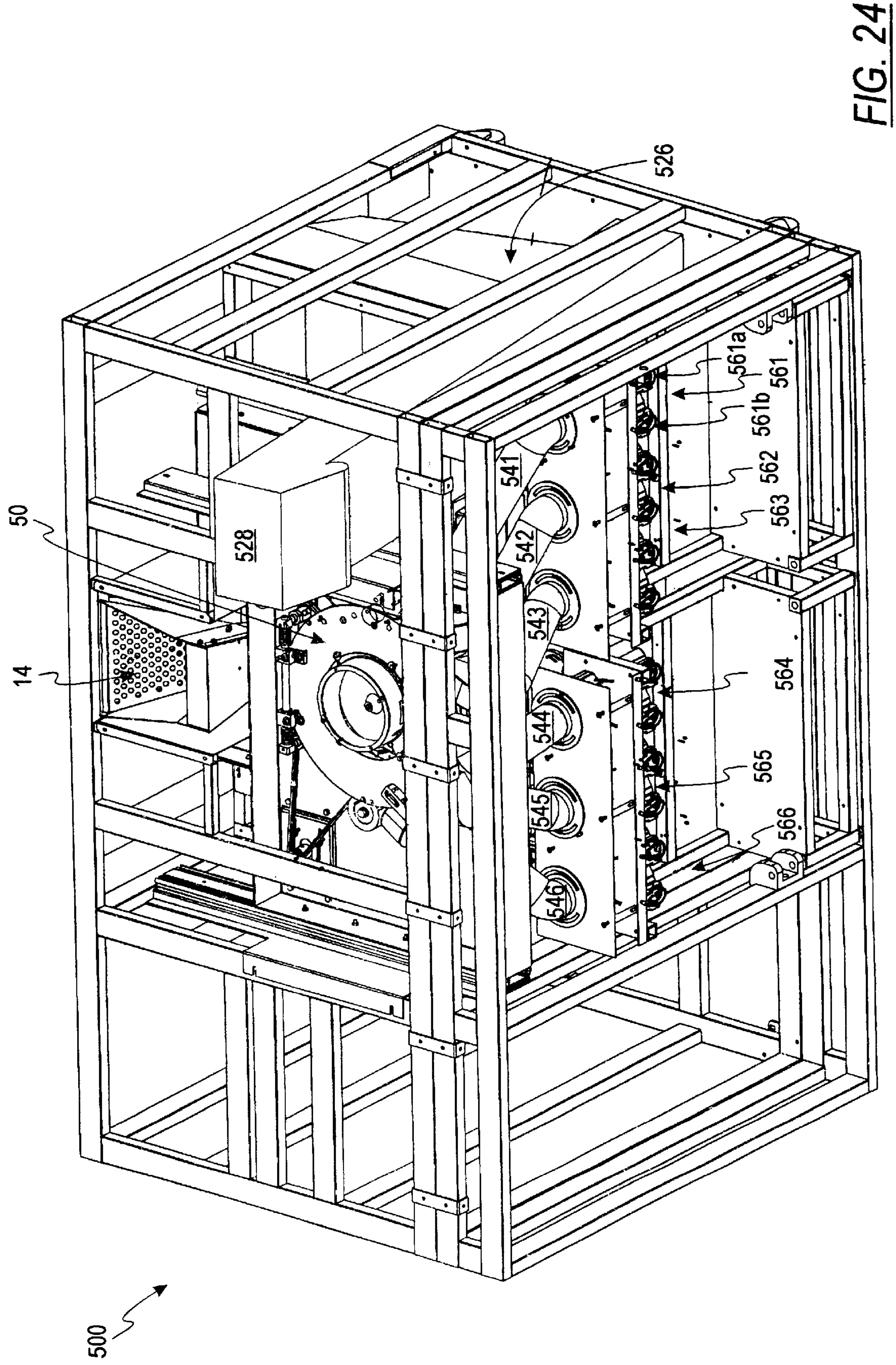
FIG. 24 is a rear perspective view of the second coin processing unit disposed within the frame of a currency processing machine according to one embodiment of the present invention.
Figure 25:
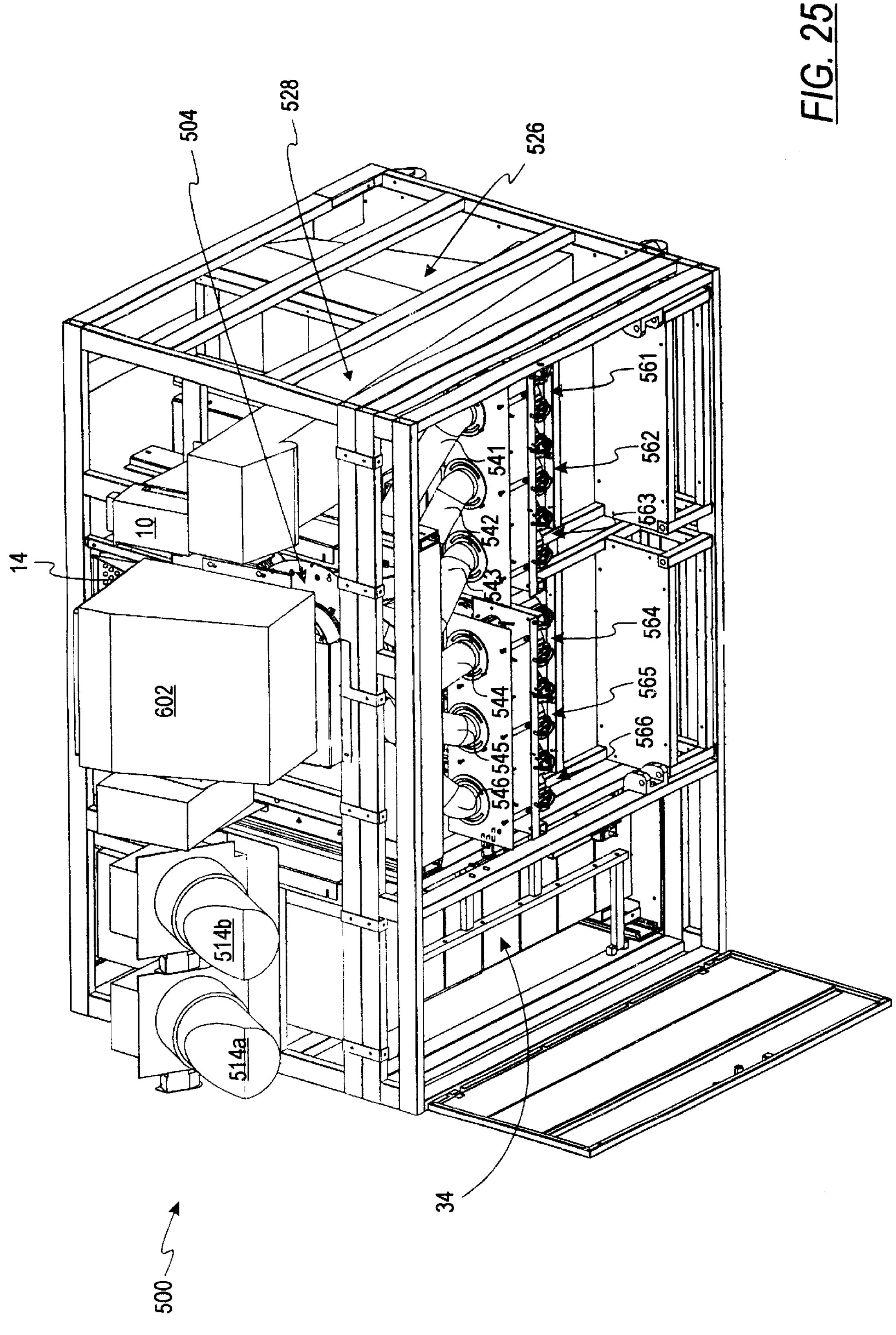
FIG. 25 is a rear perspective view of a currency processing machine according to one embodiment of the present invention.

Referring now to FIGS. 22*a* and 22*b*, an alternative embodiment of a coin distribution network 420 implementing a first coin processing unit 250 and a second coin processing unit 422 is illustrated. This embodiment also eliminates the aforementioned downtime associated with removing coins from the currency processing machine 10. Coins are first counted and sorted by the first coin processing unit 250 to determine the value of the coins input to the currency processing machine 10 by a user. The exit channels 254*b*–254g essentially dump into a coin holding area 424 while the exit channel 254*a* is reserved for undesirable coins. Coins are then routed to the second coin processing unit 422 via an outlet 426 where the coins are sorted and recounted. The coins exiting the exit channels (not shown) of the second coin processing unit 422 are then distributed into a plurality of coin receptacles 251 disposed below the coin handing device. In one embodiment, a combination of coin tubes 256, rotating coin distribution manifolds 258, and linear coin distribution manifolds 260–265 such as those illustrated in FIG. 13*a* may be used to route coins into the plurality of coin receptacles 251. The embodiment of the coin distribution network 420 illustrated in FIGS. 22*a* and 22*b* alleviates the aforementioned downtime associated with an operator removing processed coins from the currency processing machine 10. The coin holding area 424 can hold coins received from a user while an operator unloads the coins. In an alternative embodiment of the coin distribution 420 having a first and a second coin processing units 250, 422, the two coin convey paths 410, 412 shown in FIGS. 20 and 21 are used to route coins to a user and an operator. In still another alternative embodiment of the currency processing machine 10, a plurality of tubes 256 coupled to each of the exit channels of the second coin processing unit 422 channel coins directly to a plurality of coin spouts. Each of the plurality of coin spouts corresponding to an individual coin denomination.

Referring now to FIGS. 23–27, another alternative embodiment of the currency processing machine 500 is illustrated. Similar to the embodiment of the currency processing machine 420, illustrated in FIGS. 22*a* and 22*b*, the currency processing machine 500 includes a first coin processing unit 502 and a second coin processing unit 504. Like the machines illustrated in FIG. 1,2,8, and 10 the currency handing machine 500 is capable of processing a variety of types of currency and/or funds including different types of currency from different counties, different denominations of currency, casino script, casino tokens, transit tokens, etc.

Regarding paper currency, the machine 500 includes a bill acceptor 501, a bank note processing module (not shown), a bank note dispensing module 34 which are similar to the bank note receptacle 16, the bank note processing module 30, and the bank note dispensing module 34 illustrated in FIG. 2. Additionally, regarding the dispensing of coins to a user of the machine 500, the machine 500 includes two coin dispensing modules 514*a* and 514*b* similar to the coin dispensing module 36 illustrated in FIG. 2. The coin dispensing modules 514*a*,b hold an independent supply of coins to dispense to a user of the machine 500 when necessary. In one embodiment, the coin dispensing modules 514*a,b* dispense U.S. nickels and U.S. quarters to the user of the currency processing machine 500.

Coins are input to the currency handling machine 500 via a coin input hopper 520. The input hopper 14 is sufficiently large to hold a large amount of coins (e.g. at least approximately 1500 U.S. quarters). From the input hopper 14, the coins are directed to the first coin processing unit 502 which determines the aggregate value of the coins input by the user. The first coin processing unit 502 determines the aggravate value of the coins input by the user by first sorting the coins into individual coin denominations and then counting the number of coins of each denomination. Alternatively, the first coin processing unit 502 is simply a coin counter. Additionally, the first coin processing unit 502 off-sorts small coins and discriminates the coins input by a user (discussed below). The currency processing machine 500 is configured to process specific, predetermined coin denominations. For example, in one embodiment, the currency processing machine 500 is configured to process U.S. nickels, U.S. quarters, U.S. half-dollars, $2 casino tokens, $1 casino tokens, and $5 casino tokens. Those coins not processed by the currency handling machine 500 are off-sorted (e.g. rejected) by the first coin processing unit. Rejected coins can be returned to the user or held within the currency processing machine 500.

In the illustrated embodiment, the first coin processing unit 502 is a rotating coin sorting system with seven coin exit channels. Six of the exit channels correspond to the six coin denominations—U.S. nickels, U.S. quarters, U.S. half-dollars, $2 casino tokens, $1 casino tokens, and $5 casino tokens—for which the currency processing machine 500 is configured to process. The seventh coin exit channel off-sorts small coins (coins having a small diameter) which the machine 500 is not configured to process such as U.S. pennies and U.S. dimes. The first coin processing unit 502 optionally employs a large coin reject exit channel to remove undesirable coins having a larger diameter than the largest desirable coins. The currency processing machine 500 can be configured to process many different coins of a variety of sizes besides those listed including, but not limited to, the 5¢ casino token, 10¢ casino token, 25¢ casino token, and 50¢ casino token. The particular configuration of the currency processing machine 500 is dependant upon the application of the currency processing machine 500.

In addition to rejecting smaller coins, the first coin processing unit 502 also discriminates the coins. Discrimination includes verifying the authenticity and the "quality" of the each of the coins. Those coins determined to be non-genuine (e.g. slugs) are rejected along with off-sorted the smaller coins. Additionally, those coins of insufficient quality such as damages coins (e.g. bent coins) are also rejected. Damaged coins are potentially problematic as they may cause jams within the coin paths of the currency processing machine 500. Smaller coins are rejected via the first coin exit channel (not shown) of the first coin processing unit which has a width that is larger than the diameter of the undesirable small coins, but smaller than the diameter of remaining desirable coins. Thus, only the smaller coins are capable of being rejected via the first coin exit channels. The undesirable coins that are of poor quality or bent are rejected through the use of an internal diverter system within the sorting head (not shown) of the first coin processing unit 502, or though the use of external diverters outside the sorting head. In various alternative embodiments, rejected coins are directed back to the user or directed to a reject receptacle (not shown) contained within the currency processing machine 500. Exemplary coin processing systems which can be used for the first and second coin processing units of the illustrated embodiment of the currency processing machine are described in commonly-owned U.S. Pat. Nos. 5,141,443; 5,277,651; 5,299,977; 5,453,047; 5,429,550; 5,480,348; 5,507,379; 5,542,880; and 6,171,182; which are all hereby incorporated by reference in their entireties. According to one embodiment of the currency processing machine 500, the first coin processing unit 502 counts and discriminates at least about 2350 mixed coins per minute or at least about 4280 U.S. nickels per minute, when operating at a speed of about 250 revolutions per minute. A typical casino mix of coins is comprised of approximately 20% U.S. nickels, 40% U.S. quarters, 10% U.S. half-dollars, 5% $2 casino tokens, 20% $1 casino tokens, and 5% $5 casino tokens.

Those coins not rejected by the first coin processing unit 502 flow, under the force of gravity, from the first coin processing unit 502, into the intermediate coin bin 526. The intermediate coin bin 526 functions as a coin holding area. The intermediate coin bin 526 is capable of receiving and holding a large volume of coins and then discharging the coins held therein at specified times or on the occurrence of specific events that are discussed below.

According to the illustrated embodiment, the second coin processing unit 504 is disposed within the currency processing machine 500 at a greater height than the first coin processing unit 502. This arrangement results in a more compact currency processing machine 500 because the coin input hopper 14, the first coin processing unit 502, the intermediate coin bin 526, the second coin processing unit 504, and the coin bag holders 561-566 are not directly stacked upon one another. The currency processing machine 500 contains a conveyor mechanism 528 for transporting coins discharged from the intermediate coin bin 528 to the second coin processing unit 504. The conveyor mechanism 528 is inclined to bring the coins discharged from the intermediate coin bin 528 to the second coin processing unit 504 that is disposed at a higher elevation. In one embodiment, the conveyor mechanism 528 has a plurality of paddles (not shown) attached thereto. The paddles enable the conveyor mechanism 528 to transport a greater volume of coins at a time. The conveyor mechanism 528 is configured to also hold coins while not transporting coins so that the operation of the conveyor mechanism 528 can be suspended without the coins falling form the conveyor mechanism 528.

The second coin processing unit 504 sorts the coins into individual denominations and discharges the coins out of a plurality of exit channels corresponding to the particular coin denominations the coin processing machine 500 is configured to process. The second coin processing unit 504 of the illustrated embodiment of the currency processing machine 500 contains six exit channels (not shown) which are associated with six coin tubes 541–546. The six exit channels correspond to U.S. nickels, U.S. quarters, U.S. half-dollars, $2 casino tokens, $1 casino tokens, and $5 casino tokens, respectively. In one embodiment of the currency processing machine 500, the second coin processing unit 504 sorts at least about 3300 mixed coins per minute or at least about 6000 U.S. nickels per minute, when operated at a speed of at about 350 revolutions per minute. Each of the six exit channels has a coin tube 541–546 attached thereto to direct coins to coin receptacles (not shown) such as coin bags. Coin bag holders 561–566 are attached to the outlets of the coins tubes 541–546. The illustrated embodiment has dual coin bag holders so that the left-most coin bag holder, for example, has a first coin bag holder 561*a* and a second coin bag holder 561*b*. Such an embodiment may implement a diverter associated with each coin tube 541–546 to direct coins into one of the two coin bags attached to a dual coin bag holder. Alternatively, the currency processing machine 500 can employ only one coin bag holder per exit channel. One exemplary coin bag holder that can be used in connection with the illustrated embodiment of the currency handling machine 500 is described in commonly-owned U.S. Pat. No. 6,131,625, entitled "Coin Bag Clamping Device," which is hereby incorporated by reference in its entirety. The inventors have found that positioning the bag holders 561-566 at a height of approximately thirty inches form the ground places the coin bags at a comfortable working height for the operator of the currency processing machine 500.

The operation of the currency processing machine 500, will now be described. A user inputs a plurality of coins into the input hopper 14. According to one embodiment, the user inputs to the user interface 12 the type of transaction the user wants to perform. For example, the user may desire to exchange the user's plurality of coins for paper currency. Alternatively, the user may desire to exchange for $1 casino tokens. Or alternatively, the user may desire to have his "house account" credited an amount equivalent to the aggregate value of his coins. Once the coins are deposited into the input hopper 14, the coins flow, under the force of gravity, to the first coin processing unit 502 where the aggregate value of the deposited coins is determined. The first coin processing unit 502 separates the coins which the machine 500 is adapted to processes from the "undesirable" coins. Additionally, the first coin processing unit 502 typically verifies the authenticity of each of the coins. Those coins determined to be "undesirable" including those determined to be non-authentic are directed to the reject chute (not shown) which directs the rejected coins back to the user or, alternatively, to a reject bin (not shown) disposed within the machine 500.

The "desirable" coins discharged from the first coin processing unit 502 flow, under the force of gravity, into the intermediate coin bin 526. According to the operator's instructions, coins discharged into the intermediate coin bin 526 are held in the intermediate coin bin 526 for a period of time until the intermediate coin bin 526 has a predetermined volume, e.g 40% full, of coins therein. At that time, either automatically or according to the operator's instructions, the coins are discharged from the intermediate coin bin 526. Alternatively, coins discharged into the intermediate coin bin 526 are immediately discharged from the intermediate coin bin 526 to the conveying mechanism 528. The intermediate coin bin 526 is internally sloped to cause the coins to flow, under the force of gravity, to an outlet (not shown) located at the bottom of the intermediate coin bin 526.

The operation of the conveying mechanism 528 and second coin processing unit 504 is started pursuant to a coin unloading procedure. Coins discharged from the intermediate coin bin 526 flow, under the force of gravity, from the intermediate coin bin 526 onto the conveying mechanism 528. The coin conveying mechanism 526 upwardly transports the coins to the second coin processing unit 502 where the coins are sorted by denomination. The sorted coins are discharged out of one of the plurality of exit channels and into the bags (not shown) suspended from the bag holders 561-55. The second coin processing unit 504 counts the number of coins discharged from each of the coin exit channels. After a predetermined number of coins are discharged from one of the plurality of coin exit channels, the operation of the second coin processing unit 504 and the conveying mechanism 528 is suspended. Alternatively, when a dual coin bag holders are attached to the coin tubes 541–546, the coins are directed to the second (empty) coin bag. According to one embodiment, the predetermined number corresponds to the desired number of coins a coin bag is to hold, also called the "hopper fill bag." Once the bag limit is reached for any one of the denominations (or the limit is reached in both bags corresponding to denomination with a dual bag holder 561) and the operation of the second coin processing unit 504 is suspended, a signal is generated to inform the operator of the currency processing machine 500 that a bag(s) is full. In alternative embodiments, the signal takes the form of an audible signal and/or flashing light (not shown) disposed on the machine 500. In other embodiments, the machine 500 is part of a network of a plurality of currency processing machines 500 (as in FIGS. 11 or 12, for example) and the signal is sent to the host to inform an operator that a filled coin bag needs replacing. In still another alternative embodiment, a light such as a light emitting diode ("LED") is disposed above the coin bag having reached the "hopper fill bag" limit thus allowing an operator to quickly identify the filled coin bag.

Figure 27:
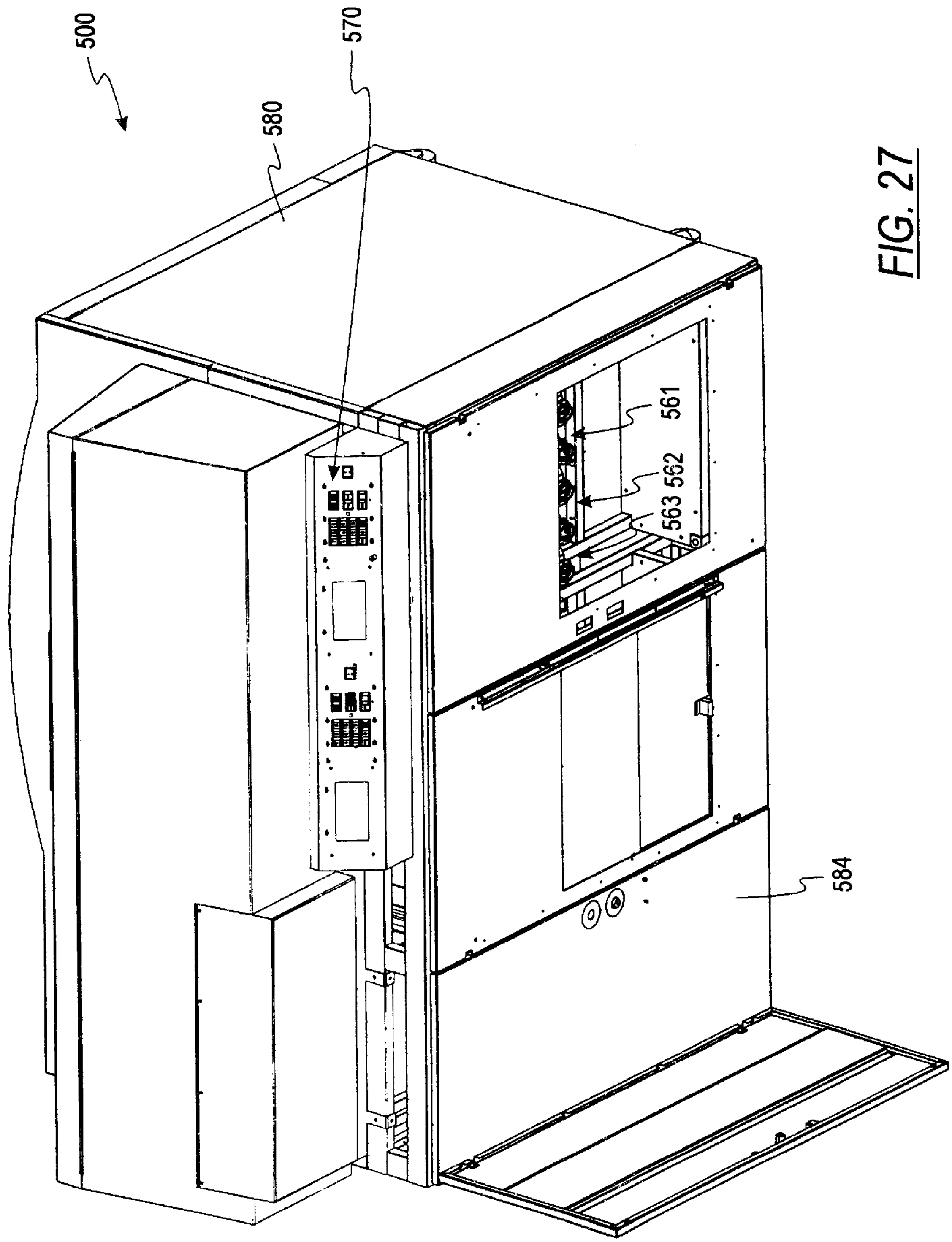
FIG. 27 is a rear perspective view of the housing of a currency processing machine according to one embodiment of the present invention.

The currency processing machine 500 having an intermediate coin bin 526 disposed between two coin processing units 502,504 enables the currency processing machine to continue transacting with customers while the operator unloads the filled coin bags from the machine 500. Transacting with customers includes receiving funds including coins from a user, dispensing funds including coins from the coin dispensers 514_a,b_, and otherwise interacting with the user. As illustrated in FIG. 27, the currency processing machine 500 includes an operator interface 570 to allow the operator to control the operation of the currency processing machine 500. Additionally, the operator can access information regarding the currency processing machine 500 via the interface 570 such as the volume of coins processed including a breakdown by denomination, the value of coins processed and breakdowns by denomination, which coin bag is full, the estimated time until a coin bag of a particular denomination is filled, etc. The intermediate coin bin 526 is able to hold a large amount of coins received from users while an operator is unloading the machine 500 or waiting to unload the machine 500. According to one embodiment, the intermediate coin bin 526 has a coin storage volume of approximately 7500 cubic inches which is sufficiently large to hold about 115,000 U.S. quarters or a typical casino mix of about 90,000 coins. According to another embodiment, the intermediate coin bin 526 has a coin storage volume of approximately 8500 to 9000 cubic inches which is sufficiently large to hold at least 150,000 U.S. quarters.

The illustrated embodiment of the currency processing machine 500 includes two coin dispensing modules 514_a–b_ which dispense coins to a user from an independent supply of coins. Put another way, the coins input by a user are not directly routed to the coin dispensing modules 514_a–b_. However, in alternative embodiments, a portion of the coins discharged from the first coin processing unit 502 are recirculated to replenish the coin dispensing coin module's 514_a–b_ coin supply. Such an embodiment would still enable the machine 500 to continue to transact with users while an operator is offloading coins from the machine 500 because coins not recirculated to the dispensers 514_a–b_ are retained by the intermediate coin bin 526.

According to one mode of operation, the input of coins by the user (e.g. a casino patron) to the currency processing machine 500 automatically activates the operation of the currency processing machine 500. Coins flowing from the first coin processing unit 502 into the intermediate coin bin 526 are immediately discharged to the conveying mechanism 528 which transports the coins to the second coin processing unit 504 where the coins are sorted by denomination and directed into the respective coin bags. The currency processing machine 500 continues to operate in this manner when coins are input to the machine by a user until one of the coin bags is filled. At that time, the conveyor mechanism 528 and the second coin processing unit 504 suspend operation so that no further coins are directed into the coin bags. (Alternatively, coins are directed to the second coin bag if dual coin bag holder are employed until a predetermined number of coins are directed into a second coin bag.) Upon suspension of the operation of the conveyor mechanism 528, the discharging of coins from the intermediate coin bin 526 is suspended so that the intermediate coin bin 526 holds the coins discharged from the first coin processing unit 502. A signal is generated to alert the operator of the currency processing machine 500 that a coin bag has reached capacity. Meanwhile, the currency processing machine 500 continues to be available to transact with customers despite having a full coin bag attached thereto. Coins input to the currency processing machine 500 are retained by the intermediate coin bin 526 while one of the coin bags held by one of the coin bag holders 561-565 is full. A second audio or visual signal is generated for a "bin full" condition indicating that the bin 526 is filled to a predetermined level, thus, alerting the operator that the intermediate coin bin 526 will soon be necessary to service the machine 500. Additionally, in other embodiments, an additional signal can be generated to indicate to the operator the estimated time until a bag is full based upon the currency rate of coin intake. For example, an average intake of approximately 50 U.S. quarters per minute over the last ten minutes would indicate that the coin bag corresponding to U.S. quarters will be filled to capacity in approximately 30 minutes. In still other embodiments, other audio or visual alarms can alert the operator to a plurality of error conditions indicating that the currency acceptor is full, the currency dispensing module is low or empty, the presence of a coin jam in the coin hopper, the present of a coin jam in the first or second coin processing units, the coin dispensing module is low or empty, and other errors necessitating service.

The operation of the conveyor mechanism 528 and the second coin processing unit 504 is resumed after the filled coin bag is removed and replaced with an empty coin bag (or coin bags in the case of a dual coin bag holder) by the operator. According to another mode of operation, coins are retained in the intermediate coin receptacle 528 until the coins reach a predetermined level (e.g. 40% capacity) within the receptacle 528 at which time the coins are discharged from the coin bin 528 to the conveyor mechanism 528 and the second coin processing unit 504.

To summarize, the currency processing machine 500 uses the intermediate coin bin 526 to enable the currency processing machine 500 to simultaneously interact with a user and an operator according to at least two different modes of operation. First, the intermediate coin bin 528 holds coins until the intermediate coin bin 526 reaches a predetermined level (e.g. 40% capacity). At that time, the operator is alerted and coins (either automatically or in response to operator input) are discharged from the intermediate coin receptacle 528, sorted by the second coin processing unit 504, and discharged into the coin bags until a coin bag is filled. Alternatively, the attendant is not alerted until a bag reaches capacity. The operator replaces the filled bag and monitors the continued sorting of coins until the intermediate coin bin 528 is drained. Meanwhile, the currency processing machine 500 continues to be available to receive new funds including coins from a user and the new coins are retained by the intermediate coin bin. Second, the currency processing machine 500 can immediately discharge coins from the intermediate coin bin 526 upon receipt therein to be sorted by the second coin processing unit 504 and then discharged into the coin bags until a coin bag is filled. Upon the filling of one of the coin bags, the discharging of coins from the intermediate coin bin 526 and the sorting of coin by the second coin processing unit 504 is suspended and the operator is notified of the filled coin bag. New coins are retained by the intermediate coin bin 526. Alternatively, the operator is not notified upon the filling of a coin bag, but rather when one coin bag is filled and the amount of coins in the intermediate coin bib 526 reaches a predetermined level.

It is necessary for an operator remove coins from the currency processing machine 500 not only when one of the coin bags has been filled with coins but also to obtain coins for other parts of the casino. The removal of coins from prior art currency processing machines results in the shut down (e.g. the inability to transact with users) of those machines for significant periods of time. Also, prior art machines which recirculate coins to the users need to be periodically unloaded because coin deposits into the machine most often exceed coin dispenses, resulting in a net accumulation of coins in the machine. The currency handing device 500 of the present invention is able to remain in service during the unloading of coins from the machine 500 resulting in continuous availability to the user while coins are unloaded from the machine 500 by an operator.

Another advantage of the currency processing machine is the small size of the currency processing machine 500. For example, the currency processing machine 500 is contained within a housing 580 sixty-four (64) inches wide, fifty-eight (58) inches high, and thirty-two (32) inches deep. According to another embodiment, the housing 580 is seventy (70) inches wide, fifty-eight (58) inches high, and forty-four (44) inches deep. The arrangement of the first and second coin processing units 502,504 and the intermediate coin bin 526 allows the currency processing machine to have a relatively small footprint. The overall height of the machine 500 is reduced because of the vertical positioning of the first and second coin processing units 502,504, the intermediate coin bin 526, and the coin bag holders 561–566, which are not directly stacked upon one another. Rather, the conveyor mechanism 528 upwardly transports the coins from the intermediate coin bin 526 to the second coin processing unit 504. The small footprint of the currency processing machine 500 uses less floor space in the casino or other institution using the machine 500. Additionally, less space floor space is needed behind the currency processing machine 500 to remove and replace the filled coin bags.

One factor contributing to the overall size of the currency processing machine 500 is number of coin denominations the machine 500 is configured to process. A related factor is the size of the intermediate coin bin 526. As previously mentioned, according to one embodiment, the intermediate coin bin 526 has a coin storage volume of approximately 7500 cubic inches which is sufficiently large to hold about 115,000 U.S. quarters or a typical casino mix of about 90,000 coins. According to another embodiment, the intermediate coin bin 526 has a coin storage volume of approximately 8500 to 9000 cubic inches which is sufficiently large to hold at least 150,000 U.S. quarters. The number of coins the machine 500 is configured to process and the size of the intermediate coin bin 526 can be varied depending on the particular application. For example, the machine 500 can be configured to process only one denomination of coins such as U.S. quarters. In such an application, the overall size of the machine is reduced because the diameters of the sorting heads of the first and second coin processing units 502,504 can be deceased and the volume of the intermediate coin bin 526 can be reduced. Additionally, the anticipated length of time required to respond to filled coin bag signal and replace the filled coin bag influences the size of the intermediate coin receptacle.

Figure 26:
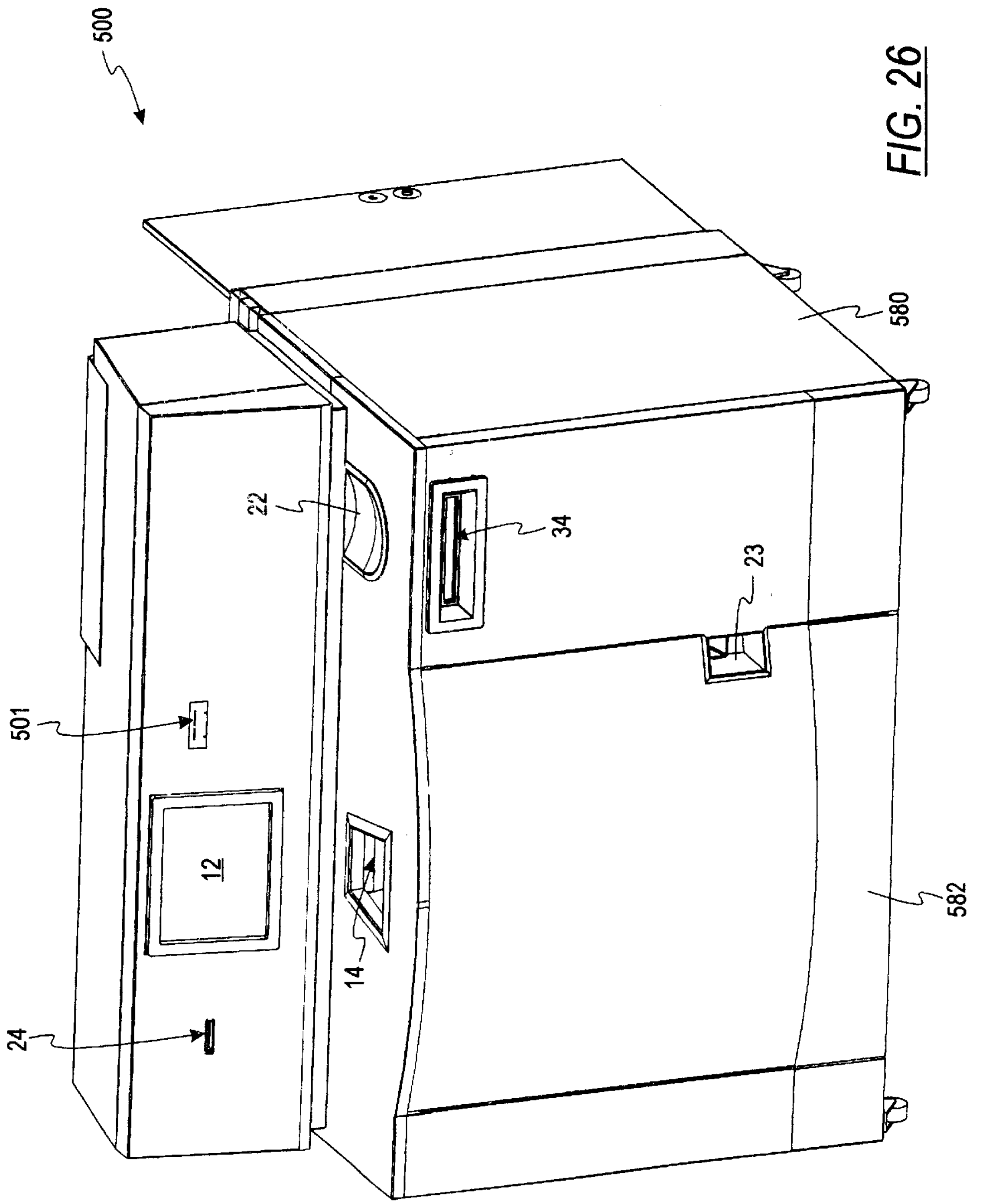
FIG. 26 is a front perspective view of the housing of a currency processing machine according to one embodiment of the present invention.

Referring specifically to FIGS. 26 and 27, a front view and a rear view of the currency processing machine 500 are shown, respectively. The user related components, such as the user interface 12 and the coin input hopper 14 for receiving coins from the user, are disposed on a front side 582 of the housing 580. The operator related components, such as the operator interface 570 and the coin bag holders 561–566, are disposed on a rear side 584 of the housing 580.

Accordingly, a user's and an operator's interactions with the currency processing machine 500 will not interfere with each other. Rather, by disposing the operator related components in the rear 584 of the machine 500 and the user related components in the front 582 of the machine 500, the user and operator are separated from each other.

Figure 28:
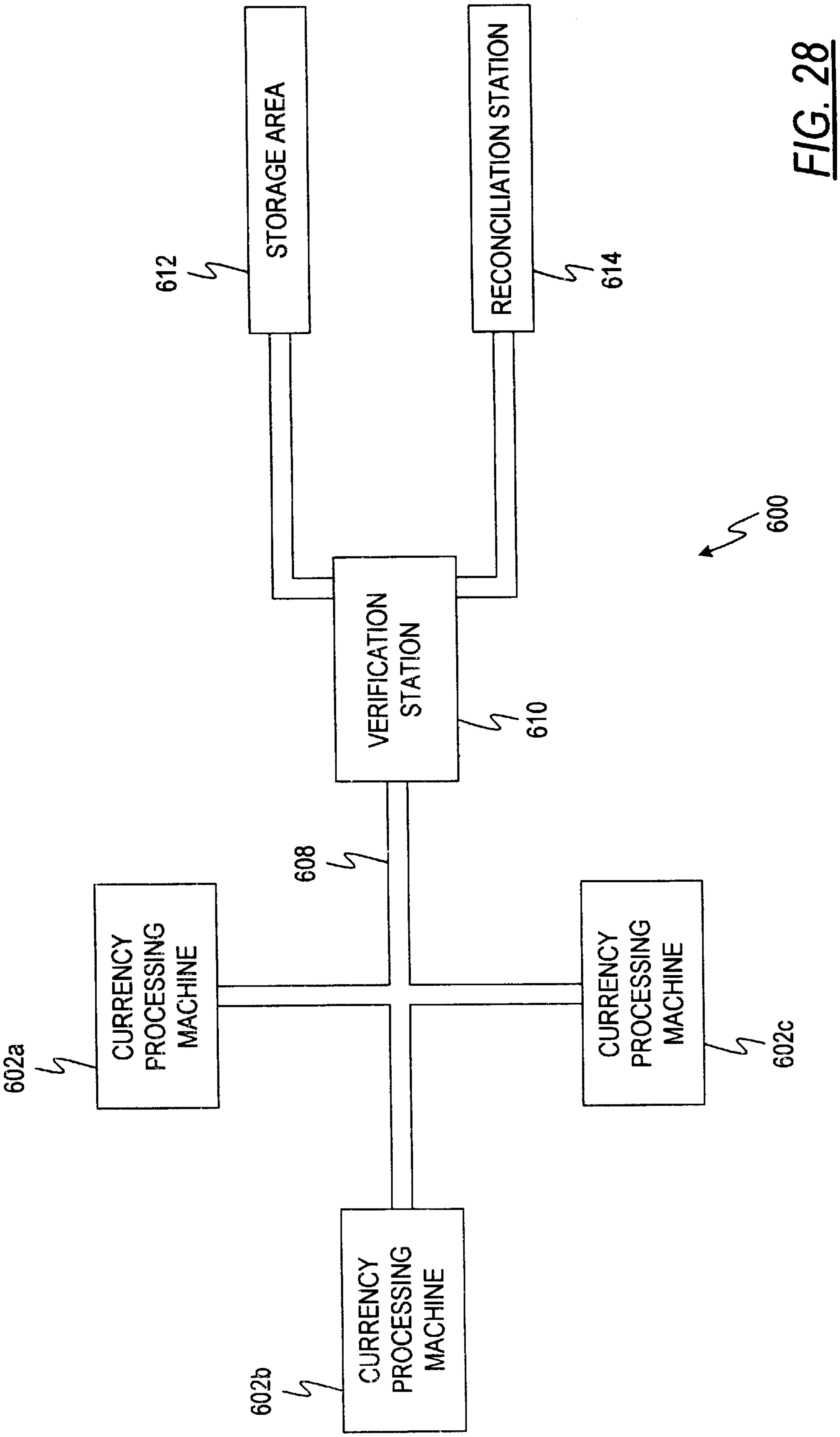
FIG. 28 is a coin bag transportation and storage system according to an alternative embodiment of the present invention.
Figure 29:
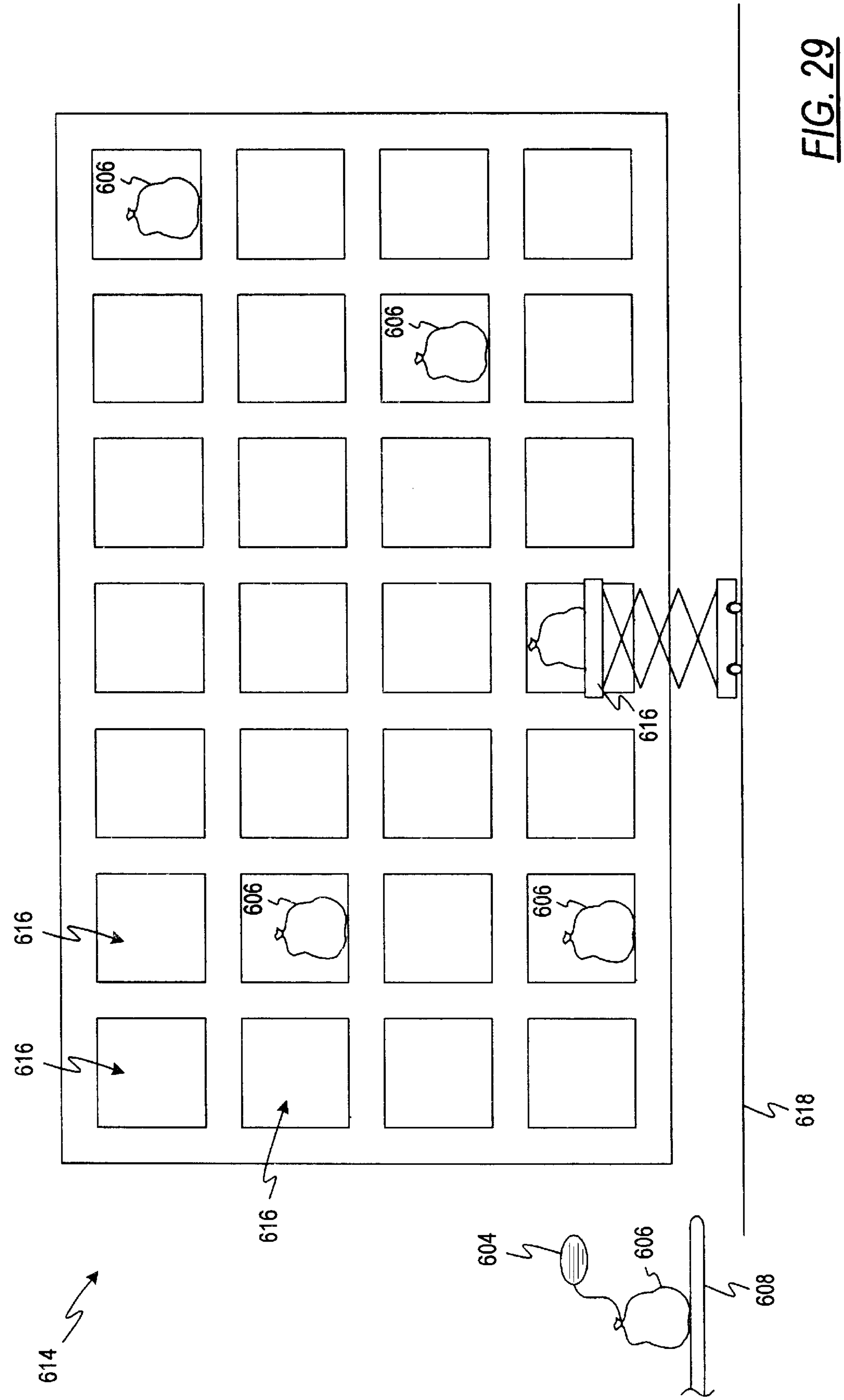
FIG. 29 is a shelving system according to an alternative embodiment of the present invention.

Referring now to FIGS. 28 and 29, a coin bag transportation and storage system 600 is shown. In one embodiment, this system 600 can be implemented with a currency processing machine 602 having an automatic bag sealing device (not shown in FIG. 24), such as the bag sealing device 140 illustrated in FIGS. 9*a–c*. Once a bag 603 is filled with the requisite number of coins, the bag is automatically sealed and released from the coin bag holding/sealing device of the currency processing machine 602. In one embodiment, an identifier such as a tag 604 is attached to the bag upon sealing. The tag 604 can have printed thereon information concerning the filled coin bag such as (i) total number of coins in the bag, (ii) aggregate value of coins in the bag, (iii) the currency processing machine filling the bag, (iv) denomination of coins in the bag, and/or (v) other information concerning the filled coin bag.

Once the filled coin bags are sealed and tagged, the bags 606 are transported from each of the currency processing machines 602 by a transport mechanism 608 such as a conveyor belt. In one embodiment, each of the bags 606 are first transported to a verification station 610 where the bag 606 is weighed and verified against the count of the coins in the bag 606. If the weight of the coins properly matches the number and value of the coins in the bag 606 as determined by the currency processing machine 602, the transport mechanism 608 delivers the filled coin bag to a storage area 612. If the weight of the coins does not properly match the supposed number and value of the coins as determined by the currency processing machine 602, the bag 606 is flagged and transported to a recollection station 614 wherein the coin count is verified. In one embodiment, an additional tag or other indicia of verification is attached to the bag to display that the number/value of the coins in the bag has been verified. Other information, such as the verification station 610 which verified the value/count is optionally marked on the additional tag.

In one embodiment, the storage area 612 simply consists of a storage bin capable of holding several filled coins bags. In other alternative embodiments, referring now to FIG. 29, the storage area 630 consists of an automatic shelving system 614. The shelving system 614 includes several cells 616 each adapted to hold a filled coin bag 606. According to one embodiment, each of the cells 616 can correspond to a different coin denomination. For example, one column of cells 616 may be reserved for $5 casino tokens. In such an embodiment, a casino attendant can visually inspect the shelving system 614 to quickly determine the volume of $5 casino tokens available. Alternatively, the cells 632 are filled in an order giving no preference to the denomination of coins in the filled coin bag. The overall size of the shelving system 614 depends on the particular application requirements. For example, a large casino may benefit from a large shelving system having many rows and many columns of cells. A smaller operation, such as a smaller casino or smaller bank, may desire a shelving system 614 small enough to fit within a modular cart which can be easily moved to other currency processing machines 602. The overall size of the shelving system 614 can vary with various alternative embodiments of the present invention.

The shelving system 614 can also be part of a larger network including many currency processing machines 602*a–c*. As each of the cells 616 are filled with filled coin bags 606, the host computer can update a listing of the quantity of coins on hand as well as the cell 616 within the shelving system 614 in which each filled coin bag 606 is stored. Therefore, the operator need only access a listing of the host computer to determine the quantity of coins available to the operator. Once each of the cells 616 in the shelving system 614 have been filled, a signal is generated and sent to the host computer to notify the attendant that the cells 616 of the shelving system 614 are full. Because the count/value of each of the bags 606 filled with coins have been verified, the filled coin bags 606 can be directly used throughout the casino or bank without additional verification. As is readily apparent, the storage system as described results in significant time and manpower savings.

As each of the filled coins bags are transported to the shelving system 614 by the transport mechanism 608, a bag positioning device 615 receives the filled coin bags 606 from the transport mechanism 608 and moves each of the filled coin bags 606 to an appropriate cell 616 within the shelving system 614. According to one embodiment, the bag positioning device 615 moves in the horizontal direction along a rail 618 to receive a filled coin bag 606 from the transport mechanism 608 and to move the bag to the cell 616 in which the filled coin bag 606 is to be positioned. The bag positioning device then extends vertically to position a filled coin bag 606 in the intended cell 616.

Figure 30:
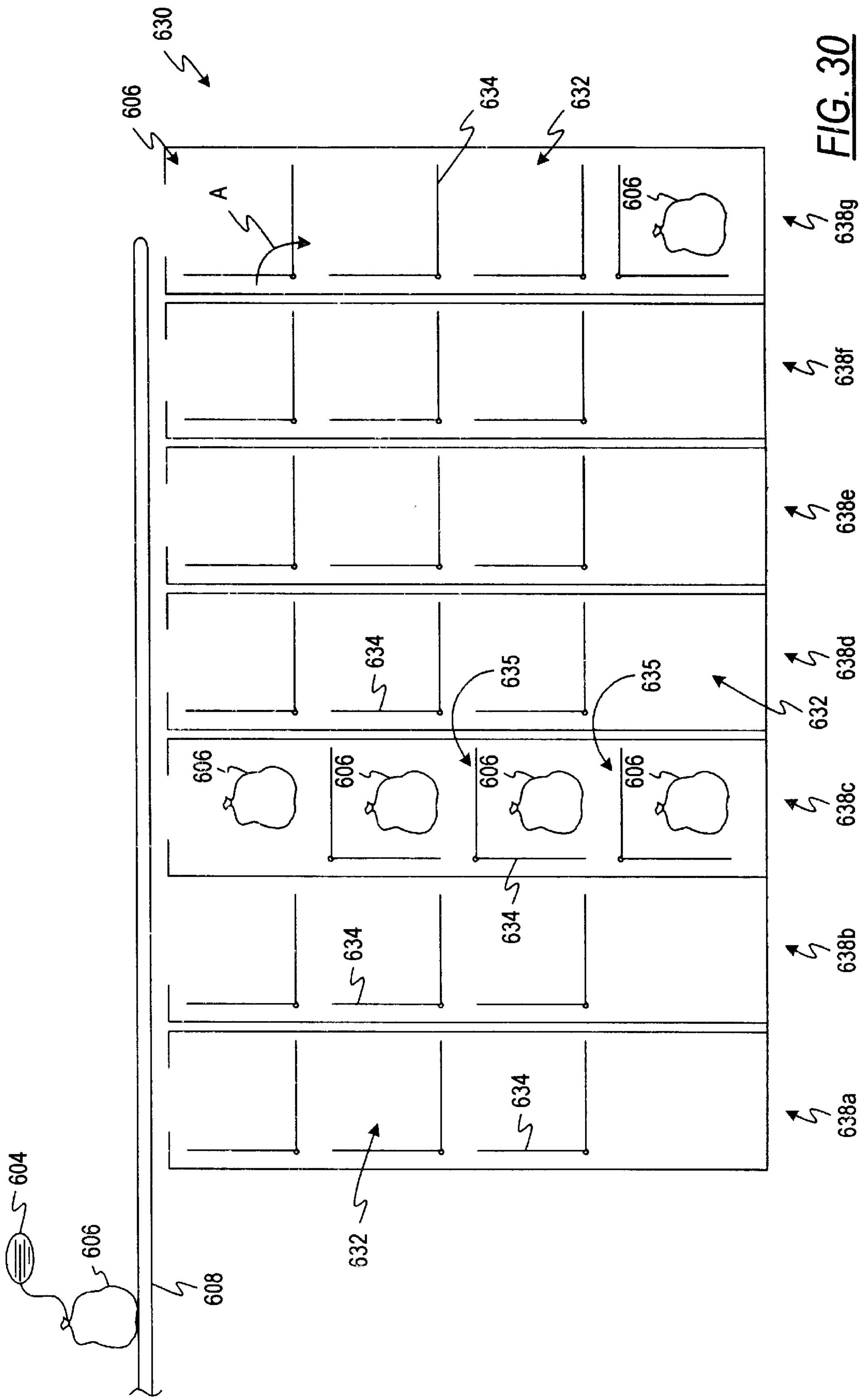
FIG. 30 is a shelving system according to an alternative embodiment of the present invention.

Alternatively, referring now to FIG. 30, a gravity fed shelving system 630 is illustrated. The shelving system 630 has a plurality of cells 632 for filled coin bag storage. The filled coins bags 606 are transported to the top of the shelving system 630 and then fall though selected openings (not shown) in the transport mechanism 605 corresponding to each of the columns of cells 638*a–g*. Alternatively, a plurality of diverters (not shown) can move the filled coin bags from the transport mechanisms 608 into a column of cells 638. In still another alternative embodiment, the length of the transport mechanism 608 is varied to deliver the filled coin bags to the top of each column of cells 632. Each of the cells 632 includes a corresponding 'L' shaped shelf 634 which is hingedly connected to the shelving system 630. Each of the shelves 634 are spring-loaded to maintain the shelves 634 in the 'L' position as are the shelves of column 638*a*, as shown in FIG. 30. As a filled coin bag 606 falls through each of the columns, the shelves 608 downwardly rotate in the direction indicated by arrow A. The shelves 634 disposed above the cells 632 not having the coins bags 606 residing therein are rotated back up in a direction opposite the arrow A by a spring member (not shown). The shelves 608 disposed above the cells 632 having coin bags 606 residing therein are held in the downward position (as in column 604) by the weight of the filled coin bag 606 thus creating a platform 635 for a coin bag 606 directed into the upwardly adjacent cell 632.

While the present invention has been described with reference to one or more preferred embodiments, those skilled in the art will recognize that many changes may be made thereto without departing from the spirit and scope of the present invention. For example, this invention related to selectively distributing coins can be employed on machines which receive only coins, not bank notes, and provides the user with redemption for those deposited coins.

What is claimed is:

1. A currency processing machine in which a user deposits funds including coins of a plurality of denominations, the machine comprising:

a coin input hopper adapted to receive coins of a plurality of denominations, a first coin processing unit adapted to receive coins from the coin input hopper, the first coin processing unit being adapted to determine the aggragate value of the coins received from the input hopper;

an intermediate coin receptacle adapted to receive coins from the first coin processing unit and to hold the coins received from the first coin processing unit, the intermediate coin receptacle being adapted to selectively discharge coins held therein from an outlet, a second coin processing unit adapted to sort the coins discharged from the intermediate coin receptacle and to discharge the sorted coins out of a plurality of coin exit channels, each of the plurality of coin exit channels corresponding to a predetermined coin denomination to be processed; and a coin transport mechanism adapted to transport coins from the outlet of the intermediate coin receptacle to the second coin processing unit.

2. The currency processing machine of claim 1 wherein the coin transport mechanism further comprises a conveyor belt.

3. The currency processing machine of claim 2 wherein the conveyor belt has a plurality of paddles attached thereto for holding the coins while being transported from the outlet of the intermediate coin receptacle to the second coin processing unit.

4. The currency processing machine of claim 2 wherein the conveyor belt is inclined such that the coins are upwardly transported from the intermediate coin receptacle to the second coin processing unit.

5. The currency processing machine of claim 1 wherein the second coin processing unit is adapted to count the number of coins discharged from each of the plurality of coin exit channels, the machine further comprising a controller adapted to control the operation of the currency processing machine, the controller adapted to suspend operation of the second coin processing unit and the coin transport mechanism after a predetermined number of coins have been discharged from one of the plurality of coin exit channels.

6. The currency processing machine of claim 5 wherein the controller is adapted to generate a signal indicating that a predetermined number of coins have been discharged from one of the plurality of the coin exit channels.

7. The currency processing machine of claim 6 further comprising an operator interface adapted to communicate to the operator of the currency processing machine the one of the plurality of coin exit channels that has discharged a predetermined number of coins.

8. The currency processing machine of claim 5 further comprising a plurality of coin output receptacles connected to the plurality of coin exit channels.

9. The currency processing machine of claim 5 further comprising a plurality of coin bag holding mechanisms attached to the plurality of coin exit channels, each of the plurality of coin bag holding mechanisms being adapted to hold a coin bag.

10. The currency processing machine of claim 9 wherein each of the plurality of coin exit channels has at least one corresponding coin bag clamping mechanism.

11. The currency processing machine of claim 10 wherein the each of the plurality of coin exit channels has more than one corresponding coin bag clamping mechanism.

12. The currency processing machine of claim 1 further comprising a user interface adapted to receive input from a user, the input specifying the manner in which currency received from the user is to be processed.

13. The currency processing machine of claim 1 further comprising:

a bill accepting mechanism adapted to receive currency bills from a user of the currency processing machine;

a bill transport mechanism adapted to transport each of the bills from the bill accepting mechanism past an evaluation region to a bill storage receptacle, and a bill evaluation unit adapted to determine information concerning each of the bills.

14. The currency processing machine of claim 1 further comprising at least one coin dispensing mechanism adapted to dispense coins to a user of the currency processing machine.

15. The currency processing machine of claim 14 wherein the coin dispensing mechanism dispenses coins to the user from an independent source of coins.

16. The currency processing machine of claim 14 wherein the coin dispensing mechanism dispenses coins to the user while the second coin processing unit simultaneously sorts the coins discharged from the intermediate coin receptacle and discharges the sorted coins out of the plurality of coin exit channels.

17. The currency processing machine of claim 1 wherein the first coin processing unit is adapted to off-sort coins not of a predetermined denomination.

18. The currency processing machine of claim 1 wherein the first coin processing unit is adapted to discriminate the coins received from the coin input hopper.

19. The currency processing machine of claim 1 wherein the first coin processing unit is adapted to operate independent of the second coin processing unit.

20. The currency processing machine of claim 1 wherein the first coin processing unit determines the aggravate value of the coins received form the input hopper while the second coin processing unit simultaneously sorts the coins discharged from the intermediate coin receptacle and discharges the sorted coins out of the plurality of coin exit channels.

21. A currency processing machine in which a user deposits funds including coins of a plurality of denominations, the machine comprising:

a first coin processing unit adapted to determine the aggragate value of a plurality of coins of at least one denomination input to the currency processing machine by the user;

a second coin processing unit adapted to sort the coins and to discharge the coins out of a plurality of coin exit channels, each of the plurality of coin exit channels corresponding to a predetermined coin denomination to be processed, an intermediate coin receptacle adapted to receive coins from the first coin processing unit, to hold coins received from the first coin processing unit, and to selectively discharge coins to the second coin processing unit; and a controller adapted to suspend the discharging of coins from the intermediate coin receptacle and to suspend operation of the second coin processing unit in response to a predetermined number of coins being discharged from one of the plurality of exit channels of the second coin processing unit, the controller being adapted to cause the intermediate coin receptacle to hold the coins received from the first coin processing unit when the discharging of coins from the intermediate coin receptacle to the second coin processing unit is suspended.

22. The currency processing machine of claim 21 further comprising a coin transport mechanism adapted to transport coins discharged from the first coin processing unit to the second coin processing unit.

23. The currency processing machine of claim 22 wherein the coin transport mechanism comprises a conveyor belt.

24. The currency processing machine of claim 23 wherein the conveyor belt has a plurality of paddles disposed thereon, each of the plurality of paddles adapted to hold a plurality of coins during transportation from the intermediate coin receptacle to the second coin processing unit.

25. The currency processing machine of claim 22 wherein the coin transport mechanism is adapted to upwardly transport coins discharged from the first coin processing unit to the second coin processing unit.

26. The currency processing machine of claim 21 wherein the controller is adapted to generate a signal indicating that a predetermined number of coins have been discharged from one of the plurality of coin exit channels.

27. The currency processing machine of claim 26 further comprising an operator interface adapted to communicate to the operator which of the plurality of coin exit channels has discharged a predetermined number of coins.

28. The currency processing machine of claim 27 further comprising a housing, the operator interface being disposed towards a back side of the housing.

29. The currency processing machine of claim 27 wherein the currency processing machine is adapted to receive operational instructions from an operator of the currency processing machine via the operator interface.

30. The currency processing machine of claim 21 further comprising a plurality of output coin output receptacles attached to the plurality of coin exit channels.

31. The currency processing machine of claim 30 further comprising a housing, wherein the plurality of coin output receptacles are disposed towards a back side of the housing.

32. The currency processing machine of claim 30 wherein the plurality of coin output receptacles are coin bags.

33. The currency processing machine of claim 21 further comprising a plurality of coin bag holders attached to the plurality of coin exit channels, each of the plurality of coin bag holders being adapted to hold at least one coin bag.

34. The currency processing machine of claim 33 wherein each of the plurality of coin bag holders are disposed at a height of about thirty inches from a surface on which the currency processing machine is placed.

35. The currency processing machine of claim 33 further comprising a housing, wherein the plurality of coin bag holders are disposed towards a back side of the housing.

36. The currency processing machine of claim 21 further comprising a user interface adapted to receive input from the user specifying the manner in which coins received from the user are to be processed.

37. The currency processing machine of claim 21 further comprising a bill accepting mechanism adapted to receive currency bills from a user of the currency processing machine, a bill transport mechanism adapted to transport each of the bills from the bill accepting mechanism past an evaluation region to a bill storage receptacle; and a bill evaluation unit adapted to determine information concerning each of the bills.

38. The currency processing machine of claim 21 wherein the intermediate coin receptacle has a volume of at least about 7500 cubic inches.

39. The currency processing machine of claim 21 further comprising a housing and a coin input hopper, the input coin hopper being disposed towards a front side of the housing.

40. The currency processing machine of claim 39 wherein the housing has a width of less than about seventy inches, a depth of less than about forty-four inches, and a height of less than about fifty-eight inches.

41. A method of processing currency including coins of a plurality of denominations with a currency processing machine, the method comprising:

receiving a plurality of coins of at least one denomination from a user of the currency processing machine;

determining the aggregate value of the plurality of coins received from the user with a first coin processing unit;

holding the plurality of coins received from the user in a holding area;

selectively discharging a plurality of coins from the holding area;

sorting the coins discharged from the holding area into individual denominations with a second coin processing unit; and suspending the discharging and sorting of coins after a predetermined number of coins of one of the plurality of denominations have been sorted.

42. The method of claim 41 further comprising transporting the coins selectively discharged from the coin holding area to the second coin processing unit.

43. The method of claim 42 further comprising suspending the transporting of coins after a predetermined number of coins of one of the plurality of denominations have been sorted.

44. The method of claim 42 wherein transporting further comprises transporting the coins with a conveyor belt.

45. The method of claim 44 wherein transporting further comprises transporting the coins with a conveyor belt having a plurality of paddles disposed thereon.

46. The method of claim 42 wherein transporting further comprises upwardly transporting the coins selectively discharged from the coin holding area to the second coin processing unit.

47. The method of claim 41 further comprising generating a signal upon the suspension of the discharging after a predetermined number of coins of one of the plurality of denominations have been sorted.

48. The method of claim 41 wherein sorting further comprises discharging the sorted coins out of a plurality of exit channels of the second coin processing module, the plurality of coin exit channels corresponding to a plurality of coin denominations.

49. The method of claim 48 wherein discharging the sorted coins further comprises discharging the sorted coins into a plurality of coin bags attached to the plurality of exit channels.

50. The method of claim 41 further comprising receiving operational instructions from an operator of the currency processing machine via a operator interface.

51. The method of claim 41 further comprising receiving input from a user of the currency processing machine specifying a type of transaction.

52. The currency processing machine of claim 41 further comprising:

receiving a currency bill;

transporting the currency bill past an evaluating unit, and determining information concerning the currency bill.

53. A currency processing machine for processing currency including coins of mixed denominations that are input by a user, the machine comprising:

a coin counter for determining the aggregate value of the coins of mixed denominations;

a coin bin for holding the counted coins discharged from the coin counter; and a coin sorter for sorting coins discharged from the coin bin.

54. The currency processing machine of claim 53 wherein the coin bin has a volume ranging between about 7500 cubic inches and about 9000 cubic inches.

55. The currency processing machine of claim 53 further comprising a coin transport mechanism adapted to transport coins discharged from coin bin to the coin sorter.

56. The currency processing machine of claim 55 wherein the coin transport mechanism comprises a conveyor belt.

57. The currency processing machine of claim 56 wherein the conveyor belt has a plurality of paddles disposed thereon, each of the plurality of paddles adapted to hold a plurality of coins during transportation from the coin bin to the coin sorter.

58. The currency processing machine of claim 53 wherein the coin transport mechanism is adapted to upwardly transport coins discharged from the first coin processing unit to the second coin processing unit.

59. The currency processing machine of claim 53 wherein the coin counter is a coin sorter.

60. The currency processing machine of claim 59 wherein the coin sorter is disk-type coin sorter.

61. The currency processing machine of claim 53 wherein coin sorter for sorting the coins discharged from the coin bin is a disk-type coin sorter.

62. The currency processing machine of claim 61 wherein the coin bin has an outlet for discharging coins to the coin sorter, the outlet being adapted to move to a closed position in response to a predetermined number of coins of one denomination being sorter by the coin sorter.

63. The currency processing machine of claim 53 further comprising a coin input hopper adapted to receive coins from the user and to direct coins received from the user to the coin counter, the coin input hopper disposed towards a front side of the currency handling device.

64. The currency processing machine of claim 53 wherein the coin sorter includes a plurality of coin exit channels corresponding to a plurality of coin denominations, the currency processing machine further comprising a plurality of coin bag holders disposed towards a back side of the currency processing machine, the plurality of coin bag holders adapted to hold a plurality of coin bags, wherein the plurality of coin bags are adapted to receive sorted coins from the plurality of coin exit channels.

65. A method of operating a currency processing machine, comprising:

receiving currency including coins of mixed denominations from a first user of the currency processing machine;

evaluating an amount of the currency received from the first user;

retaining the coins in a coin bin;

returning to the first user one of the group consisting of a credit slip, currency of a value equal to the amount of currency received from the first user, and a combination of currency and tokens having a total value equal to the amount received from the first user;

discharging the coins from the coin bin after the coin bin has reached a predetermined capacity;

sorting the coins discharged from the coin bin into a plurality of output receptacles corresponding to a plurality of coin denominations;

suspending the discharging and sorting after a predetermined number of coins of one of the plurality of coin denominations have been sorted; and receiving and evaluating, at a later time, currency including coins of mixed denominations from a second user while an operator of the currency handling machine simultaneously removes the sorted coins from at least one of the plurality of output receptacles.

66. The method of claim 65 wherein the second user is the next user after the first user.

67. The method of claim 65 wherein the second user is the one hundredth user after the first user.

68. The method of claim 65 wherein sorting further comprises sorting the coin with a coin sorter, the method further comprising transporting the coins selectively discharged from the receptacle to the coin sorter.

69. The method of claim 68 wherein transporting further comprises transporting the coins with a conveyor belt.

70. The method of claim 69 wherein transporting further comprises transporting the coins with a conveyor belt having a plurality of paddles disposed thereon.

71. The method of claim 70 wherein transporting further comprises upwardly transporting the coins.

72. The method of claim 68 further comprising suspending the transporting and sorting after a predetermined number of coins of one of the plurality of denominations have been sorted.

73. The method of claim 72 further comprising generating a signal upon the suspension of the discharging and sorting.

74. The method of claim 65 further comprising receiving input from a user of the currency processing machine specifying a type of transaction.

75. The method of claim 74 wherein the type of transaction is selected from the group consisting of a credit slip, currency of a value equal to the amount of currency received from the first user, and a combination of currency and tokens having a total value equal to the amount received from the first users.

76. The method of claim 65 further comprising receiving operational instructions from the operator of the currency processing machine via an operator interface.

77. A method of operating a currency processing machine, comprising:

receiving currency including coins of mixed denominations from a first user;

evaluating an amount of the currency;

sorting the coins of mixed denominations;

retaining the sorted coins in receptacles;

returning to the first user one of the group consisting of a credit slip, currency of a value equal to the amount of currency received from the first user, and a combination of currency and tokens having a total value equal to the amount received from the first user; and receiving and evaluating, at a later time, currency including coins of mixed denominations from a second user while simultaneously removing the sorted coins from the first user from the receptacles.

78. The method of claim 77 wherein the second user is the next user after the first user.

79. The method of claim 77 wherein the second user is the one hundredth user after the first user.

80. The method of claim 77 wherein sorting the coins of mixed denominations further comprises sorting the coins with a coin sorter, the method further comprising transporting the coins after evaluating the amount of the currency to the coin sorter.

81. The method of claim 80 wherein transporting further comprises transporting the coins with a conveyor belt.

82. The method of claim 81 wherein transporting further comprises transporting the coins with a conveyor belt having a plurality of paddles disposed thereon.

83. The method of claim 80 wherein transporting further comprises upwardly transporting the coins.

84. The method of claim 80 further comprising suspending the transporting and sorting after a predetermined number of coins of one of the mixed denominations has been sorted.

85. The method of claim 84 further comprising generating a signal upon the suspension of the discharging and sorting.

86. The method of claim 77 further comprising receiving input from a user of the currency processing machine specifying a type of transaction.

87. The method of claim 86 wherein the type of transaction is selected from the group consisting of a credit slip, currency of a value equal to the amount of currency received from the first user, and a combination of currency and tokens having a total value equal to the amount received from the first user.

88. The method of claim 77 further comprising receiving operational instructions from the operator of the currency processing machine via an operator interface.

89. A currency processing machine for processing currency including coins of mixed denominations that are input by a user, the machine comprising:

a coin counter adapted to determine the aggregate value of the coins of mixed denominations;

a coin bin adapted to hold the counted coins discharged from the coin counter resulting in a first supply of coins;

a coin sorter adapted to sort coins from the first supply of coins and to discharge sorted coins out of a plurality of coin exit channels corresponding to a plurality of coin denominations; and a coin dispenser adapted to dispense coins received from a second supply of coins to a user of the currency processing machine, the second supply of coins provided independent of the first supply of coins.

90. The currency processing machine of claim 89 further comprising a plurality of coin bag holders adapted to hold a plurality of coin bags, wherein the plurality of coin bags are adapted to receive sorted coins discharged from the plurality of coin exit channels.

91. The currency processing machine of claim 89 wherein coins from the first source are selectively available to an operator of the currency processing machine via the coin exit channels while a user simultaneously receives coins from the second source of coins.

* * * * *